United States Patent
Oosako et al.

(10) Patent No.: US 12,063,446 B2
(45) Date of Patent: Aug. 13, 2024

(54) PHOTODETECTION DEVICE AND ELECTRONIC APPARATUS

(71) Applicant: Sony Semiconductor Solutions Corporation, Kanagawa (JP)

(72) Inventors: Youhei Oosako, Kanagawa (JP); Yusuke Ikeda, Tokyo (JP); Yosuke Ueno, Kanagawa (JP); Masahiro Segami, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 290 days.

(21) Appl. No.: 17/441,822

(22) PCT Filed: Mar. 6, 2020

(86) PCT No.: PCT/JP2020/009644
§ 371 (c)(1),
(2) Date: Sep. 22, 2021

(87) PCT Pub. No.: WO2020/203036
PCT Pub. Date: Oct. 8, 2020

(65) Prior Publication Data
US 2022/0201232 A1  Jun. 23, 2022

(30) Foreign Application Priority Data
Mar. 29, 2019   (JP) .................. 2019-068359

(51) Int. Cl.
*H04N 25/75*  (2023.01)
*H04N 25/76*  (2023.01)
*H04N 25/772*  (2023.01)

(52) U.S. Cl.
CPC ........... *H04N 25/75* (2023.01); *H04N 25/772* (2023.01)

(58) Field of Classification Search
CPC ....... H04N 25/75; H04N 25/772; H04N 25/76
See application file for complete search history.

(56) References Cited

U.S. PATENT DOCUMENTS 7,321,329 B2 * 1/2008 Toyama ................. H03M 1/08
                                                       341/155
10,116,887 B2 * 10/2018 Ikuma .................... H04N 25/60
(Continued)

FOREIGN PATENT DOCUMENTS

JP  2006-081241 A  3/2006
JP  2007-019682 A  1/2007
(Continued)

OTHER PUBLICATIONS

International Search Report (PCT/ISA/210), International Application No. PCT/JP2020/009644, dated May 11, 2020.

*Primary Examiner* — Marly S Camargo
(74) *Attorney, Agent, or Firm* — Michael Best & Friedrich LLP

(57) ABSTRACT

A photodetection device according to the present disclosure includes: a first pixel that is configured to generate a first pixel signal; a reference signal generator that is configured to generate a reference signal; and a first comparator including a first power supply circuit and a first comparison circuit, the first power supply circuit configured to generate a first power supply voltage on the basis of a power supply voltage supplied from a first power supply node and a bias voltage and configured to output the first power supply voltage from an output terminal, and the first comparison circuit configured to operate on the basis of the first power supply voltage and configured to perform a comparison operation on the basis of the first pixel signal and the reference signal.

28 Claims, 37 Drawing Sheets

(56) References Cited

U.S. PATENT DOCUMENTS

| | | | |
|---|---|---|---|
| 11,902,688 B2* | 2/2024 | Oosako | ................ H04N 25/709 |
| 2013/0215303 A1 | 8/2013 | Ueno | |
| 2017/0302870 A1 | 10/2017 | Ikuma | |
| 2022/0150437 A1* | 5/2022 | Oosako | ................ H04N 25/772 |

FOREIGN PATENT DOCUMENTS

| | | |
|---|---|---|
| JP | 2009-118035 A | 5/2009 |
| JP | 2013-172270 A | 9/2013 |
| WO | 2016/121353 A1 | 8/2016 |

* cited by examiner

[FIG. 2]

[FIG. 4A]
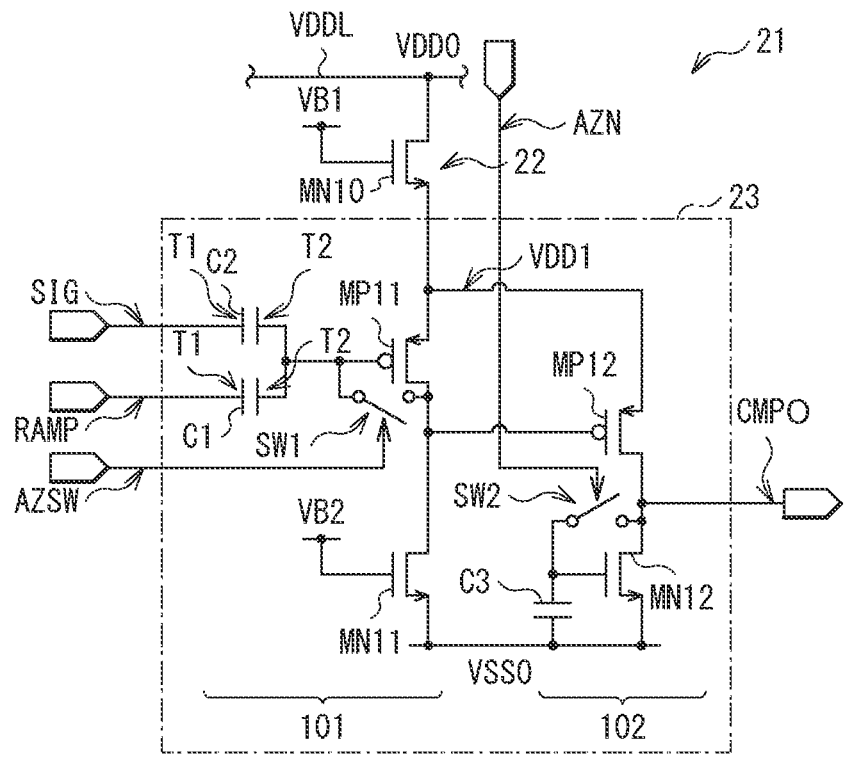
[FIG. 4B]
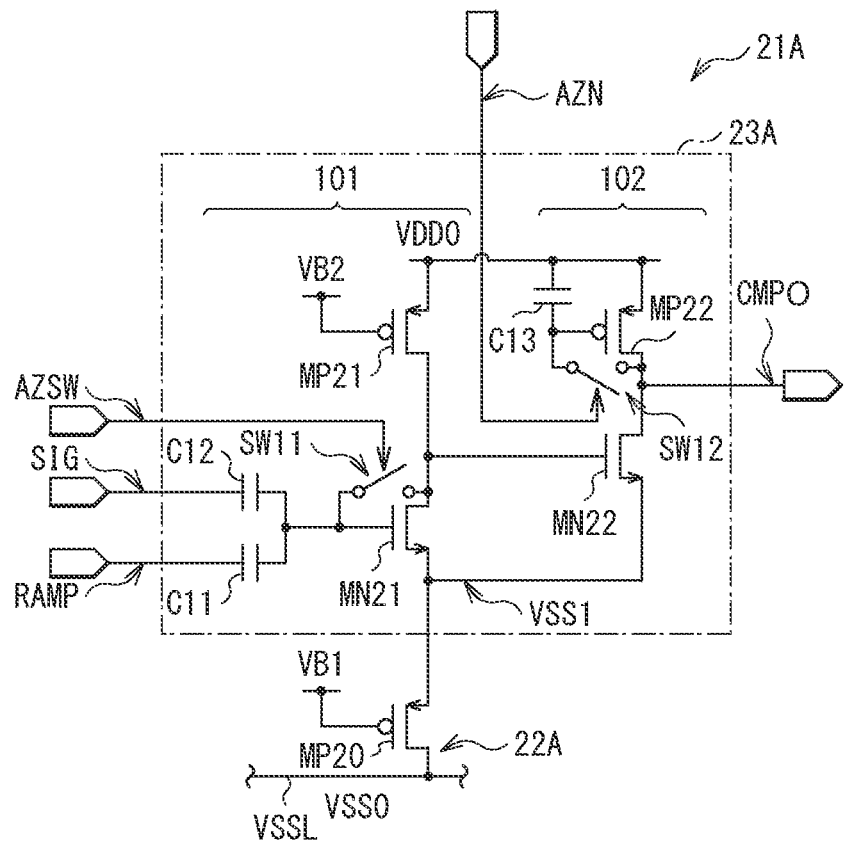

[ FIG. 10A ]
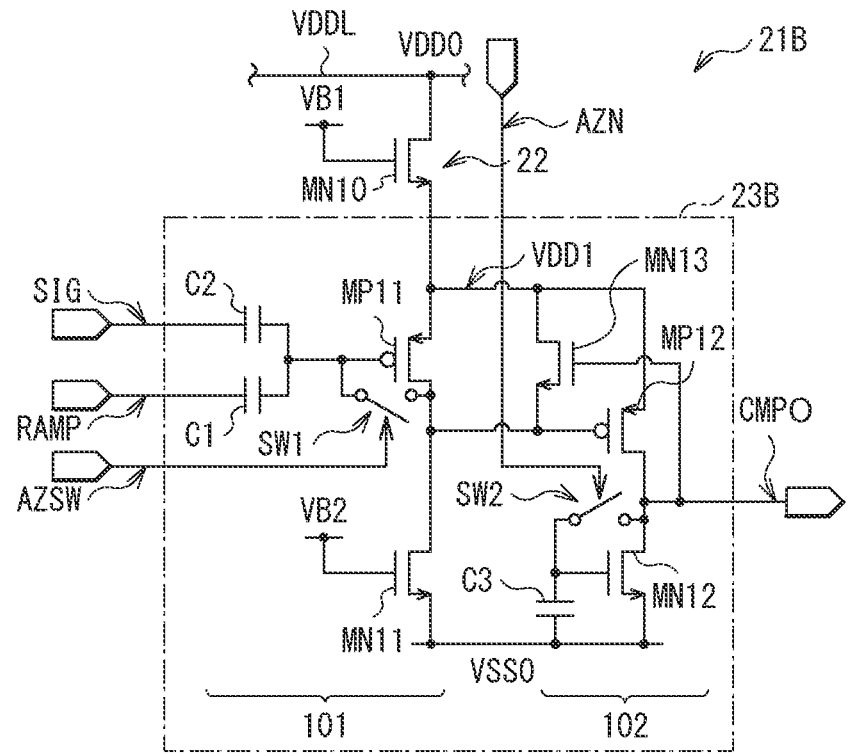
[ FIG. 10B ]
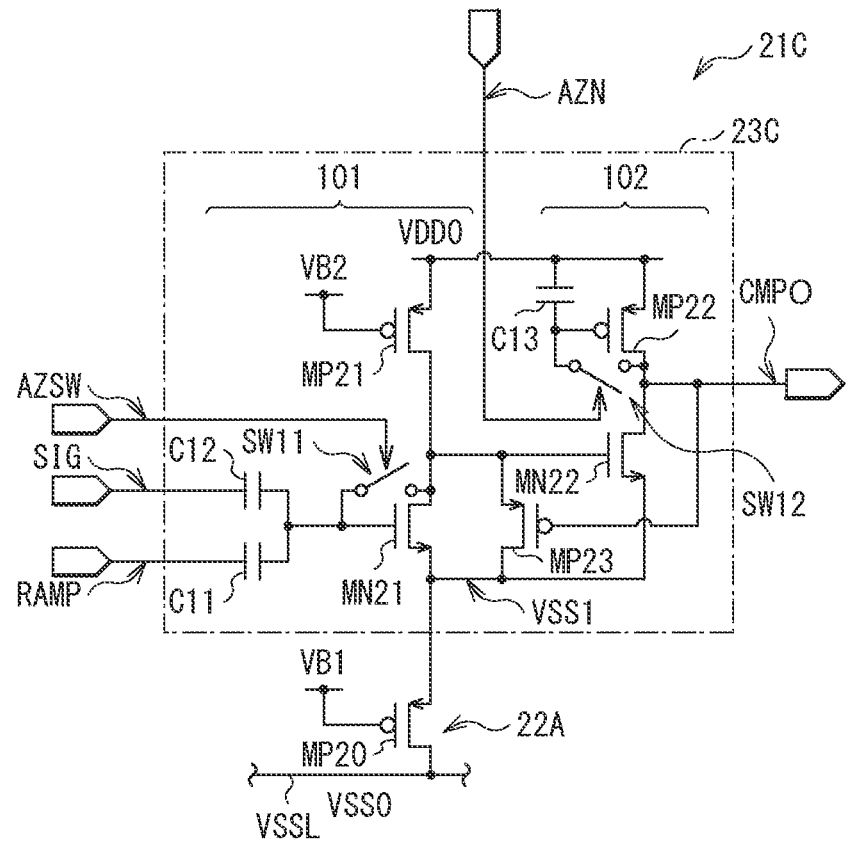

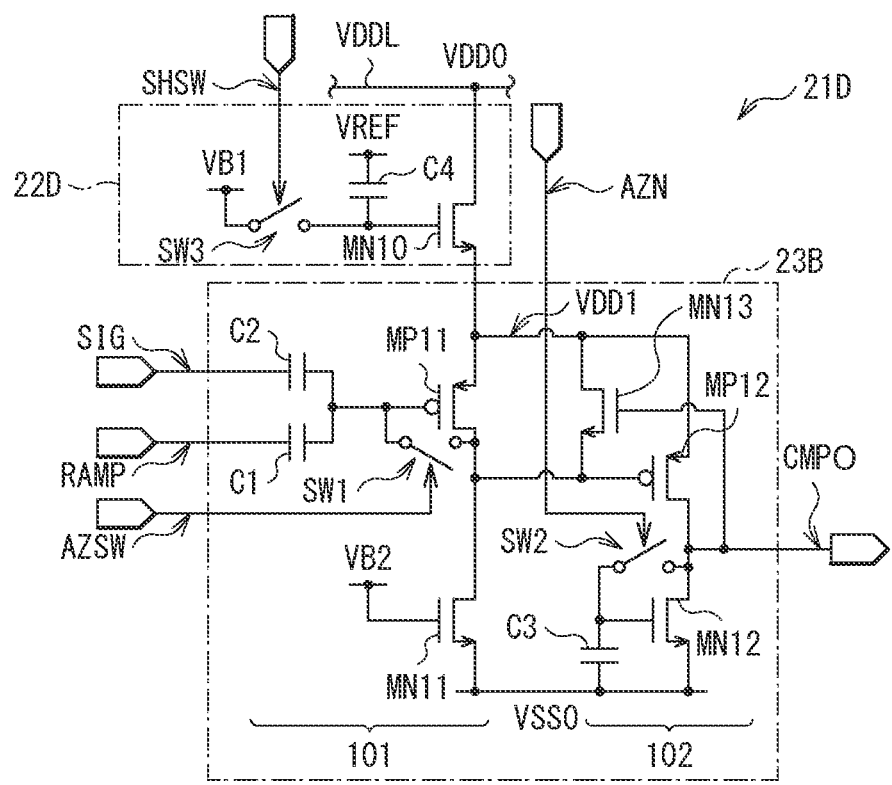
[ FIG. 11A ]

[FIG. 11B]
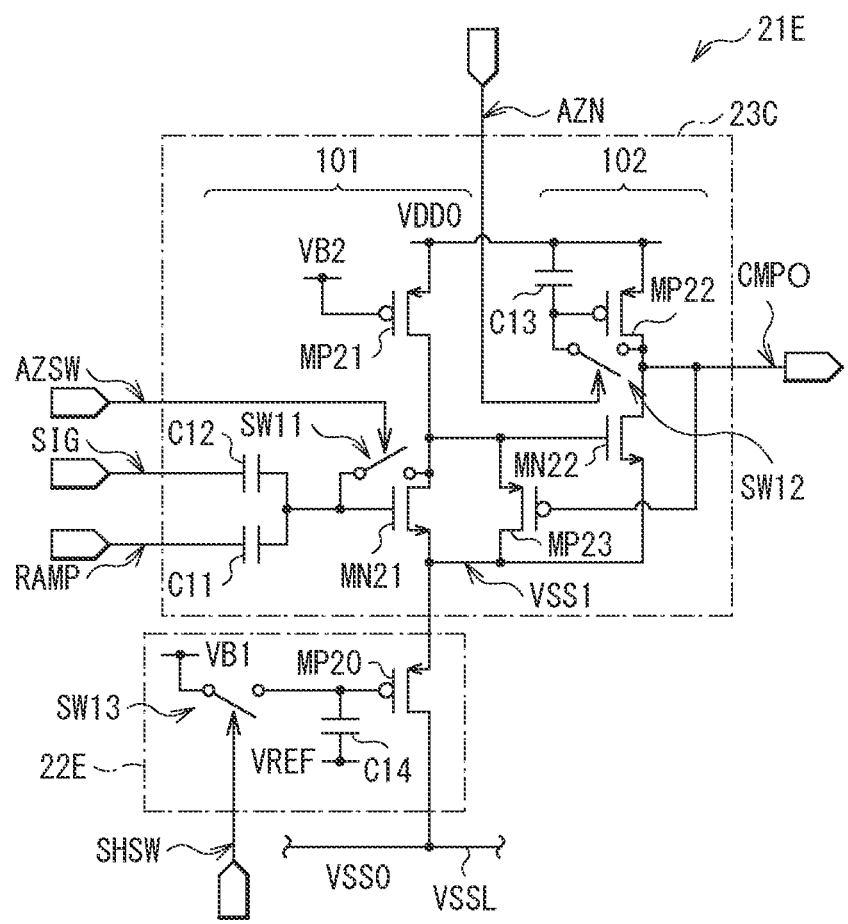

[FIG. 12A]
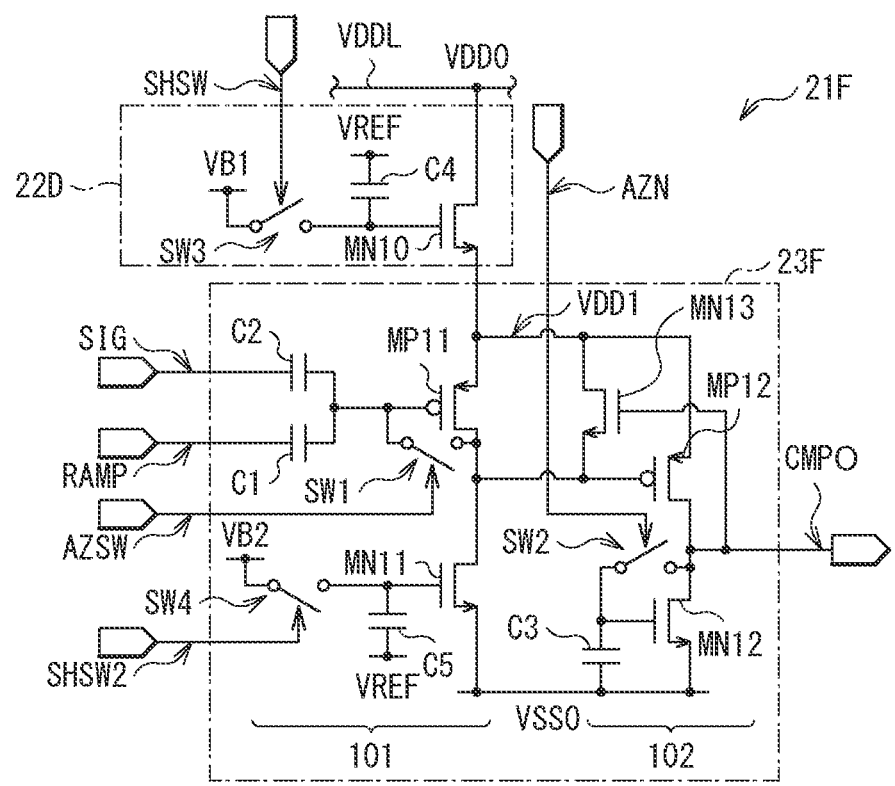

[FIG. 12B]
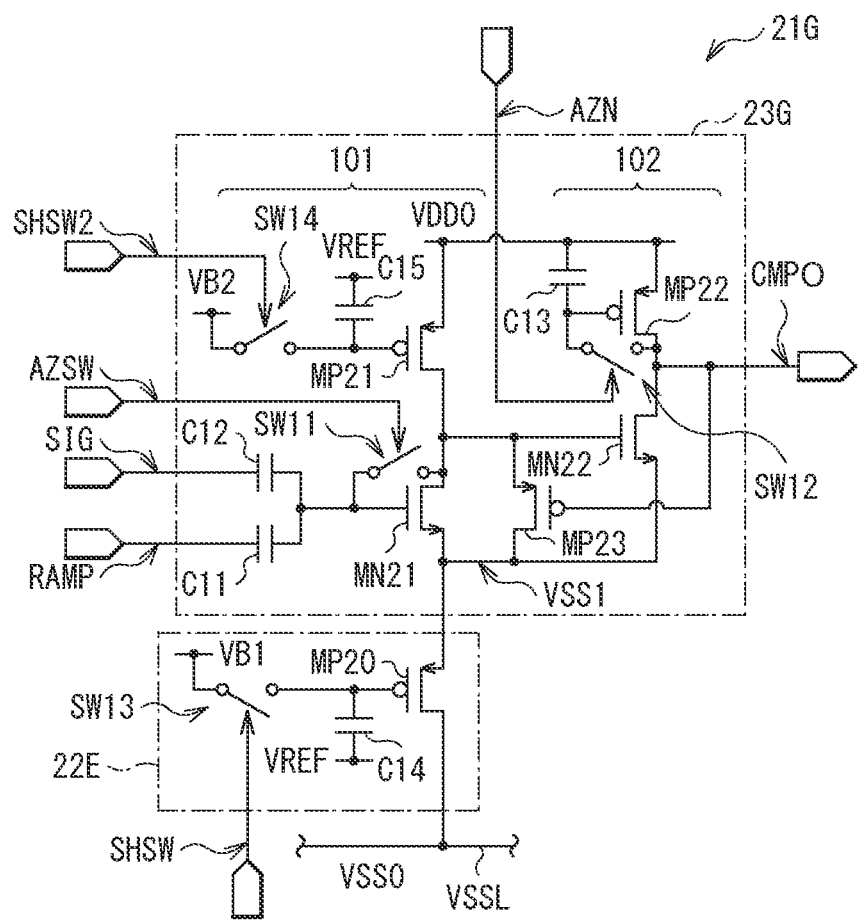

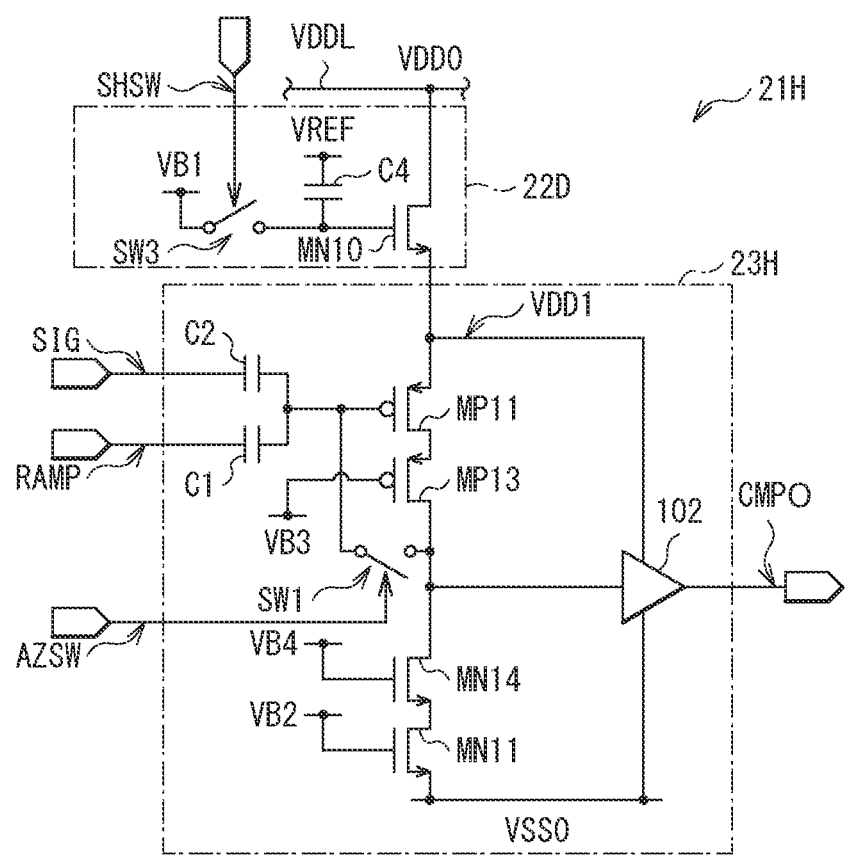
[FIG. 13]

[FIG. 14]
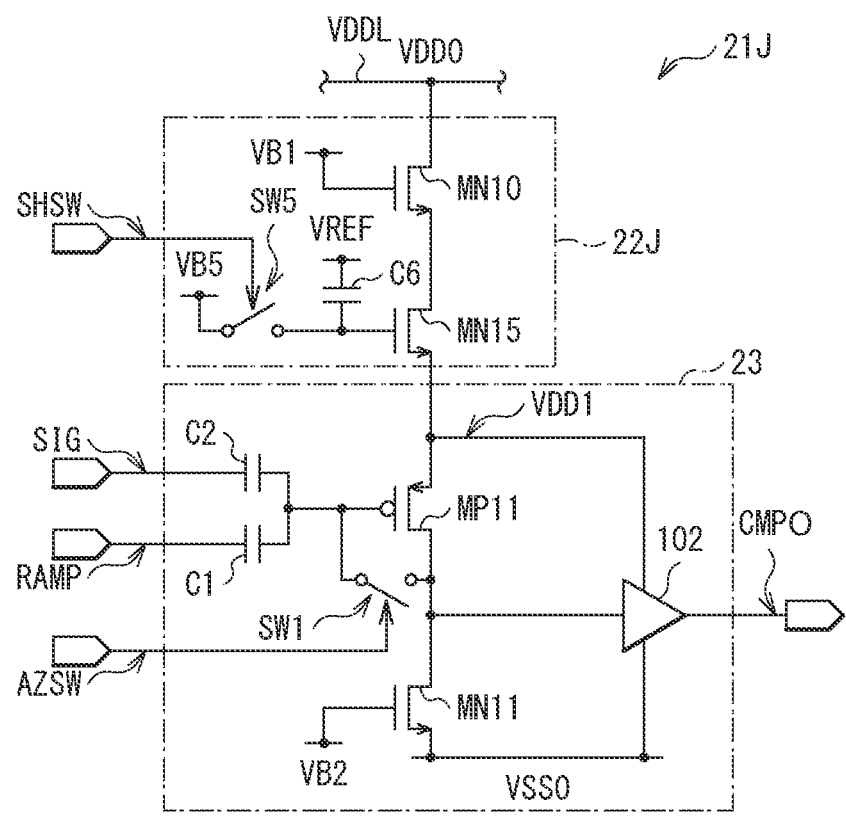

[ FIG. 15 ]
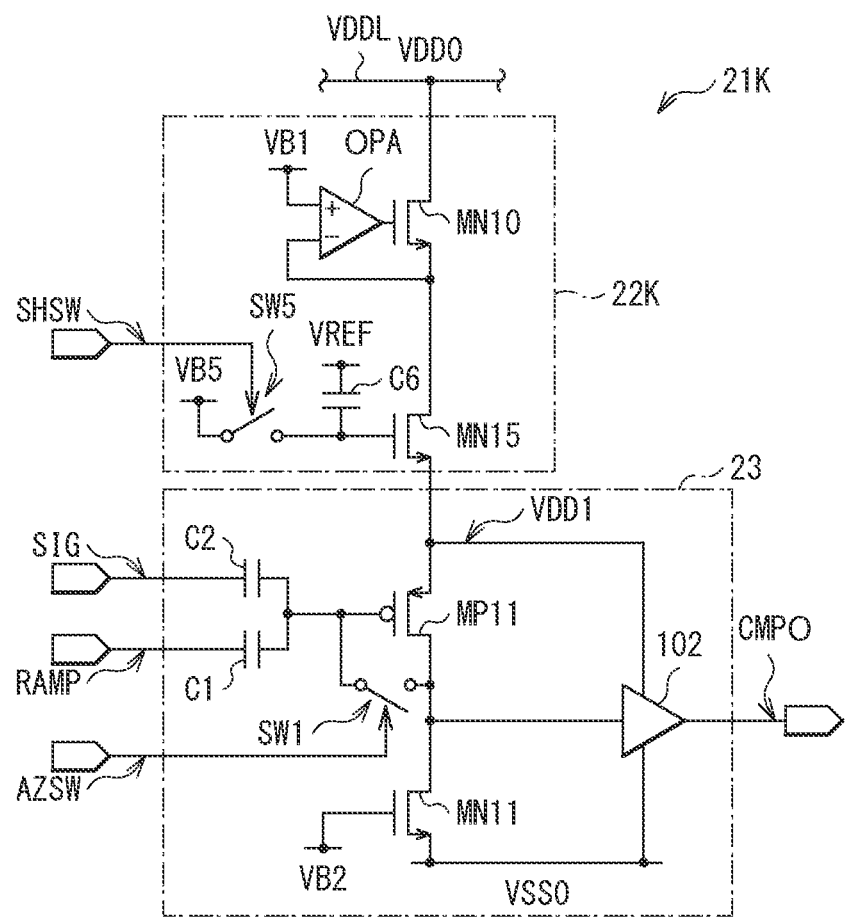

[ FIG. 16 ]
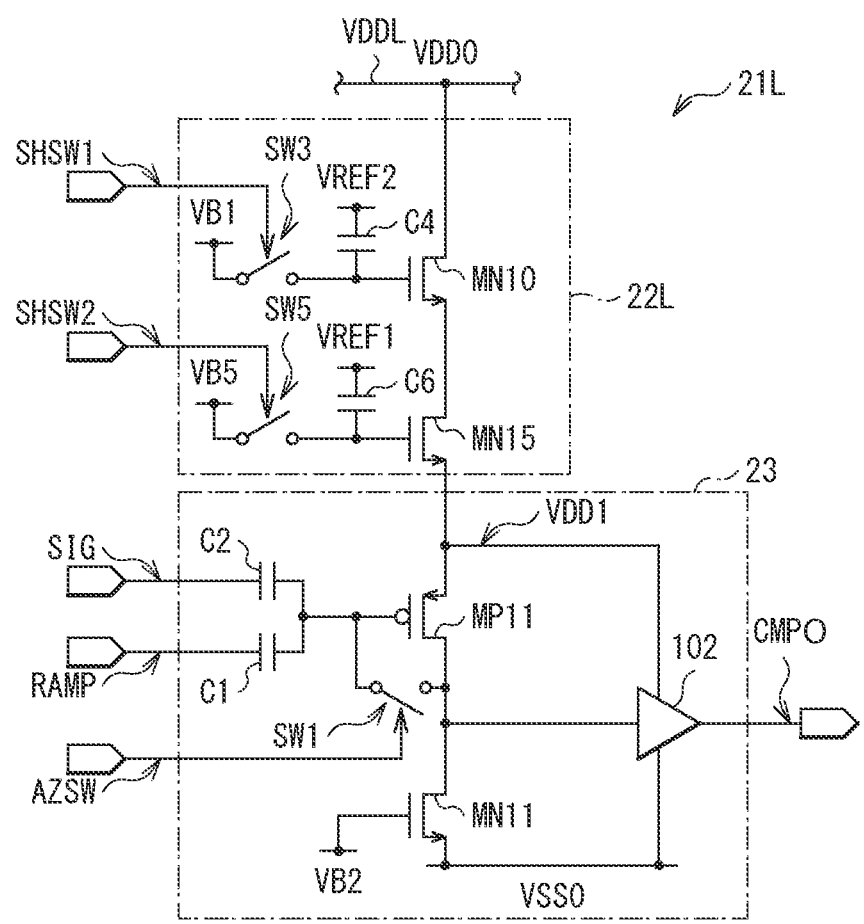

[ FIG. 17 ]
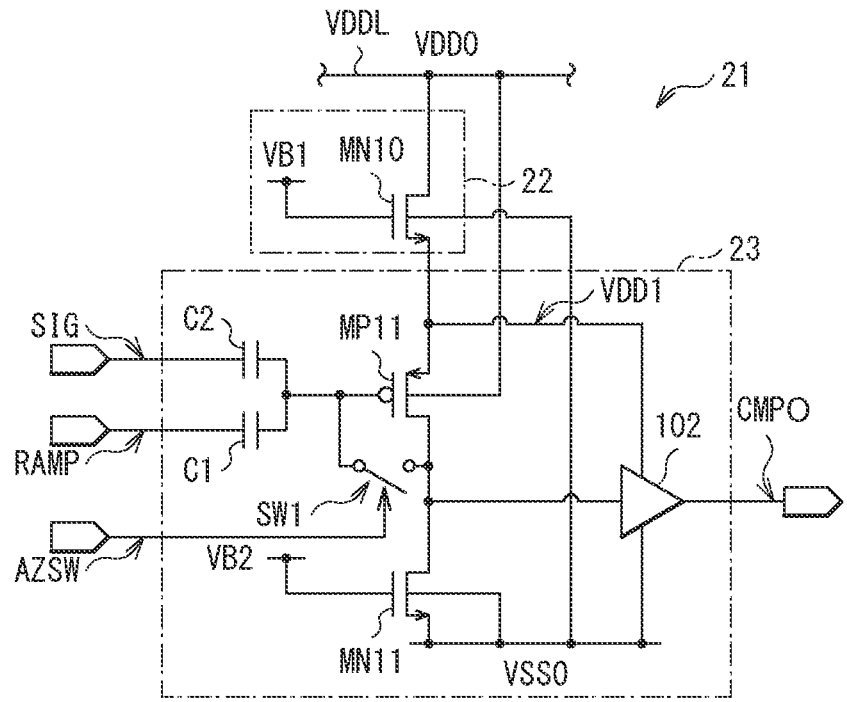
[ FIG. 18 ]
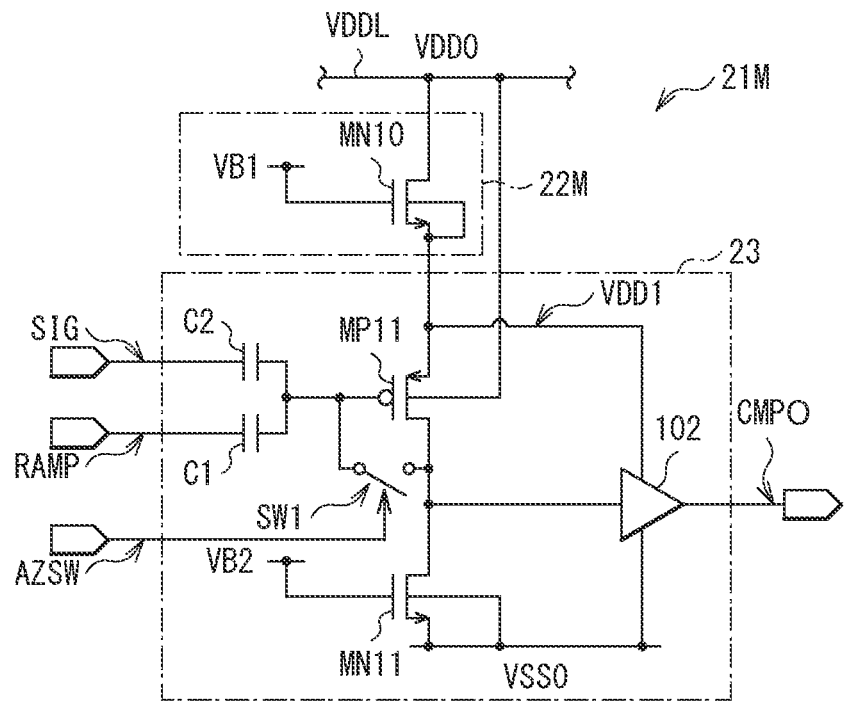

[ FIG. 19 ]
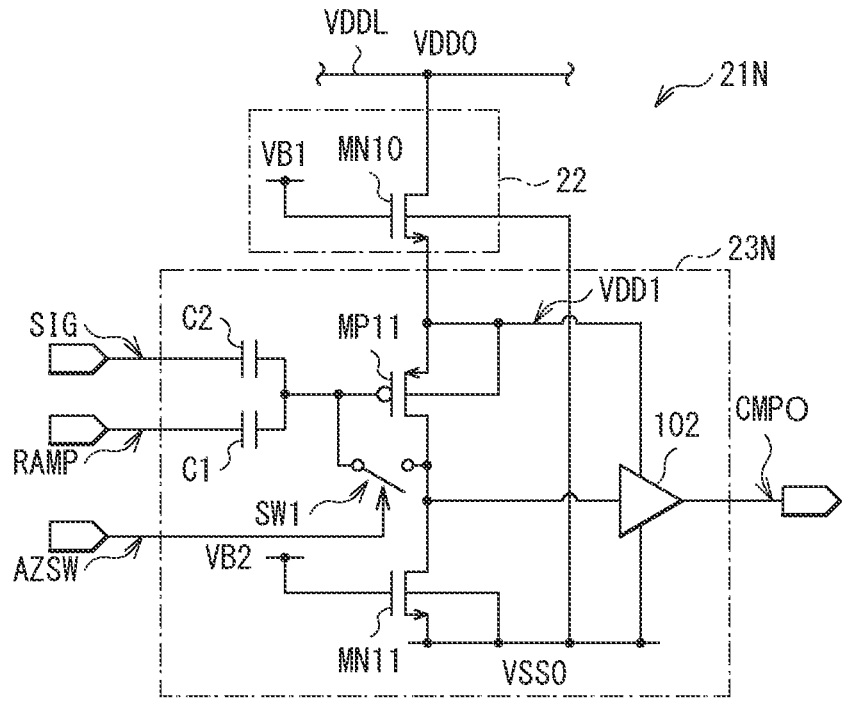
[ FIG. 20 ]
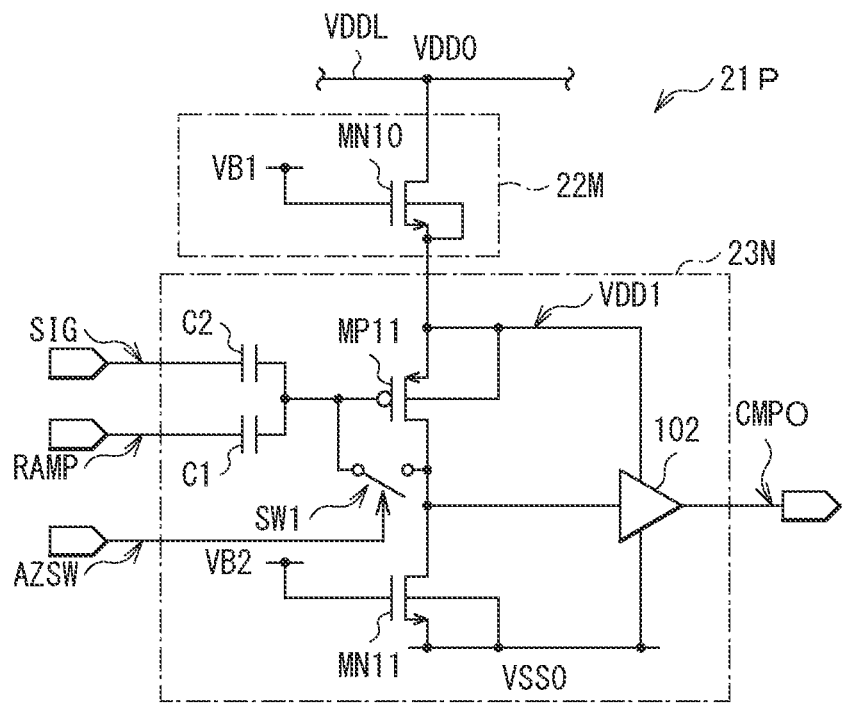

[FIG. 30A]
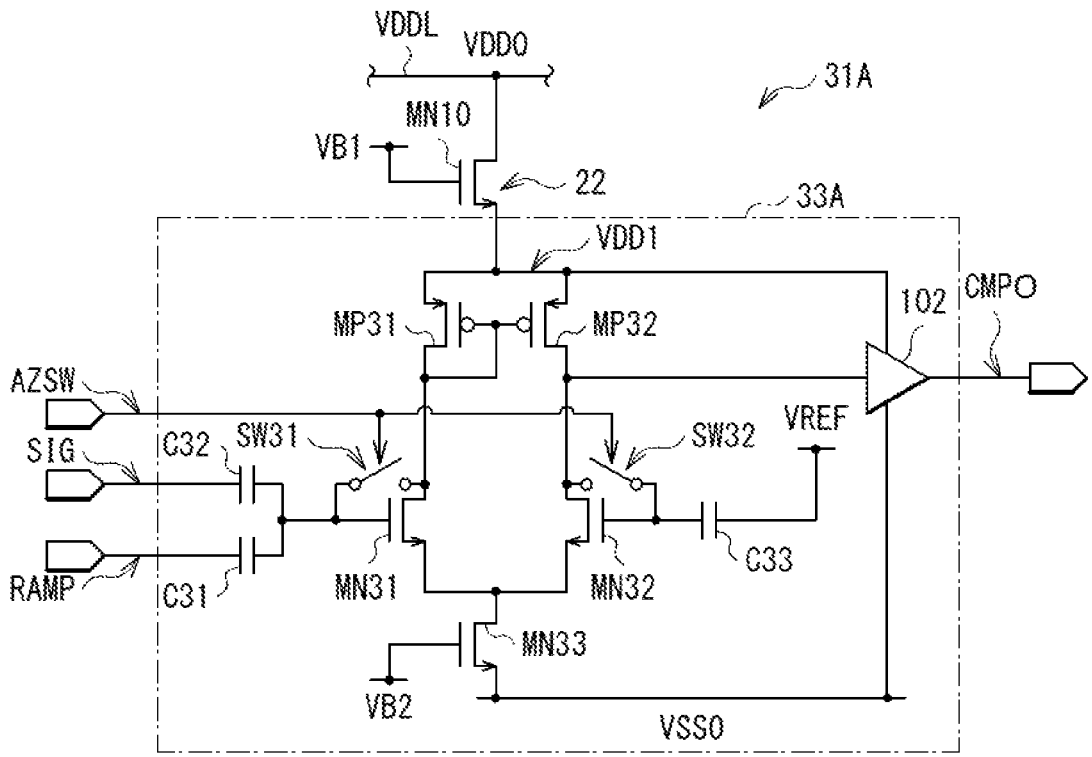
[FIG. 30B]
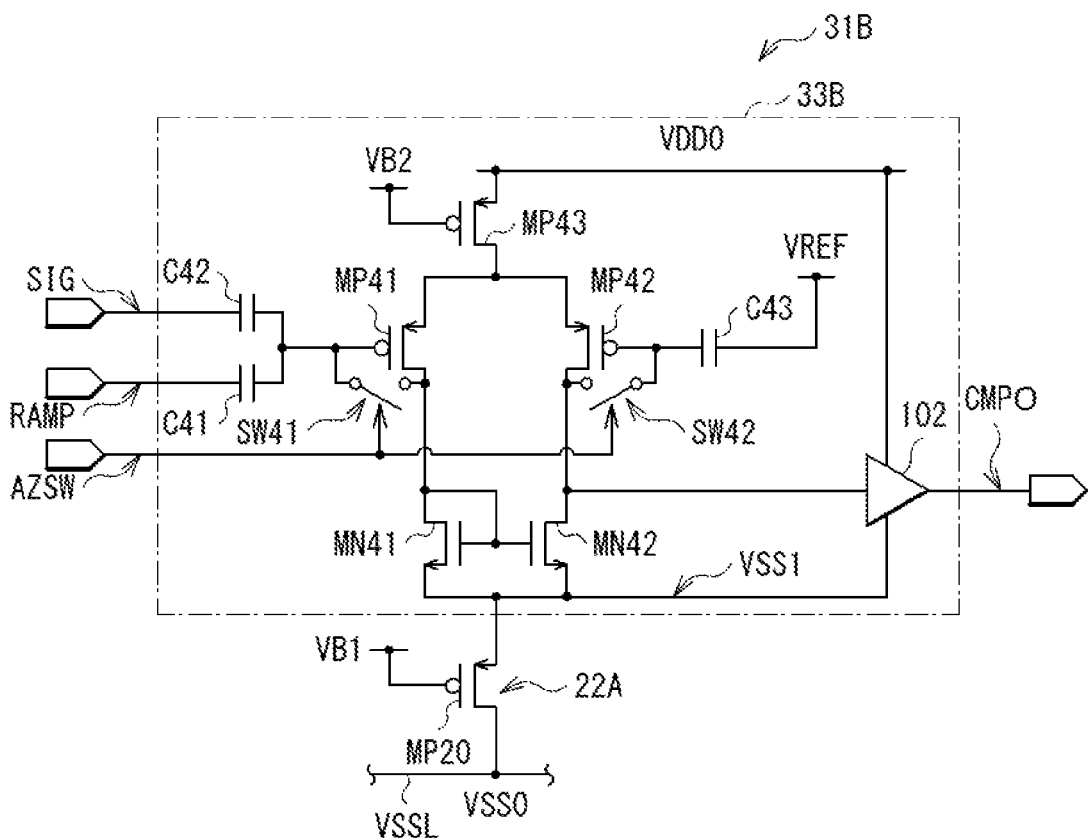

[ FIG. 31A ]
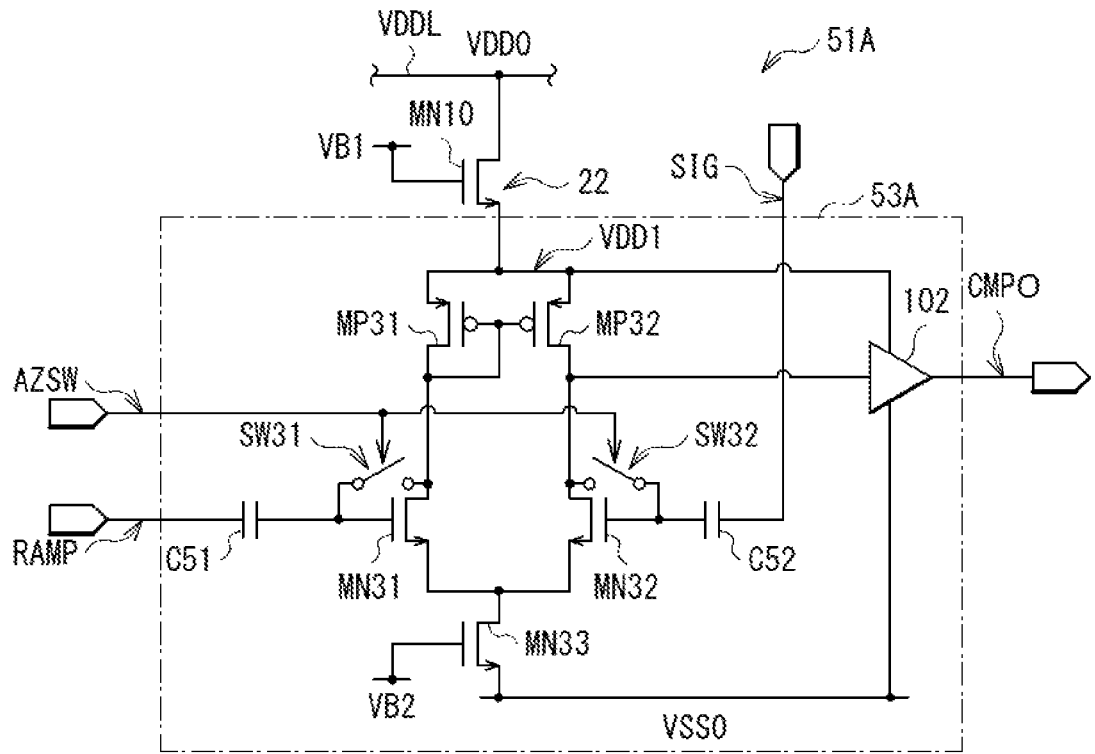
[ FIG. 31B ]
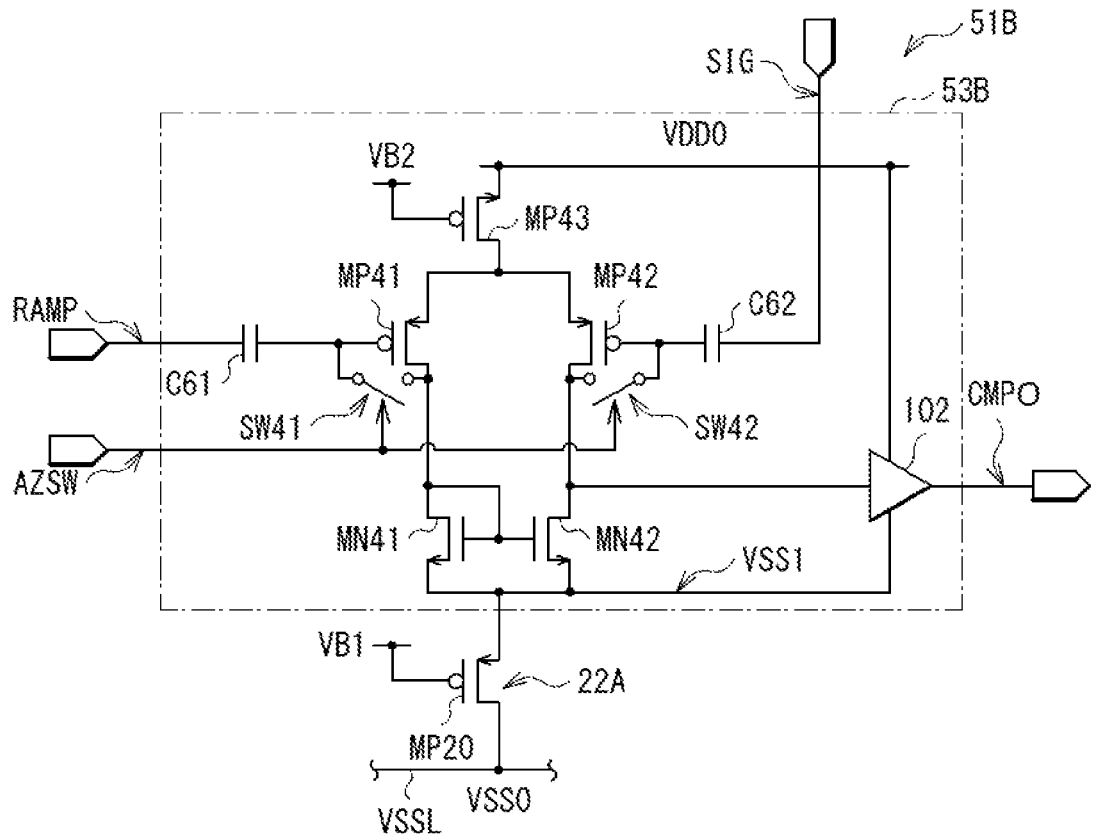

[ FIG. 37 ]
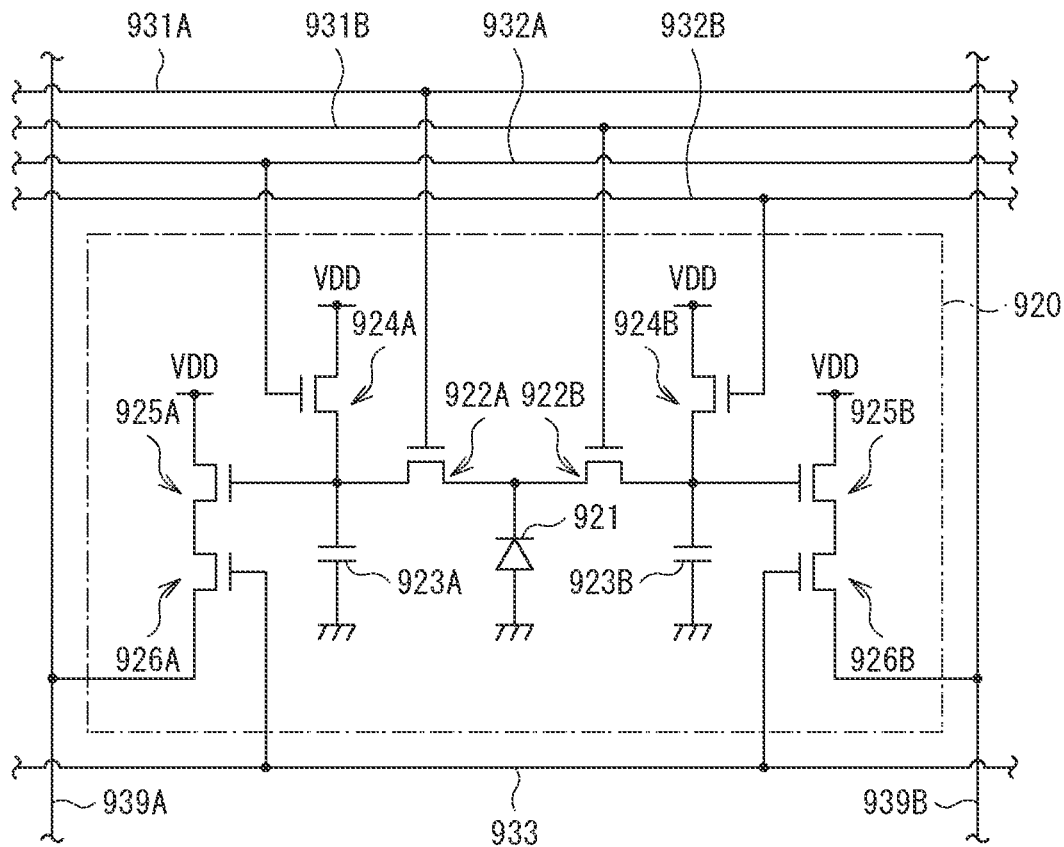
[ FIG. 38 ]
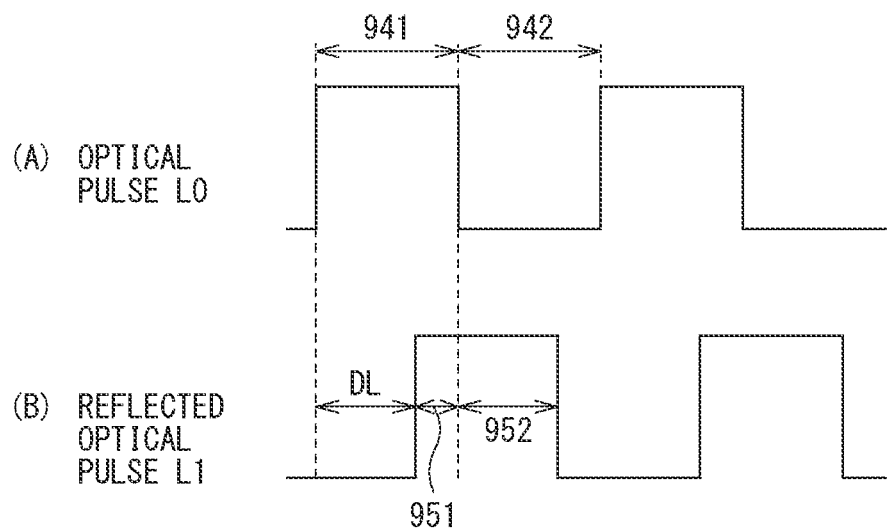
(A) OPTICAL PULSE L0
(B) REFLECTED OPTICAL PULSE L1

PHOTODETECTION DEVICE AND ELECTRONIC APPARATUS

TECHNICAL FIELD

The present disclosure relates to a photodetection device that is able to detect light, and an electronic apparatus including such a photodetection device.

BACKGROUND ART

In a photodetection device, frequently, a pixel generates a pixel signal corresponding to an amount of received light, and an AD (Analog to Digital) conversion circuit converts the pixel signal into a digital code. For example, PTL 1 discloses an imaging device that performs AD conversion on the basis of a signal having a ramp waveform, and a pixel signal.

CITATION LIST

Patent Literature

PTL 1: Japanese Unexamined Patent Application Publication No. 2007-19682

SUMMARY OF THE INVENTION

Incidentally, in a photodetection device, high image quality is desired, and further improvement in image quality is expected.

It is desirable to provide a photodetection device and an electronic apparatus that makes it possible to enhance image quality.

A photodetection device according to an embodiment of the present disclosure includes a first pixel, a reference signal generator, and a first comparator. The first pixel is configured to be able to generate a first pixel signal. The reference signal generator is configured to be able to generate a reference signal. The first comparator includes a first power supply circuit and a first comparison circuit. The first power supply circuit is able to generate a first power supply voltage on the basis of a power supply voltage supplied from a first power supply node and a bias voltage and is able to output the first power supply voltage from an output terminal. The first comparison circuit is operable on the basis of the first power supply voltage and is able to perform a comparison operation on the basis of the first pixel signal and the reference signal.

An electronic apparatus according to an embodiment of the present disclosure includes the photodetection device described above, and corresponds to, for example, a smartphone, a digital camera, a video camera, a notebook personal computer, or the like.

In the photodetection device and the electronic apparatus according to the embodiments of the present disclosure, the first pixel generates the first pixel signal, and the reference signal generator generates the reference signal. The first power supply circuit generates the first power supply voltage on the basis of the power supply voltage supplied from the first power supply node and the bias voltage. Then, the comparison operation is performed by the first comparison circuit that is operable on the basis of the first power supply voltage on the basis of the first pixel signal and the first signal.

BRIEF DESCRIPTION OF DRAWINGS

FIG. 4A is a circuit diagram illustrating a configuration example of a comparator illustrated in FIG. 3.

FIG. 4B is a circuit diagram illustrating another configuration example of the comparator illustrated in FIG. 3.

FIG. 10A is a circuit diagram illustrating a configuration example of a comparator according to a modification example.

FIG. 10B is a circuit diagram illustrating a configuration example of a comparator according to another modification example.

FIG. 11A is a circuit diagram illustrating a configuration example of a comparator according to another modification example.

FIG. 11B is a circuit diagram illustrating a configuration example of a comparator according to another modification example.

FIG. 12A is a circuit diagram illustrating a configuration example of a comparator according to another modification example.

FIG. 12B is a circuit diagram illustrating a configuration example of a comparator according to another modification example.

FIG. 13 is a circuit diagram illustrating a configuration example of a comparator according to another modification example.

FIG. 14 is a circuit diagram illustrating a configuration example of a comparator according to another modification example.

FIG. 15 is a circuit diagram illustrating a configuration example of a comparator according to another modification example.

FIG. 16 is a circuit diagram illustrating a configuration example of a comparator according to another modification example.

FIG. 17 is a circuit diagram illustrating a configuration example of a comparator according to another modification example.

FIG. 18 is a circuit diagram illustrating a configuration example of a comparator according to another modification example.

FIG. 19 is a circuit diagram illustrating a configuration example of a comparator according to another modification example.

FIG. 20 is a circuit diagram illustrating a configuration example of a comparator according to another modification example.

FIG. 30A is a circuit diagram illustrating a configuration example of a comparator according to another modification example.

FIG. 30B is a circuit diagram illustrating a configuration example of a comparator according to another modification example.

FIG. 31A is a circuit diagram illustrating a configuration example of a comparator according to another modification example.

FIG. 31B is a circuit diagram illustrating a configuration example of a comparator according to another modification example.

FIG. 37 is a circuit diagram illustrating a configuration example of a pixel illustrated in FIG. 36.

FIG. 38 is a waveform diagram illustrating an operation example of the distance measuring device illustrated in FIG. 35.

MODES FOR CARRYING OUT THE INVENTION

Hereinafter, some embodiments of the present disclosure are described in detail with reference to the drawings. It is to be noted that description is given in the following order.
1. Embodiment
2. Usage Examples of Imaging Device
3. Application Example to Mobile Body
4. Application Example to Distance Measuring Device

1. Embodiment

Configuration Example

Figure 1:
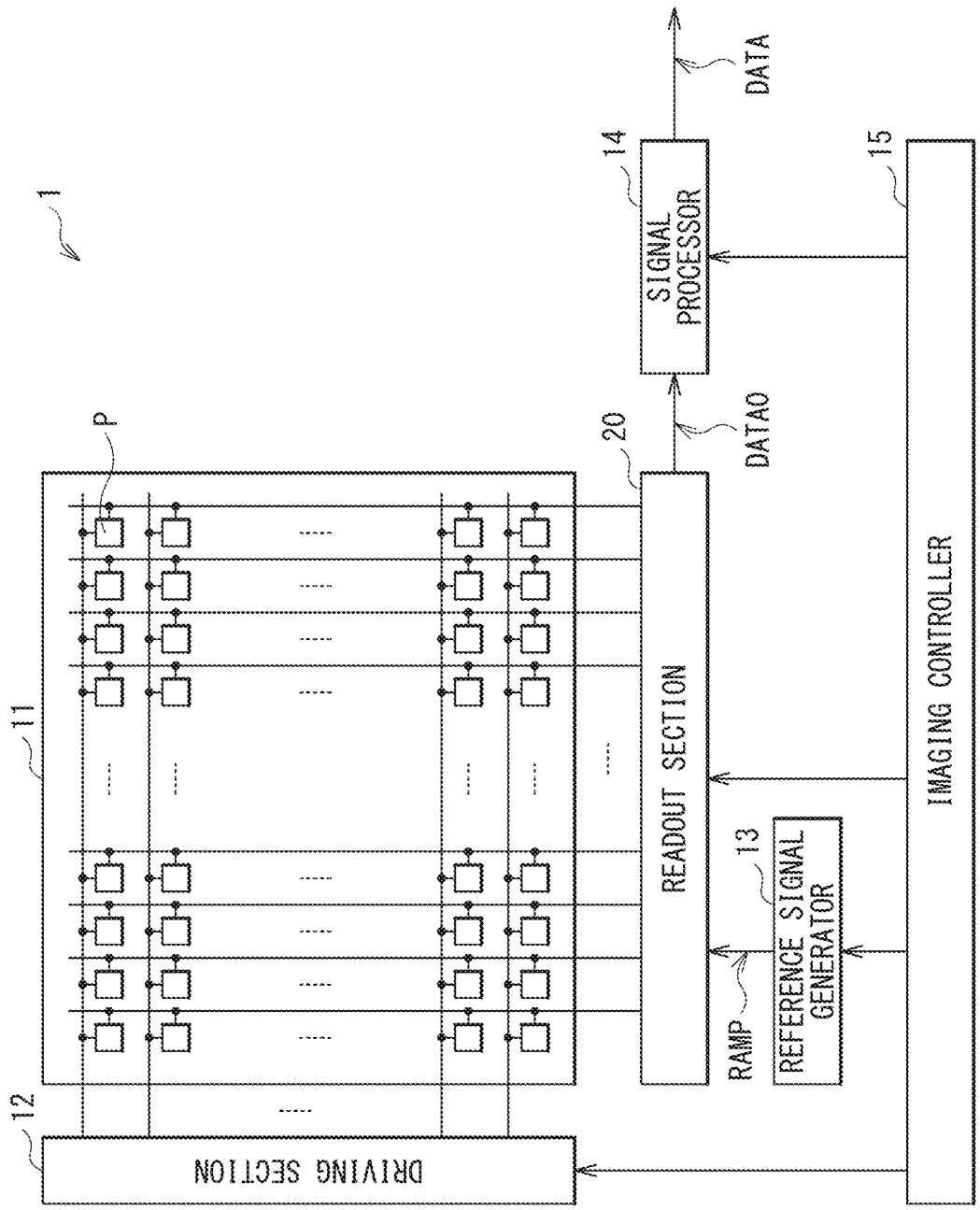
FIG. 1 is a block diagram illustrating a configuration example of an imaging device according to an embodiment of the present disclosure.

FIG. 1 illustrates a configuration example of an imaging device 1 to which a photodetection device according to an embodiment is applied. The imaging device 1 includes a pixel array 11, a driving section 12, a reference signal generator 13, a readout section 20, a signal processor 14, and an imaging controller 15.

The pixel array 11 includes a plurality of pixels P arranged in a matrix. The pixels P each are configured to generate a pixel voltage Vpix corresponding to an amount of received light.

Figure 2:
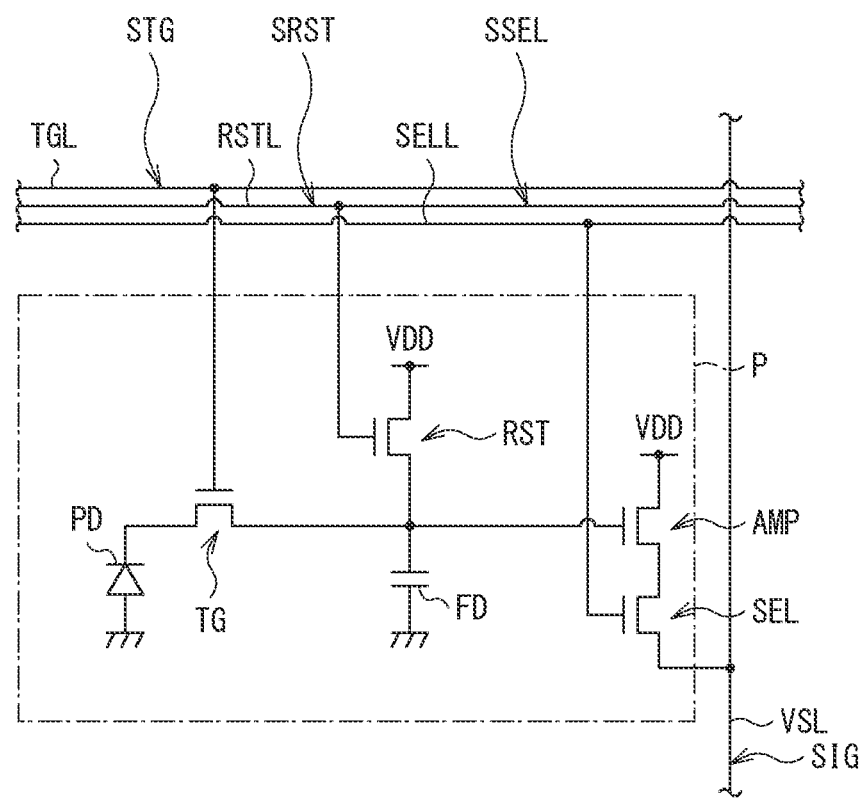
FIG. 2 is a circuit diagram illustrating a configuration example of a pixel illustrated in FIG. 1.

FIG. 2 illustrates a configuration example of the pixel P. The pixel array 11 includes a plurality of control lines TGL, a plurality of control lines RSTL, a plurality of control lines SELL, and a plurality of signal lines VSL. The control lines TGL each extend in a horizontal direction (a lateral direction in FIG. 2), and have one end coupled to the driving section 12. The control lines TGL are supplied with a control signal STG by the driving section 12. The control lines RSTL each extend in the horizontal direction, and have one end coupled to the driving section 12. The control lines RSTL are supplied with a control signal SRST by the driving section 12. The control lines SELL each extend in the horizontal direction, and have one end coupled to the driving section 12. The control lines SELL are supplied with a control signal SSEL by the driving section 12. The signal lines VSL each extend in a vertical direction (a longitudinal direction in FIG. 2), and have one end coupled to the readout section 20. The signal lines VSL each transmit a signal SIG generated by the pixel to the readout section 20. One row of a plurality of pixels P arranged side by side in the horizontal direction (the lateral direction in FIGS. 1 and 2) configures a pixel line L.

The pixels P each include a photodiode PD, a transistor TG, a floating diffusion FD, and transistors RST, AMP, and SEL. The transistors TG, RST, AMP, and SEL in this example are N-type MOS (Metal Oxide Semiconductor) transistors.

The photodiode PD is a photoelectric converter that generates electric charges in an amount corresponding to the amount of received light and accumulates the electric charges therein. The photodiode PD has an anode grounded, and a cathode coupled to a source of the transistor TG.

The transistor TG has a gate coupled to the control line TGL, the source coupled to the cathode of the photodiode PD, and a drain coupled to the floating diffusion FD.

The floating diffusion FD is configured to accumulate electric charges transferred from the photodiode PD via the transistor TG. The floating diffusion FD is configured by using a diffusion layer formed on a front surface of a semiconductor substrate, for example. In FIG. 2, the floating diffusion FD is illustrated with use of the symbol of a capacitor.

The transistor RST has a gate coupled to the control line RSTL, a drain supplied with a power supply voltage VDD, and a source coupled to the floating diffusion FD.

The transistor AMP has a gate coupled to the floating diffusion FD, a drain supplied with the power supply voltage VDD, and a source coupled to a drain of the transistor SEL.

The transistor SEL has a gate coupled to the control line SELL, the drain coupled to the source of the transistor AMP, and a source coupled to the signal line VSL.

With this configuration, in the pixel P, the transistor SEL is turned on the basis of the control signal SSEL supplied to the control line SELL, thereby electrically coupling the pixel P to the signal line VSL. This causes the transistor AMP to be coupled to a constant current source CS (to be described later) of the readout section 20 and operate as a so-called source follower. Then, the pixel P outputs, to the signal line VSL, the signal SIG including a voltage corresponding to a voltage at the floating diffusion FD. Specifically, as described later, the pixel P outputs a reset voltage Vreset in a P-phase period TP of two periods (the P-phase period TP and a D-phase period TD) in which the readout section 20 performs AD conversion, and outputs a pixel voltage Vpix corresponding to the amount of received light in the D-phase period TD. The pixel P outputs the signal SIG including the reset voltage Vreset and the pixel voltage Vpix to the signal line VSL.

The driving section 12 (FIG. 1) is configured to sequentially drive the plurality of pixels P in the pixel array 11 in units of pixel lines L on the basis of an instruction from the imaging controller 15. Specifically, the driving section 12 supplies each of a plurality of control signals STG to a corresponding one of the plurality of control lines TGL in the pixel array 11, supplies each of a plurality of control signals SRST to a corresponding one of the plurality of control lines RSTL, and supplies each of a plurality of control signals SSEL to a corresponding one of the plurality of control lines SELL, thereby driving the plurality of pixels P in the pixel array 11 in units of the pixel lines L.

The reference signal generator 13 is configured to generate a reference signal RAMP on the basis of an instruction from the imaging controller 15. The reference signal RAMP has a so-called ramp waveform in which a voltage level is gradually changed with the lapse of time in the two periods (the P-phase period TP and the D-phase period TD) in which the readout section 20 performs AD conversion. The reference signal generator 13 supplies the readout section 20 with the reference signal RAMP.

The readout section 20 is configured to generate an image signal DATA0 on the basis of an instruction from the imaging controller 15 by performing AD conversion on the basis of the signals SIG supplied from the pixel array 11 via the signal lines VSL.

Figure 3:
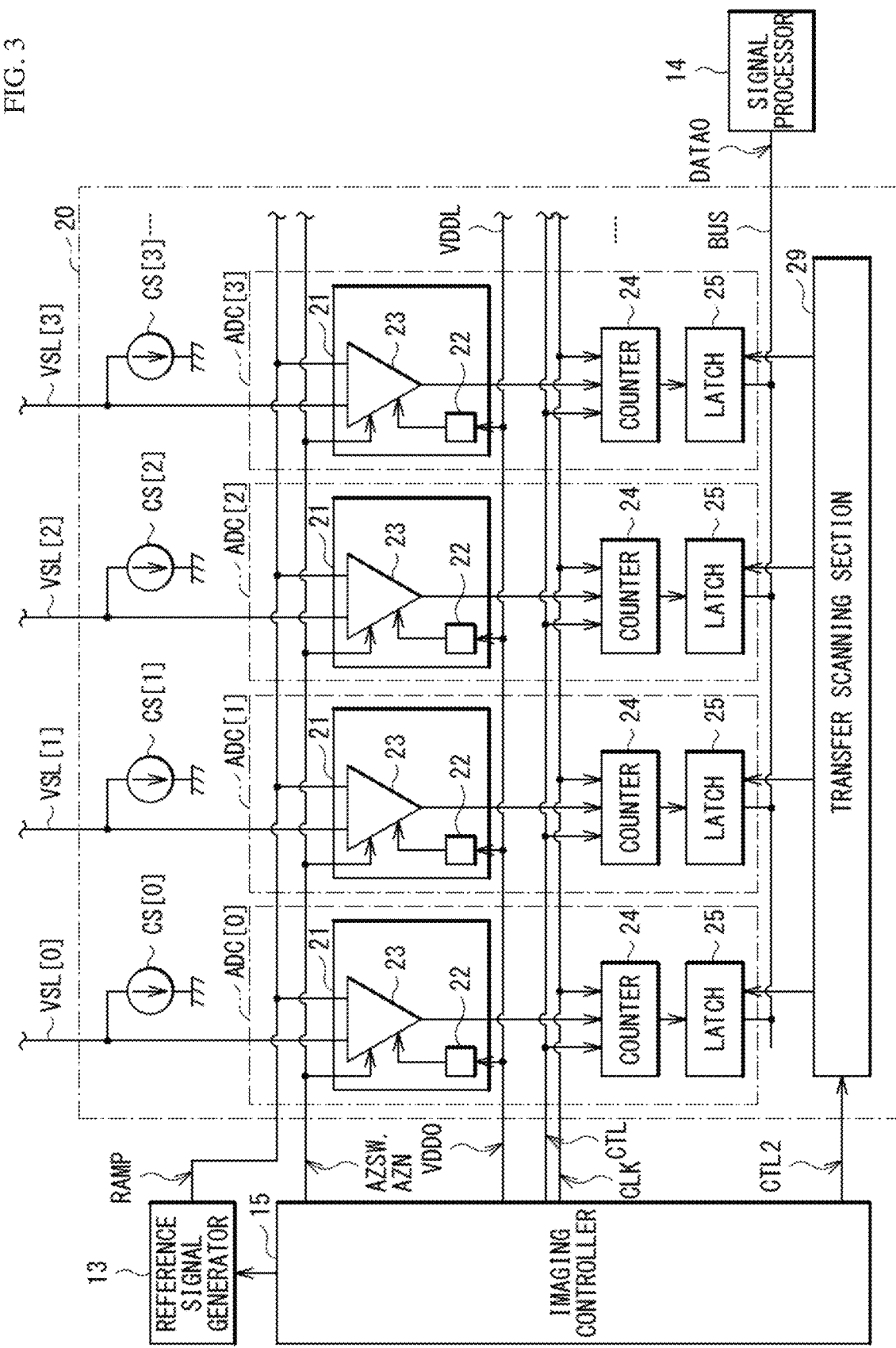
FIG. 3 is a block diagram illustrating a configuration example of a readout section illustrated in FIG. 1.

FIG. 3 illustrates a configuration example of the readout section 20. It is to be noted that FIG. 3 illustrates the reference signal generator 13, the signal processor 14, and the imaging controller 15 in addition to the readout section 20. The readout section 20 includes a plurality of constant current sources CS (constant current sources CS[0], CS[1], CS[2], CS[2], . . . ), a plurality of AD converters ADC (AD converters ADC[0], ADC[1]. ADC[2], ADC[3], . . . ), and a transfer scanning section 29.

The plurality of constant current sources CS is provided in association with the plurality of signal lines VSL. Specifically, the 0th constant current source CS[0] is provided in association with a 0th signal line VSL[0], the first constant current source CS[1] is provided in association with a first signal line VSL[1], the second constant current source CS[2] is provided in association with a second signal line VSL[2], and the third constant current source CS[3] is provided in association with a third signal line VSL[3]. The same applies to fourth and subsequent constant current sources CS. The constant current sources CS each have one end coupled to a corresponding signal line VSL, and another end grounded. Each of the plurality of constant current sources CS is configured to apply a predetermined current to a corresponding signal line VSL.

The plurality of AD converters ADC is provided in association with the plurality of signal lines VSL. Specifically, the 0th AD converter ADC[0] is provided in association with the 0th signal line VSL[0], the first AD converter ADC[1] is provided in association with the first signal line VSL[1], the second AD converter ADC[2] is provided in association with the second signal line VSL[2], and the third AD converter ADC[3] is provided in association with the third signal line VSL[3]. The same applies to fourth and subsequent AD converters ADC. Each of the plurality of AD converters ADC is configured to convert a voltage of the signal SIG into a digital code CODE by performing AD conversion on the basis of the signal SIG supplied from the pixel array 11. The AD converters ADC each include a comparator 21, a counter 24, and a latch 25.

The comparator 21 is configured to generate a signal CMPO by performing a comparison operation on the basis of the reference signal RAMP supplied from the reference signal generator 13 and the signal SIG supplied from the pixel P via the signal line VSL. The comparator 21 sets an operation point on the basis of control signals AZSW and AXN supplied from the imaging controller 15, and thereafter performs a comparison operation. The comparator 21 includes a power supply circuit 22 and a comparison circuit 23.

FIG. 4A illustrates a configuration example of the comparator 21. The comparator 21 is supplied with a power supply voltage VDD0, a ground voltage VSS0, and bias voltages VB1 and VB2. The power supply voltage VDD0 is supplied from the imaging controller 15 via a power supply line VDDL. The power supply circuit 22 of the comparator 21 includes a transistor MN10. The comparison circuit 23 of the comparator 21 includes capacitors C1 and C2, transistors MP11, MN11, MP12, and MN12, switches SW1 and SW2, and a capacitor C3. The transistors MP11 and MP12 are P-type MOS transistors, and the transistors MN10 to MN12 are N-type MOS transistors. Although not illustrated, in this example, back gates of the transistors MP11 and MP12 are supplied with the power supply voltage VDD0, and back gates of the transistors MN10 to MN12 are supplied with the ground voltage VSS0.

The transistor MN10 has a gate supplied with the bias voltage VB1, a drain coupled to the power supply line VDDL, and a source coupled to sources of the transistors MP11 and MP12. The transistor MN10 operates as a so-called source follower, thereby outputting the power supply voltage VDD1 from the source.

The capacitors C1 and C2 each have one end (a terminal T1) and another end (a terminal T2). The capacitor C1 has the one end coupled to the reference signal generator 13 and the other end coupled to the other end of the capacitor C2, a gate of the transistor MP11, and one end of the switch SW1. The one end of the capacitor C1 is supplied with the reference signal RAMP generated by the reference signal generator 13. The capacitor C2 has the one end coupled to the signal line VSL, and the other end coupled to the other end of the capacitor C1, the gate of the transistor MP11, and the one end of the switch SW1. The one end of the capacitor C2 is supplied with the signal SIG generated by the pixel P.

The transistor MP11 has the gate coupled to the other ends of the capacitors C1 and C2 and the one end of the switch SW1, a drain coupled to a drain of the transistor MN11, a gate of the transistor MP12, and another end of the switch SW1, and the source coupled to the sources of the transistors MN10 and MP12. The transistor MN11 has a gate supplied with the bias voltage VB2, the drain coupled to the drain of the transistor MP11, the gate of the transistor MP12, and the other end of the switch SW1, and a source supplied with the ground voltage VSS0. The transistor MN11 is a load of the transistor MP11, and operates as a constant current source. The switch SW1 is configured to be turned on and off on the basis of the control signal AZSW, and has the one end coupled to the other ends of the capacitors C1 and C2 and the gate of the transistor MP11, and the other end coupled to the drains of the transistors MP11 and MN11 and the gate of the transistor MP12. The transistors MP11 and MN11, and the switch SW1 are included in an initial-stage circuit 101 of the comparison circuit 23.

The transistor MP12 has the gate coupled to the drains of the transistors MP11 and MN11 and the other end of the switch SW1, a drain coupled to a drain of the transistor MN12 and one end of the switch SW2, and the source coupled to the sources of the transistors MN10 and MP11. The transistor MN12 has a gate coupled to one end of the capacitor C3 and another end of the switch SW2, the drain coupled to the drain of the transistor MP12 and the one end of the switch SW2, and a source supplied with the ground voltage VSS0. The switch SW2 is configured to be turned on and off on the basis of the control signal AZN, and has the one end coupled to the drains of the transistors MP12 and MN12, and the other end coupled to the gate of the transistor MN12 and the one end of the capacitor C3. The capacitor C3 has the one end coupled to the gate of the transistor MN12 and the other end of the switch SW2, and another end supplied with the ground voltage VSS0. It is to be noted that the capacitor C3 may be configured by using a MOS capacitor or the like, or may be configured by using a parasitic capacitance at the gate of the transistor MN12, a parasitic capacitance at the switch SW2, a parasitic capacitance at a wiring line, or the like, for example. The transistors MP12 and MN12, the switch SW2, and the capacitor C3 are included in a post-stage circuit 102 of the comparison circuit 23.

With this configuration, in the comparator 21, the power supply circuit 22 generates the power supply voltage VDD1, and the comparison circuit 23 operates on the basis of the power supply voltage VDD1, thereby performing a comparison operation on the basis of the signal SIG and the reference signal RAMP. Specifically, a current generated by the transistor MN11 that operates as a constant current source flows through the transistor MN10, and the transistor MN10 operates as a so-called source follower. Thus, the power supply circuit 22 generates the power supply voltage VDD1. In the comparison circuit 23, as described later, the operation point is set by turning on the switches SW1 and SW2. Then, the comparison circuit 23 performs a comparison operation on the basis of the reference signal RAMP and the reset voltage Vreset included in the signal SIG in the P-phase period TP, and performs a comparison operation on the basis of the reference signal RAMP and the pixel voltage Vpix included in the signal SIG in the D-phase period TD.

It is to be noted that in this example, the comparator 21 is configured as illustrated in FIG. 4A, but this is not limitative. The comparator 21 may be configured like a comparator 21A illustrated in FIG. 4B. In this example, the ground voltage VSS0 is supplied from the imaging controller 15 via a ground line VSSL. The comparator 21A includes a power supply circuit 22A and a comparison circuit 23A. The power supply circuit 22A includes a transistor MP20. The comparison circuit 23A includes capacitors C11 and C12, transistors MN21, MP21, MN22, and MP22, switches SW11 and SW12, and a capacitor C13. The transistors MP20 to MP22 are P-type MOS transistors, and the transistors MN21 and MN22 are N-type MOS transistors.

The transistor MP20 has a gate supplied with the bias voltage VB1, a drain coupled to the ground line VSSL, and a source coupled to sources of the transistors MN21 and MN22. The transistor MP20 operates as a so-called source follower, thereby outputting the ground voltage VSS1 from the source.

The capacitors C1 and C12 each has one end and another end. The capacitor C11 has the one end coupled to the reference signal generator 13, and the other end coupled to the other end of the capacitor C12, a gate of the transistor MN21, and one end of the switch SW11. The one end of the capacitor C11 is supplied with the reference signal RAMP generated by the reference signal generator 13. The capacitor C12 has the one end coupled to the signal line VSL, and the other end coupled to the other end of the capacitor C11, the gate of the transistor MN21, and the one end of the switch SW11. The one end of the capacitor C12 is supplied with the signal SIG generated by the pixel P.

The transistor MN21 has the gate coupled to the other ends of the capacitors C11 and C12 and the one end of the switch SW11, and a drain coupled to a drain of the transistor MP21, a gate of the transistor MN22, and another end of the switch SW11, and the source coupled to the sources of the transistors MP20 and MN22. The transistor MP21 has a gate supplied with the bias voltage VB2, the drain coupled to the drain of the transistor MN21, the gate of the transistor MN22, and the other end of the switch SW11, and a source supplied with the power supply voltage VDD0. The transistor MP21 is a load of the transistor MN21, and operates as a constant current source. The switch SW11 is configured to be turned on and off on the basis of the control signal AZSW, and has the one end coupled to the other ends of the capacitors C11 and C12 and the gate of the transistor MN21, and the other end coupled to the drains of the transistors MN21 and MP21 and the gate of the transistor MN22. The transistors MN21 and MP21 and the switch SW11 are included in the initial-stage circuit 101 of the comparison circuit 23A.

The transistor MN22 has the gate coupled to the drains of the transistors MN21 and MP21 and the other end of the switch SW11, a drain coupled to a drain of the transistor MP22 and one end of the switch SW12, and the source coupled to the sources of the transistors MP20 and MN21. The transistor MP22 has a gate coupled to one end of the capacitor C13 and another end of the switch SW12, the drain coupled to the drain of the transistor MN22 and the one end of the switch SW12, and a source supplied with the power supply voltage VDD0. The switch SW12 is configured to be turned on and off on the basis of the control signal AZN, and has the one end coupled to the drains of the transistors MN22 and MP22, and the other end coupled to the gate of the transistor MP22 and the one end of the capacitor C13. The capacitor C13 has the one end coupled to the gate of the transistor MP22 and the other end of the switch SW12, and another end supplied with the power supply voltage VDD0. The transistors MN22 and MP22, the switch SW12, and the capacitor C13 are included in the post-stage circuit 102 of the comparison circuit 23A.

Figure 5:
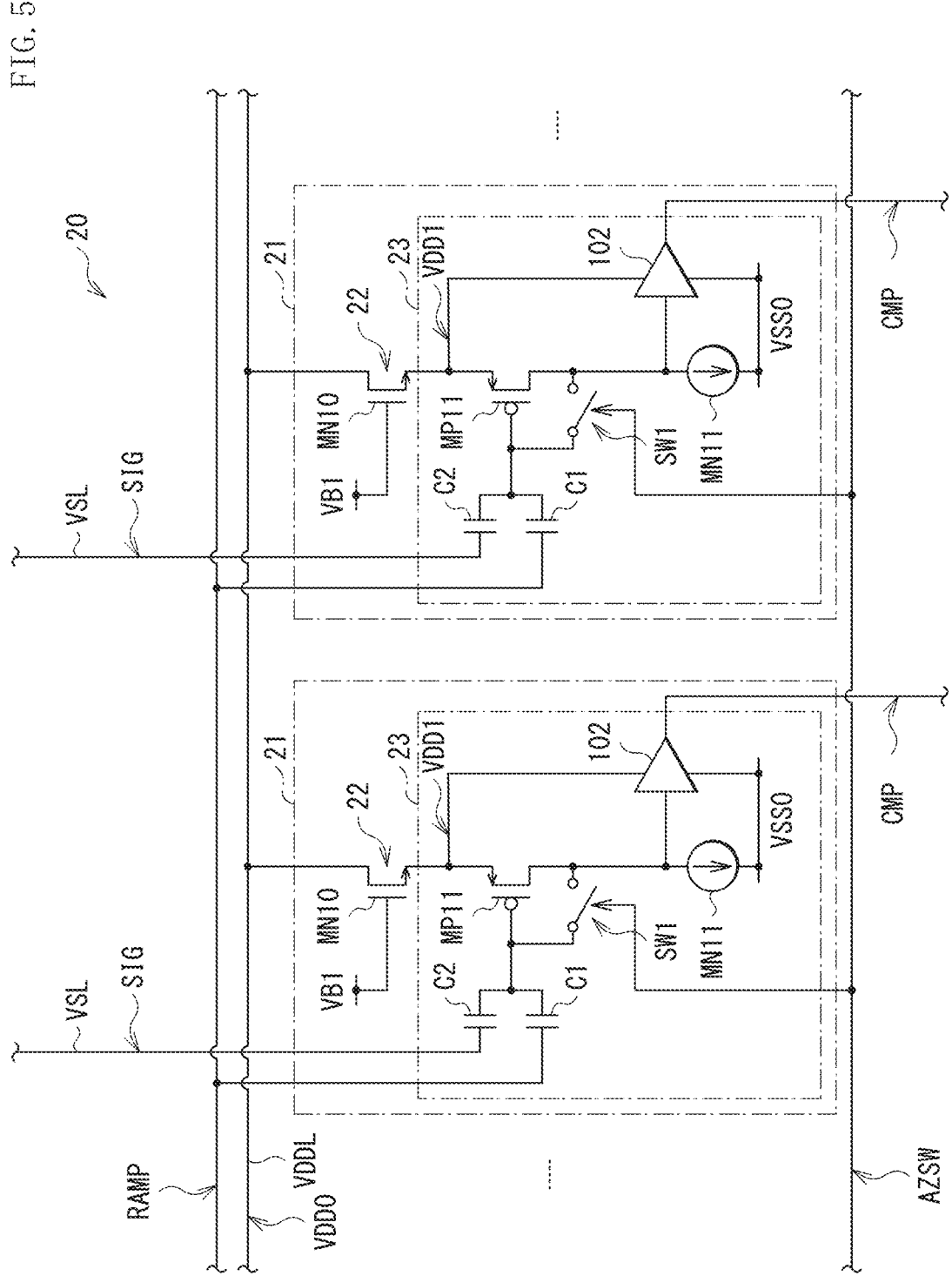
FIG. 5 is a circuit diagram illustrating a configuration example of the readout section illustrated in FIG. 3.

FIG. 5 illustrates a coupling example of the power supply line VDDL and a plurality of comparators 21. It is to be noted that in this drawing, the transistor MN11 of the comparison circuit 23 is illustrated with use of the symbol of a constant current source, and the post-stage circuit 102 (the transistors MP12 and MN12, the switch SW2, and the capacitor C3) of the comparison circuit 23 is illustrated with use of the symbol of an amplifier circuit.

As illustrated in FIGS. 3 and 5, the imaging controller 15 supplies the power supply voltage VDD0 to the plurality of comparators 21 via the power supply line VDDL. In each of the plurality of comparators 21, the power supply circuit 22 (the transistor MN10) generates the power supply voltage VDD1 on the basis of the power supply voltage VDD0, and supplies the generated power supply voltage VDD1 to the comparison circuit 23. Then, the comparison circuit 23 performs a comparison operation on the basis of the reference signal RAMP and the signal SIG to generate the signal CMPO.

The counter 24 (FIG. 3) is configured to perform a counting operation on the basis of the signal CMPO supplied from the comparator 21 and the control signal CTL supplied from the imaging controller 15. In the counting operation, pulses of a clock signal CLK supplied from the imaging controller 15 are counted.

The latch 25 is configured to generate the digital code CODE on the basis of a count value obtained by the counter 24 and hold the digital code CODE. Specifically, the latch 25 generates the digital code CODE corresponding to a difference (CNTD−CNTP) between a count value CNTP obtained by the counter 24 in the P-phase period TP and a count value CNTD obtained by the counter 24 in the D-phase period TD. Then, the latch 25 outputs the digital code CODE to a bus wiring line BUS on the basis of a control signal supplied from the transfer scanning section 29.

The transfer scanning section 29 is configured to perform control on the basis of a control signal CTL2 supplied from the imaging controller 15 to cause the latches 25 of the plurality of AD converters ADC to sequentially output the digital codes CODE to the bus wiring line BUS. The readout section 20 sequentially transfers, to the signal processor 14, a plurality of digital codes CODE supplied from the plurality of AD converter ADC as the image signal DATA0 with use of the bus wiring line BUS.

The signal processor 14 (FIG. 1) is configured to generate an image signal DATA on the basis of an instruction from the imaging controller 15 by performing predetermined signal processing on the image signal DATA0, and output the image signal DATA.

The imaging controller 15 is configured to supply a control signal to the driving section 12, the reference signal generator 13, the readout section 20, and the signal processor 14, and control operations of these circuits, thereby controlling an operation of the imaging device 1. Specifically, the imaging controller 15 supplies a control signal to the driving section 12, thereby performing control to cause the driving section 12 to sequentially drive the plurality of pixels P in the pixel array 11 in units of the pixel lines L. In addition, the imaging controller 15 supplies a control signal to the reference signal generator 13, thereby performing control to cause the reference signal generator 13 to generate the reference signal RAMP. In addition, the imaging controller 15 supplies the power supply voltage VDD0 and the bias voltages VB1 and VB2 to the readout section 20, and supplies the control signals AZSW, AZN, CTL, and CTL2, and the clock signal CLK to the readout section 20, thereby performing control to cause the readout section 20 to generate the image signal DATA0 by performing AD conversion on the basis of the signal SIG. In addition, the imaging controller 15 controls the operation of the signal processor 14 by supplying a control signal to the signal processor 14.

Next, description is given of implementation of the imaging device 1. In the imaging device 1, for example, each of the blocks illustrated in FIG. 1 may be formed in one semiconductor substrate, or may be formed in a plurality of semiconductor substrates.

Figure 6:
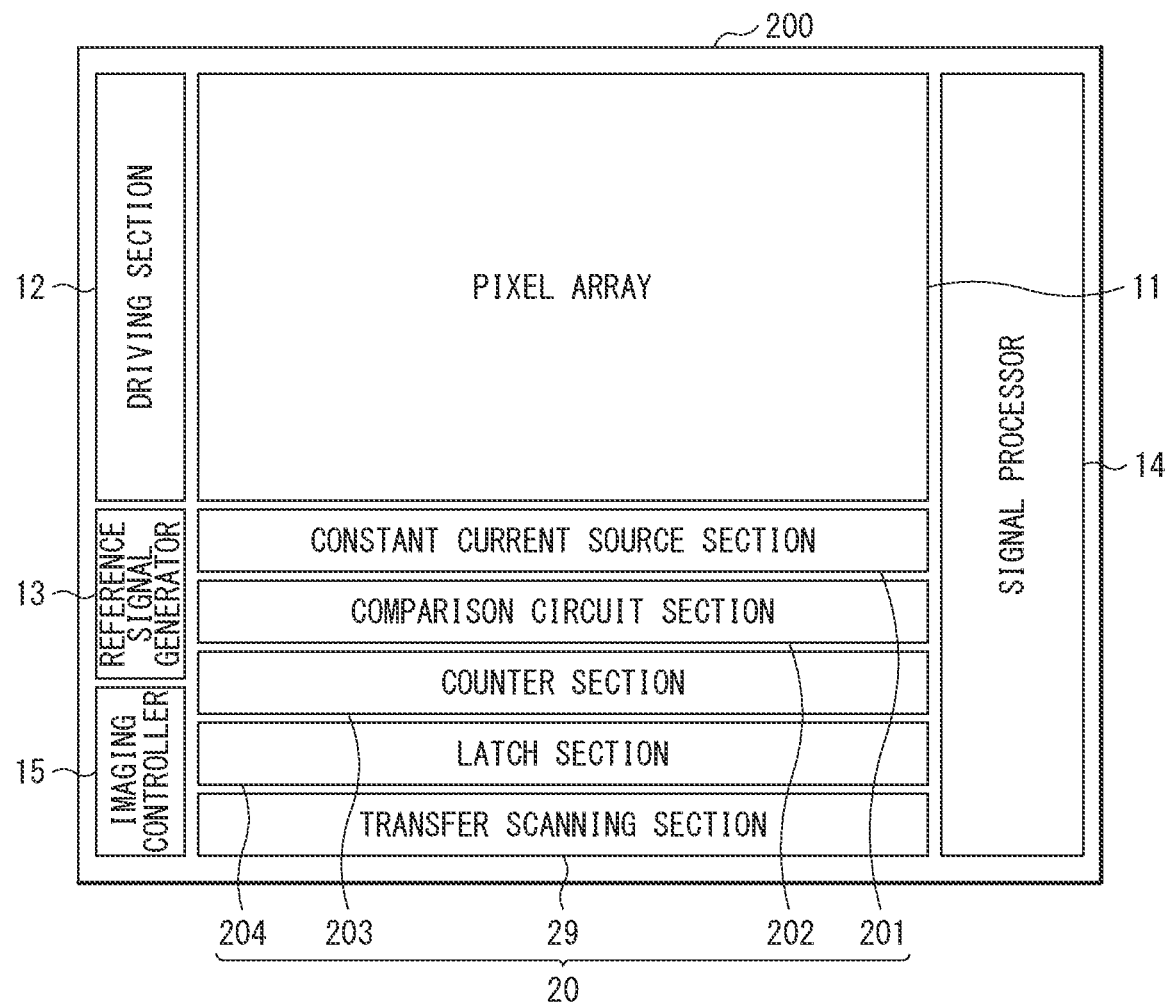
FIG. 6 is an explanatory diagram illustrating an implementation example of the imaging device illustrated in FIG. 1.

FIG. 6 illustrates an implementation example of the imaging device 1 in a case where the blocks are formed in one semiconductor substrate 200. In the semiconductor substrate 200, the pixel array 11 is disposed, and the driving section 12 is disposed on the left of the pixel array 11. In addition, the readout section 20 is disposed below the pixel array 11. In the readout section 20, a constant current source section 201 including the plurality of constant current sources CS, a comparison circuit section 202 including the plurality of comparators 21, a counter section 203 including a plurality of counters 24, a latch section 204 including a plurality of latches 25, and the transfer scanning section 29 are disposed in this order from top. The reference signal generator 13 and the imaging controller 15 are disposed on the left of the readout section 20. In addition, the signal processor 14 is disposed on the right of the pixel array 11 and the readout section 20.

Figure 7:
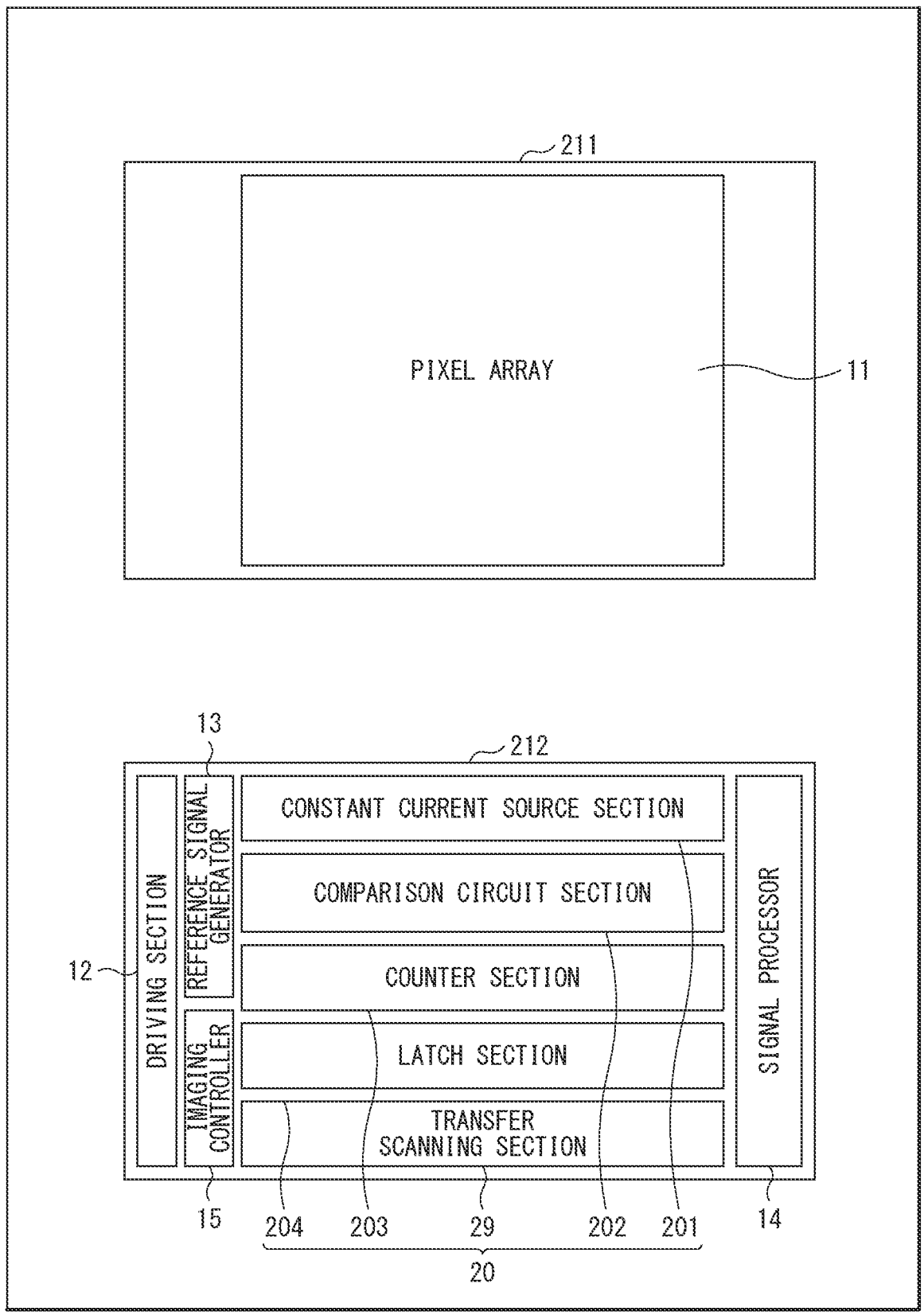
FIG. 7 is an explanatory diagram illustrating another implementation example of the imaging device illustrated in FIG. 1.

FIG. 7 illustrates an implementation example of the imaging device 1 in a case where the blocks are formed in two semiconductor substrates 211 and 212. For example, the pixel array 11 is disposed in the semiconductor substrate 211, and the readout section 20, the driving section 12, the reference signal generator 13, the signal processor 14, and the imaging controller 15 are disposed in the semiconductor substrate 212. The semiconductor substrates 211 and 212 are superimposed on each other. Then, the plurality of signal lines VSL disposed in the semiconductor substrate 211 is electrically coupled to the readout section 20 disposed in the semiconductor substrate 212 via, for example, a TSV (Through Silicon Via), and the plurality of control lines TGL, the plurality of control signals RSTL, and the plurality of control signals SELL disposed in the semiconductor substrate 211 are electrically coupled to the driving section 12 disposed in the semiconductor substrate 212 via, for example, a TSV. The readout section 20 is disposed in the semiconductor substrate 212, and the driving section 12, the reference signal generator 13, and the imaging controller 15 are disposed on the left of the readout section 20, and the signal processor 14 is disposed on the right of the readout section 20. In the readout section 20, the constant current source section 201 including the plurality of constant current sources CS, the comparison circuit section 202 including the plurality of comparators 21, the counter section 203 including the plurality of counters 24, the latch section 204 including the plurality of latches 25, and the transfer scanning section 29 are disposed in this order from top.

In a case where the blocks are formed in two semiconductor substrates 211 and 212 in such a manner (FIG. 7), disposing the pixel array 11 mainly in the semiconductor substrate 211 makes it possible to manufacture the semiconductor substrate 211 by using a semiconductor manufacturing process specific to pixels. That is, the semiconductor substrate 211 includes no circuit but the pixel array 11; therefore, for example, even in a case where a specific manufacturing process is used to form pixels, the manufacturing process does not affect circuits other than the pixel array 11. Accordingly, in the imaging device 1, it is possible to use the semiconductor manufacturing process specific to formation of pixels, which makes it possible to enhance imaging characteristics in the imaging device 1.

Here, the pixel P corresponds to a specific example of a "first pixel" in the present disclosure. The comparator 21 corresponds to a specific example of a "first comparator" in the present disclosure. The power supply circuit 22 corresponds to a specific example of a "first power supply circuit" in the present disclosure. The comparison circuit 23 corresponds to a specific example of a "first comparison circuit" in the present disclosure. The transistor MN10 corresponds to a specific example of a "first power supply transistor" in the present disclosure. The capacitor C1 corresponds to a specific example of a "first capacitor" in the present disclosure. The capacitor C2 corresponds to a specific example of a "second capacitor" in the present disclosure. The transistor MP11 corresponds to a specific example of a "first transistor" in the present disclosure. The switch SW1 corresponds to a specific example of a "first switch" in the present disclosure. The transistor MN11 corresponds to a specific example of a "first current source" in the present disclosure. The transistor MP12 corresponds to a specific example of a "second transistor" in the present disclosure. The transistor MN12 corresponds to a specific example of a "third transistor" in the present disclosure. The switch SW2 corresponds to a specific example of a "second switch" in the present disclosure.

[Operations and Workings]

Next, description is given of an operation and workings of the imaging device 1 according to the present embodiment.

(Overview of Overall Operation)

First, an overview of the overall operation of the imaging device 1 is described with reference to FIG. 1. The driving section 12 sequentially drives the plurality of pixels P in the pixel array 11 in units of the pixel lines L on the basis of an instruction from the imaging controller 15. The pixels P each output the reset voltage Vrest as the signal SIG in the P-phase period TP, and output the pixel voltage Vpix corresponding to the amount of received light as the signal SIG in the D-phase period TD. The reference signal generator 13 generates the reference signal RAMP on the basis of an instruction from the imaging controller 15. The readout section 20 generates the imaging signal DATA0 on the basis of an instruction from the imaging controller 15 by performing AD conversion on the basis of the signal SIG supplied from the pixel array 11 via the signal line VSL. The signal processor 14 generates the imaging signal DATA on the basis of an instruction from the imaging controller 15 by performing predetermined signal processing on the imaging signal DATA0. The imaging controller 15 supplies a control signal to the driving section 12, the reference signal generator 13, the readout section 20, and the signal processor 14, and controls operations of these circuits, thereby controlling the operation of the imaging device 1.

(Detailed Operation)

In the imaging device 1, the plurality of pixels P each accumulates electric charges corresponding to the amount of received light, and outputs the pixel voltage Vpix corresponding to the amount of received light as the signal SIG. Then, the readout section 20 performs AD conversion on the basis of the signal SIG. This operation is described in detail below.

Figure 8:
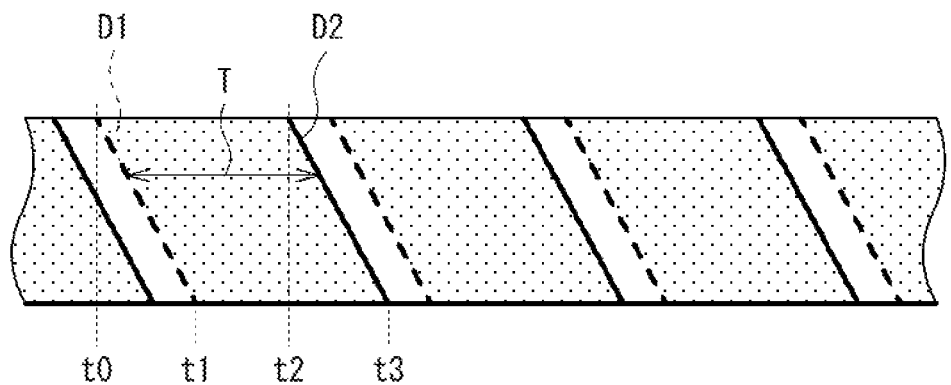
FIG. 8 is a timing chart illustrating an operation example of the imaging device illustrated in FIG. 1.

FIG. 8 illustrates an example of an operation of scanning the plurality of pixels P in the pixel array 11.

The imaging device 1 performs exposure start driving D1 on the pixel array 11 in order from top in the vertical direction in a period from a timing t0 to a timing t1. Specifically, the driving section 12 generates, for example, the control signals STG and SRST, thereby sequentially selecting the pixel lines L. and sequentially turning on the transistors TG and RST in the pixels P in a time having a predetermined length. This sets a voltage of the floating diffusion FD and a voltage of the cathode of the photodiode PD to the power supply voltage VDD in each of the pixels P. Then, the transistors TG and RST are turned off, which causes the photodiode PD to start to accumulate electric charges in accordance with the amount of received light. Thus, in the plurality of pixels P, an exposure period T sequentially starts.

The imaging device 1 performs readout driving D2 on the pixel array 11 in order from top in the vertical direction in a period from a timing t2 to a timing t3. Specifically, the driving section 12 sequentially selects the pixel lines L by generating the control signals STG and SRST, as described later. This causes the pixels P to output the reset voltage Vreset as the signal SIG in the P-phase period TP and output the pixel voltage Vpix as the signal SIG in the D-phase period TD. The readout section 20 generates the digital code CODE by performing AD conversion on the basis of the signals SIG.

The imaging device 1 repeats such exposure start driving D1 and such readout driving D2. Thus, the imaging device 1 obtains captured images.

Next, the readout driving D2 is described in detail. In the following, with a focus on a certain pixel P (a pixel P1) of the plurality of pixels P, detailed description is given of operations of the pixel P1 and the AD converter ADC (an AD converter ADC1) coupled to the pixel P1.

Figure 9:
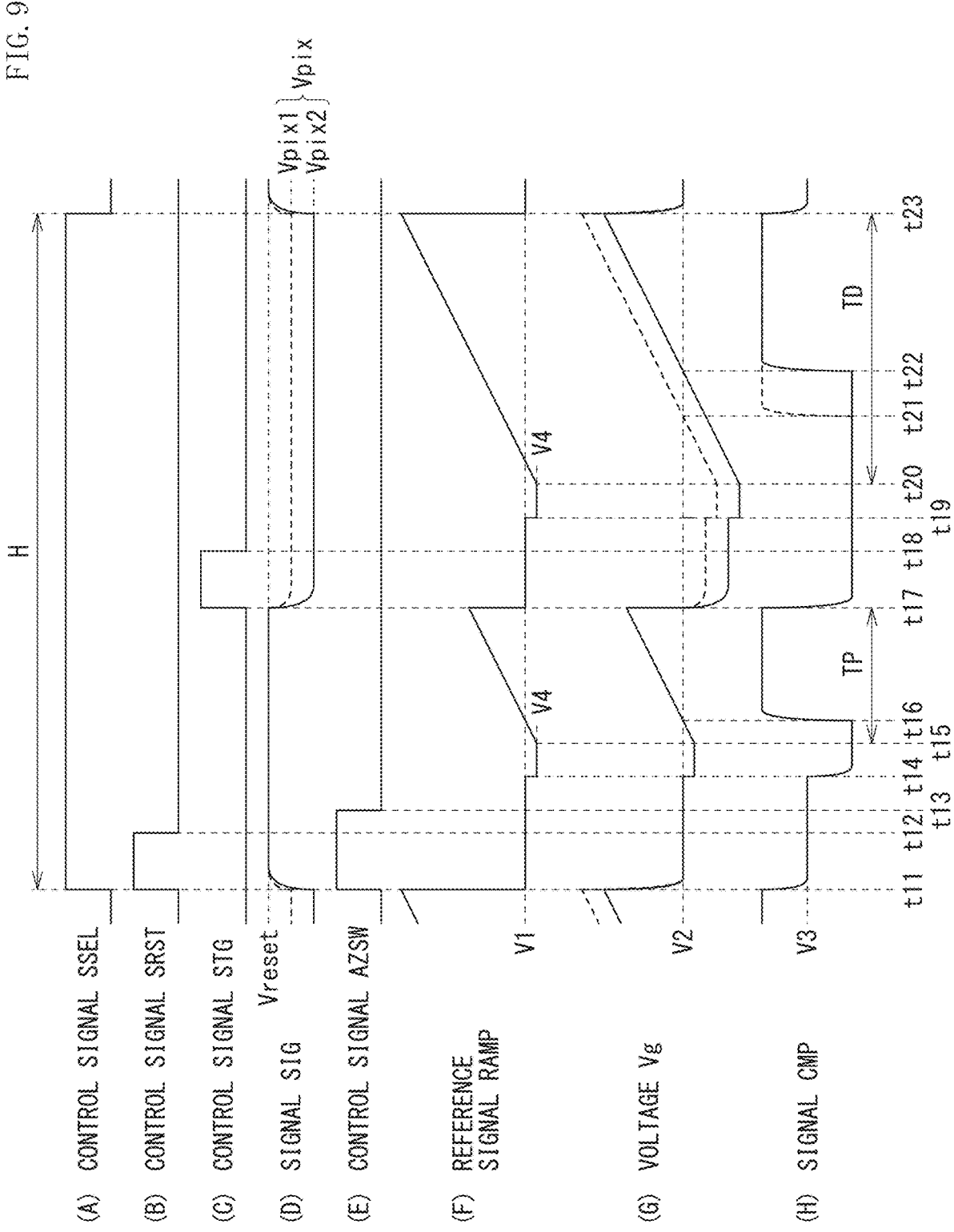
FIG. 9 is a timing waveform diagram illustrating an operation example of the imaging device illustrated in FIG. 1.

FIG. 9 illustrates an operation example of the readout driving D2 in the pixel P1 of interest, where (A) indicates a waveform of the control signal SSEL, (B) indicates a waveform of the control signal SRST, (C) indicates a waveform of the control signal STG, (D) indicates a waveform of the signal SIG, (E) indicates a waveform of the control signal AZSW. (F) indicates a waveform of the reference signal RAMP, (G) indicates a waveform of a gate voltage Vg of the transistor MP11 in the comparator 21 of the AD converter ADC1, and (H) indicates a waveform of the signal CMPO in the AD converter ADC1. A waveform of the control signal AZN is similar to the waveform of the control signal AZSW.

In the imaging device 1, in a certain horizontal period (H), first, the pixel P1 outputs the reset voltage Vrest by performing an reset operation, and the AD converter ADC1 performs AD conversion on the basis of the reset voltage Vreset in the P-phase period TP. Then, the pixel P1 thereafter performs an electric charge transfer operation, thereby outputting the pixel voltage Vpix, and the AD converter ADC1 performs AD conversion on the basis of the pixel voltage Vpix in the D-phase period TD. This operation is described in detail below.

First, at a timing t11, upon start of the horizontal period H, the driving section 12 changes the voltage of the control signal SSEL from a low level to a high level ((A) of FIG. 9). This turns on the transistor SEL in the pixel P1, and the pixel P1 is electrically coupled to the signal line VSL. In addition, at the timing t11, the driving section 12 changes the voltage of the control signal SRST from the low level to the high level ((B) of FIG. 9). This turns on the transistor RST in the pixel P1, and sets the voltage of the floating diffusion FD to the power supply voltage VDD (a reset operation). Then, the pixel P1 outputs a voltage (the reset voltage Vreset) corresponding to the voltage of the floating diffusion FD at this time. Thus, the voltage of the signal SIG is changed to the reset voltage Vreset ((D) of FIG. 9).

In addition, at the timing t11, the reference signal generator 13 changes the reference signal RAMP to a voltage V1 ((F) of FIG. 9). In addition, at the timing t11, the imaging controller 15 changes the voltages of the control signals AZSW and AZN from the low level to the high level ((E) of FIG. 9). This turns on both the switches SW1 and SW2 in the comparator 21 of the AD converter ADC1. Turning on the switch SW1 changes the gate voltage Vg of the transistor MP11 to the same voltage (a voltage V2) as a drain voltage of the transistor MP11 ((G) of FIG. 9) to set the voltages of the capacitors C1 and C2. In addition, turning on the switch SW2 changes a gate voltage of the transistor MN12 to the same voltage as a drain voltage of the transistor MN12 to set the voltage of the capacitor C3. This changes the voltage of the signal CMPO to a voltage V3 ((H) of FIG. 9). Thus, the comparator 21 performs an operation point setting operation.

Next, at a timing t12, the driving section 12 changes the voltage of the control signal SRST from the high level to the low level ((B) of FIG. 9). This turns off the transistor RST in the pixel P1.

Next, at a timing t13, the imaging controller 15 changes the voltages of the control signals AZSW and AZN from the high level to the low level ((E) of FIG. 9). This turns off both the switches SW1 and SW2 in the comparator 21 of the AD converter ADC1, and the operation point setting operation ends. From this point onward, the comparator 21 operates to compare the gate voltage Vg with the voltage V2.

Next, at a timing t14, the reference signal generator 13 decreases the voltage of the reference signal RAMP from the voltage V1 to a voltage V4 ((F) of FIG. 9). This changes the gate voltage Vg of the transistor MP11 to a voltage lower than the voltage V2 ((G) of FIG. 9) in the comparator 21 of the AD converter ADC1, which decreases the voltage of the signal CMPO ((H) of FIG. 9). In other words, the comparator 21 compares the gate voltage Vg with the voltage V2, and the gate voltage Vg is lower than the voltage V2, thereby changing the voltage of the signal CMPO to the low level.

Next, in a period from a timing t15 to a timing t17 (the P-phase period TP), the AD converter ADC1 performs AD conversion on the basis of the reset voltage Vreset. Specifically, first, at the timing t15, the reference signal generator 13 starts to increase the voltage of the reference signal RAMP from the voltage V4 at a predetermined change rate ((F) of FIG. 9). Accordingly, in the comparator 21 of the AD converter ADC1, the gate voltage Vg of the transistor MP11 starts to increase ((G) of FIG. 9). In addition, at the timing t15, the imaging controller 15 starts generation of the clock signal CLK. The counter 24 of the AD converter ADC1 performs the counting operation to count pulses of the clock signal CLK.

Then, at a timing t16, the gate voltage Vg exceeds the voltage V2 ((G) of FIG. 9). Accordingly, the comparator 21 of the AD converter ADC1 changes the voltage of the signal CMPO from the low level to the high level ((H) of FIG. 9). That is, the comparator 21 compares the gate voltage Vg with the voltage V2, and the gate voltage Vg exceeds the voltage V2, thereby changing the voltage of the signal CMPO from the low level to the high level. The counter 24 of the AD converter ADC1 stops the counting operation on the basis of this transition of the signal CMPO. At this time, the count value of the counter 24 is CNTP. The latch 25 of the AD converter ADC1 latches this count value CNTP as a count value in the P-phase period TP. Then, the counter 24 is reset.

Next, at the timing t17, the reference signal generator 13 sets the voltage of the reference signal RAMP to the voltage V1 at the end of the P-phase period TP. In addition, the imaging controller 15 stops generation of the clock signal CLK at the timing t17.

Then, at the timing t17, the driving section 12 changes the voltage of the control signal STG from the low level to the high level ((C) of FIG. 9). This turns on the transistor TG in the pixel P1, and electric charges generated in the photodiode PD are transferred to the floating diffusion FD (an electric charge transfer operation). Then, the pixel P1 outputs a voltage (the pixel voltage Vpix) corresponding to the voltage of the floating diffusion FD at this time. Thus, the voltage of the signal SIG is changed to the pixel voltage Vpix ((D) of FIG. 9). FIG. 9 illustrates two pixel voltages Vpix (pixel voltages Vpix1 and Vpix2) different from each other as an example. The voltage of the signal SIG is decreased in such a manner, which decreases the gate voltage Vg of the transistor MP11 in the comparator 21 of the AD converter ADC1 ((G) of FIG. 9). The gate voltage Vg is changed by a voltage corresponding to the pixel voltage Vpix. The gate voltage Vg is decreased in such a manner, which decreases the voltage of the signal CMPO ((H) of FIG. 9). That is, the comparator 21 compares the gate voltage Vg with the voltage V2, and the gate voltage Vg is lower than the voltage V2, thereby changing the voltage of the signal CMPO to the low level.

Next, at a timing t18, the driving section 12 changes the voltage of the control signal STG from the high level to the low level ((C) of FIG. 9). This turns off the transistor TG in the pixel P1.

Next, at a timing t19, the reference signal generator 13 decreases the voltage of the reference signal RAMP from the voltage V1 to the voltage V4 ((F) of FIG. 9). This decreases the gate voltage Vg of the transistor MP11 in the comparator 21 of the AD converter ADC1 ((G) of FIG. 9).

Next, in a period from a timing t20 to a timing t23 (the D-phase period TD), the AD converter ADC1 performs AD conversion on the basis of the pixel voltage Vpix. Specifically, first, at the timing t20, the reference signal generator 13 starts to increase the voltage of the reference signal RAMP from the voltage V4 at a predetermined change rate ((F) of FIG. 9). Accordingly, in the comparator 21 of the AD converter ADC1, the gate voltage Vg of the transistor MP11 starts to increase ((G) of FIG. 9). In addition, at the timing t20, the imaging controller 15 starts generation of the clock signal CLK. The counter 24 of the AD converter ADC1 performs the counting operation to count pulses of the clock signal CLK.

In a case where the pixel voltage Vpix is the voltage Vpix1, the gate voltage Vg exceeds the voltage V2 at the timing t21 ((G) of FIG. 9). Accordingly, the comparator 21 of the AD converter ADC1 changes the voltage of the signal CMPO from the low level to the high level ((H) of FIG. 9). That is, the comparator 21 compares the gate voltage Vg with the voltage V2, and the gate voltage Vg exceeds the voltage V2, thereby changing the voltage of the signal CMPO from the low level to the high level.

In addition, in a case where the pixel voltage Vpix is the voltage Vpix2, the gate voltage Vg exceeds the voltage V2 at a timing t22 ((G) of FIG. 9). Accordingly, the comparator 21 of the AD converter ADC1 changes the voltage of the signal CMPO from the low level to the high level ((H) of FIG. 9).

The counter 24 of the AD converter ADC1 stops the counting operation on the basis of this transition of the signal CMPO. At this time, the count value of the counter 24 is CNTD. The latch 25 of the AD converter ADC1 latches the count value CNTD as a count value in the D-phase period TD. Then, the counter 24 is reset.

Next, at a timing t23, the reference signal generator 13 sets the voltage of the reference signal RAMP to the voltage V1 at the end of the D-phase period TD ((F) of FIG. 9). In addition, the imaging controller 15 stops generation of the clock signal CLK at the timing t23. Then, the driving section 12 changes the voltage of the control signal SSEL from the high level to the low level at the timing t23 ((A) of FIG. 9). This turns off the transistor SEL in the pixel P1, which electrically separates the pixel P1 from the signal line SGL.

Then, the latch 25 of the AD converter ADC1 generates the digital code CODE corresponding to a difference (CNTD−CNTP) between the count value CNTP obtained by the counter 24 in the P-phase period TP and the count value CNTD obtained by the counter 24 in the D-phase period TD.

As described above, in the imaging device 1, the counting operation is performed on the basis of the reset voltage Vreset in the P-phase period TP to obtain the count value CNTP, and the counting operation is performed on the basis of the pixel voltage Vpix in the D-phase period TD to obtain the count value CNTD. Then, in the imaging device 1, the digital code CODE corresponding to the difference (CNTD−CNTP) between the count values CNTP and CNTD is generated. In the imaging device 1, such correlated double sampling is performed, which makes it possible to remove a noise component included in the pixel voltage Vpix. As a result, it is possible to enhance image quality of a captured image.

As described above, in the imaging device 1, each of the plurality of comparators 21 includes the power supply circuit 22. This makes it possible to suppress interference among the plurality of AD converter ADC. That is, for example, in a case where the power supply circuit 22 is not provided in each of the plurality of comparators 21, upon transition of the signal CMPO by the comparator 21 in a certain AD converter ADC, noise may be generated in the power supply voltage VDD0 by a transient current. In this case, the noise may affect operations of other AD converters via the power supply line VDDL. In the imaging device 1, the power supply circuit 22 is provided in each of the plurality of comparators 21, which makes it possible to reduce a possibility that upon transition of the signal CMPO by the comparator 21 in a certain AD converter ADC, noise of the power supply voltage VDD0 generated by a transient current affects operations of other AD converters. This makes it possible to reduce, for example, a possibility that streaking occurs in a captured image in the imaging device 1. As a result, it is possible to enhance image quality of a captured image in the imaging device 1.

[Effects]

As described above, in the present embodiment, each of a plurality of comparators includes a power supply circuit, which makes it possible to enhance image quality of a captured image.

Modification Example 1

In the embodiment described above, for example, four transistors MP11, MN11, MP12, and MN12 are provided in the comparison circuit 23 of the comparator 21 illustrated in FIG. 4A, but this is not limitative. For example, as with a comparison circuit 23B of a comparator 21B illustrated in FIG. 10A, a transistor MN13 may be further provided. The transistor MN13 is an N-type MOS transistor, and has a gate supplied with the signal CMPO, a drain coupled to the sources of the transistors MN10, MP11, and MP12, and a source coupled to the drains of the transistors MP11 and MN11, the gate of the transistor MP12, and the other end of the switch SW1. Here, the transistor MN13 corresponds to a specific example of a "fourth transistor" in the present disclosure. The transistor MN13 performs control on the basis of the voltage of the signal CMPO to prevent the drain voltage of the transistor MN11 that operates as a constant current source from becoming too low. This makes it possible to maintain constant-current property in the transistor MN11 and suppress interference among the plurality of AD converters ADC, for example.

In this example, the present modification example is applied to the comparator 21 (FIG. 4A), but the present modification example may be applied to the comparator 21A (FIG. 4B), for example. Specifically, for example, as with a comparison circuit 23C of a comparator 21C illustrated in FIG. 10B, a transistor MP23 may be provided. The transistor MP23 is a P-type MOS transistor, and has a gate supplied with the signal CMPO, a drain coupled to the sources of the transistors MP20, MN21, and MN22, and a source coupled to the drains of the transistors MN21 and MP21, the gate of the transistor MN22, and the other end of the switch SW11. The transistor MP23 performs control on the basis of the voltage of the signal CMPO to prevent the drain voltage of the transistor MP21 that operates as a constant current source from becoming too high. This makes it possible to maintain constant-current property in the transistor MP21 and suppress interference among the plurality of AD converters ADC, for example.

Modification Example 2

In the embodiment described above, for example, in the power supply circuit 22 of the comparator 21 illustrated in FIG. 4A, the bias voltage VB1 is constantly supplied to the gate of the transistor MN10, but this is not limitative. Instead of this, for example, a sample hold circuit may be provided, and the bias voltage VB1 may be supplied to the gate of the transistor MN10 only in a predetermined period. An example in a case where the present modification example is applied to the comparator 21B illustrated in FIG. 10A is described in detail below.

FIG. 11A illustrates a configuration example of a comparator 21D according to the present modification example. The comparator 21D includes a power supply circuit 22D and the comparison circuit 23B. The power supply circuit 22D includes a capacitor C4 and a switch SW3. The capacitor C4 has one end coupled to the gate of the transistor MN10 and one end of the switch SW3, and another end supplied with a direct-current voltage VREF. The voltage VREF is generated by the imaging controller 15. It is to be noted that the capacitor C4 may be configured by using a MOS capacitor or the like, or may be configured by using a parasitic capacitance at the gate of the transistor MN10, a parasitic capacitance at the switch SW3, a parasitic capacitance at a wiring line, or the like, for example. The switch SW3 is configured to be turned on and off on the basis of a control signal SHSW, and has the one end coupled to the gate of the transistor MN10 and the one end of the capacitor C4, and another end supplied with the bias voltage VB1. The control signal SHSW is generated by the imaging controller 15. The capacitor C4 and the switch SW3 are included in a sample hold circuit. Here, the capacitor C4 corresponds to a specific example of a "fourth capacitor" in the present disclosure. The switch SW3 corresponds to a specific example of a "fourth switch" in the present disclosure.

For example, the switch SW3 is turned on in a period in which the switches SW1 and SW2 are turned on, and is turned off in a period in which the switches SW1 and SW2 are tuned off. Specifically, in the readout driving D2 illustrated in FIG. 9, the switch SW3 is turned on in a period from the timing t11 to the timing t13. This sets the voltage of the gate of the transistor MN10 to the bias voltage VB1. Then, the switch SW3 is turned on in a period from the timing t13 to the timing t23. This causes the voltage of the gate of the transistor MN10 to be maintained at the bias voltage VB1. In the comparator 21D, the switch SW3 is turned off in the P-phase period TP and the D-phase period TD. This makes it possible to reduce a possibility that, in a case where noise is generated in the gate of the transistor MN10 upon transition of the signal CMPO by the comparator 21D in a certain AD converter ADC, the noise affects the operations of other AD converters ADC. As a result, it is possible to suppress interference among the plurality of AD converters ADC.

Likewise, for example, the present modification example may be applied to the comparative example 21A (FIG. 4B), or the present modification example may be applied to the comparator 21C (FIG. 10B). FIG. 11B illustrates a configuration example of a comparator 21E in a case where the present modification example is applied to the comparator 21C (FIG. 10B). The comparator 21E includes a power supply circuit 22E and the comparison circuit 23C. The power supply circuit 22E includes a capacitor C14 and a switch SW13. The capacitor C14 has one end coupled to the gate of the transistor MP20 and one end of the switch SW13, and another end supplied with the voltage VREF. The switch SW13 is configured to be turned on and off on the basis of the control signal SHSW, and has the one end coupled to the gate of the transistor MP20 and the one end of the capacitor C14, and another end supplied with the bias voltage VB1. This makes it possible to suppress interference among the plurality of AD converters ADC in the comparator 21E, as with the comparator 21D.

Modification Example 3

In the embodiment described above, for example, in the comparison circuit 23 of the comparator 21 illustrated in FIG. 4A, the bias voltage VB2 is constantly supplied to the gate of the transistor MN11 that operates as a current source, but this is not limitative. Instead of this, for example, a sample hold circuit may be provided, and the vias voltage VB2 may be supplied to the gate of the transistor MN11 only in a predetermined period. An example in a case where the present modification example is applied to the comparator 21D illustrated in FIG. 11A is described in detail below.

FIG. 12A illustrates a configuration example of a comparator 21F according to the present modification example. The comparator 21F includes the power supply circuit 22D and a comparison circuit 23F. The comparison circuit 23F includes a capacitor C5 and a switch SW4. The capacitor C5 has one end coupled to the gate of the transistor MN11 and one end of the switch SW4, and another end supplied with the direct-current voltage VREF. The voltage VREF is generated by the imaging controller 15. It is to be noted that the capacitor C5 may be configured by using a MOS capacitor or the like, or may be configured by using a parasitic capacitance at the gate of the transistor MN11, a parasitic capacitance at the switch SW4, a parasitic capacitance at a wiring line, or the like, for example. The switch SW4 is configured to be turned on and off on the basis of a control signal SHSW2, and has the one end coupled to the gate of the transistor MN11 and the one end of the capacitor C5, and another end supplied with the bias voltage VB2. The control signal SHSW2 is generated by the imaging controller 15. The capacitor C5 and the switch SW4 are included in a sample hold circuit. Here, the switch SW4 corresponds to a specific example of a "sixth switch" in the present disclosure.

For example, the switch SW4 is turned on in a period in which the switches SW1 and SW2 are turned on, and is turned off in a period in which the switches SW1 and SW2 are tuned off. Specifically, in the readout driving D2 illustrated in FIG. 9, the switch SW4 is turned on in a period from the timing t11 to the timing t13. This sets the voltage of the gate of the transistor MN11 to the bias voltage VB2. Then, the switch SW4 is turned on in a period from the timing t13 to the timing t23. This causes the voltage of the gate of the transistor MN11 to be maintained at the bias voltage VB2. In the comparator 21F, the switch SW4 is turned off in the P-phase period TP and the D-phase period TD. This makes it possible to reduce a possibility that in a case where noise is generated in the gate of the transistor MN11 upon transition of the signal CMPO by the comparator 21F in a certain AD converter ADC, the noise affects the operations of other AD converters ADC. As a result, it is possible to suppress interference among the plurality of AD converters ADC.

Likewise, for example, the present modification example may be applied to the comparative example 21A (FIG. 4B), the present modification example may be applied to the comparator 21C (FIG. 10B), or the present modification example may be applied to the comparator 21E (FIG. 11B). FIG. 12B illustrates a configuration example of a comparator 21G in a case where the present modification example is applied to the comparator 21E (FIG. 11B). The comparator 21G includes the power supply circuit 22E and a comparison circuit 23G. The comparison circuit 23G includes a capacitor C15 and a switch SW14. The capacitor C15 has one end coupled to the gate of the transistor MP21 and one end of the switch SW14, and another end supplied with the voltage VREF. The switch SW14 is configured to be turned on and off on the basis of the control signal SHSW2, and has the one end coupled to the gate of the transistor MP21 and the one end of the capacitor C15, and another end supplied with the bias voltage VB2. This makes it possible to suppress interference among the plurality of AD converters ADC in the comparator 21G, as with the comparator 21F.

Modification Example 4

In the embodiment described above, for example, as with the comparator 21 illustrated in FIG. 4A, the initial-stage circuit 101 of the comparison circuit 23 is configured by using two transistors MP11 and NM11, but this is not limitative. Instead of this, for example, as with a comparator 21H illustrated in FIG. 13, the initial-stage circuit 101 may be configured by using more transistors. The initial-stage circuit 101 of the comparator 21H includes transistors MN11, MP11, MP13, and MN14.

The transistor MP13 is a P-type MOS transistor, and has a gate supplied with a bias voltage VB3, a drain coupled to a drain of the transistor MN14, the input terminal of the post-stage circuit 102, and the other end of the switch SW1, and a source coupled to the drain of the transistor MP11. The bias voltage VB3 is generated by the imaging controller 15. The transistor MP11 has the source grounded, and the transistor MP13 has the gate grounded. Accordingly, the transistor MP11 and the transistor MP13 are included in a cascade circuit.

The transistor MN14 is an N-type MOS transistor, and has a gate supplied with a bias voltage VB4, the drain coupled to the drain of the transistor MP13, the input terminal of the post-stage circuit 102, and the other end of the switch SW1, and a source coupled to the drain of the transistor MN11.

The bias voltage VB4 is generated by the imaging controller 15. The transistors MN11 and MN14 are included in a cascade circuit.

With this configuration, in the comparison circuit 23H, it is possible to enhance a small signal gain, which makes it possible to achieve a stabler comparison operation. In addition, providing the transistors MP13 and MN14 makes it possible to reduce kickback noise from the post-stage circuit 102.

Modification Example 5

In the embodiment described above, for example, as with the comparator 21 illustrated in FIG. 4A, in the power supply circuit 22, the transistor MN10 operates as a source follower, but this is not limitative. Instead of this, for example, a plurality of transistors may be provided, and the plurality of transistors may operate as a plurality of stages of source followers. The present modification example is described in detail with reference to some examples.

FIG. 14 illustrates a configuration example of a comparator 21J according to the present modification example. The comparator 21J includes a power supply circuit 22J and the comparison circuit 23. The power supply circuit 22J includes transistors MN10 and MN15, a capacitor C6, and a switch SW5.

The transistor MN10 has the gate supplied with the bias voltage VB1, the drain coupled to the power supply line VDDL, and the source coupled to a drain of the transistor MN15. The transistor MN15 is an N-type MOS transistor, and has a gate coupled to one end of the capacitor C6 and one end of the switch SW5, the drain coupled to the source of the transistor MN10, and a source coupled to the source of the transistor MP11 and a power supply terminal of the post-stage circuit 102. The capacitor C6 has the one end coupled to the gate of the transistor MN15 and the one end of the switch SW5, and another end supplied with the direct-current voltage VREF. The voltage VREF is generated by the imaging controller 15. The switch SW5 is configured to be turned on and off on the basis of the control signal SHSW, and has the one end coupled to the gate of the transistor MN15 and the one end of the capacitor C6, and another end supplied with a bias voltage VB5. The control signal SHSW and the bias voltage VB5 are generated by the imaging controller 15. The capacitor C6 and the switch SW5 are included in a sample hold circuit. For example, the switch SW5 is turned on in a period in which the switch SW1 is turned on, and is turned off in a period in which the switch SW1 is turned off. Here, the transistor MN15 corresponds to a specific example of a "second power supply transistor" in the present disclosure. The switch SW5 corresponds to a specific example of a "fifth switch" in the present disclosure.

With this configuration, in the comparator 21J, a current generated by the transistor MN11 that operates as a constant current source is applied to the transistors MN10 and MN15, and the transistors MN10 and MN15 operates as two stages of source followers. Thus, the power supply circuit 22J generates the power supply voltage VDD1. Thus, in the comparator 21J, two stages of source followers are provided, which makes it possible to reduce a possibility that noise of the power supply voltage VDD0 generated by a transient current upon transition of the signal CMPO by the comparator 21J in a certain AD converter ADC affects the operations of other AD converters ADC. As a result, it is possible to suppress interference among the plurality of AD converters ADC.

FIG. 15 illustrates a configuration example of another comparator 21K according to the present modification example. The comparator 21K includes a power supply circuit 22K and the comparison circuit 23. The power supply circuit 22K includes the transistors MN10 and MN15, an operational amplifier OPA, the capacitor C6, and the switch SW5.

The transistor MN10 has a gate coupled to an output terminal of the operational amplifier OPA, a drain coupled to the power supply line VDDL, and a source coupled to a drain of the transistor MN15 and an inverting input terminal of the operational amplifier OPA. The operational amplifier OPA has a non-inverting input terminal supplied with the bias voltage VB1, the inverting input terminal coupled to the source of the transistor MN10 and the drain of the transistor MN15, and an output terminal coupled to the gate of the transistor MN10.

The transistor MN15 has the gate coupled to the one end of the capacitor C6 and the one end of the switch SW5, the drain coupled to the source of the transistor MN10 and the inverting input terminal of the operational amplifier OPA, and the source coupled to the source of the transistor MP11 and the power supply terminal of the post-stage circuit 102. The capacitor C6 has the one end coupled to the gate of the transistor MN15 and the one end of the switch SW5, and the other end supplied with the direct-current voltage VREF. The voltage VREF is generated by the imaging controller 15. The switch SW5 is configured to be turned on and off on the basis of the control signal SHSW, and has the one end coupled to the gate of the transistor MN15 and the one end of the capacitor C6, and the other end supplied with the bias voltage VB5. The control signal SHSW and the bias voltage VB5 are generated by the imaging controller 15. The capacitor C6 and the switch SW5 are included in a sample hold circuit. For example, the switch SW5 is turned on in a period in which the switch SW1 is turned on, and is turned off in a period in which the switch SW1 is turned off.

With this configuration, in the comparator 21K, a negative feedback operation is performed to cause the voltage of the source of the transistor MN10 to become equal to the bias voltage VB1. Then, a current generated by the transistor MN1 that operates as a constant current source is applied to the transistors MN10 and MN15, and the transistors MN10 and MN15 operates as two stages of source followers. Then, the power supply circuit 22K generates the power supply voltage VDD1. This makes it possible to suppress interference among the plurality of AD converters ADC in the comparator 21K, as with the comparator 21J.

FIG. 16 illustrates a configuration example of another comparator 21L according to the present modification example. The comparator 21L includes a power supply circuit 22L and the comparison circuit 23. The power supply circuit 22L includes the transistors MN10 and MN15, the capacitors C4 and C6, and the switches SW3 and SW5.

The transistor MN10 has the gate coupled to the one end of the capacitor C4 and the one end of the switch SW3, the drain coupled to the power supply line VDDL, and the source coupled to the drain of the transistor MN15. The capacitor C4 has the one end coupled to the gate of the transistor MN10 and the one end of the switch SW3, and the other end supplied with a direct-current voltage VREF1. The voltage VREF1 is generated by the imaging controller 15. The switch SW3 is configured to be turned on and off on the basis of the control signal SHSW1, and has the one end coupled to the gate of the transistor MN10 and the one end of the capacitor C4, and the other end supplied with the bias voltage VB1. The control signal SHSW1 and the bias voltage VB1 are generated by the imaging controller 15. For example, the switch SW3 is turned on in a period in which the switch SW1 is turned on, and is turned off in a period in which the switch SW1 is turned off.

The transistor MN15 has the gate coupled to one end of the capacitor C6 and the one end of the switch SW5, the drain coupled to the source of the transistor MN10, and the source coupled to the source of the transistor MP1 and the power supply terminal of the post-stage circuit 102. The capacitor C6 has the one end coupled to the gate of the transistor MN15 and the one end of the switch SW5, and the other end supplied with a direct-current voltage VREF2. The voltage VREF2 is generated by the imaging controller 15. The switch SW5 is configured to be turned on and off on the basis of the control signal SHSW2, and has the one end coupled to the gate of the transistor MN15 and the one end of the capacitor C6, and the other end supplied with the bias voltage VB5. The control signal SHSW2 and the bias voltage VB5 are generated by the imaging controller 15. For example, the switch SW5 is turned on in a period in which the switch SW1 is turned on, and is turned off in a period in which the switch SW1 is turned off.

With this configuration, in the comparator 21L, a current generated by the transistor MN11 that operates as a constant current source is applied to the transistors MN10 and MN15, and the transistors MN10 and MN15 operates as two stages of source followers. Then, the power supply circuit 22L generates the power supply voltage VDD1. This makes it possible to suppress interference among the plurality of AD converters ADC in the comparator 21L, as with the comparator 21J.

Modification Example 6

In the embodiment described above, as illustrated in FIG. 17, the back gates of the transistors MN10 and MN11 are supplied with the ground voltage VSS0, and the back gate of the transistor MP11 is supplied with the power supply voltage VDD0, but this is not limitative. The present modification example is described in detail below with reference to some examples.

FIG. 18 illustrates a configuration example of a comparator 21M according to the present modification example. The comparator 21M includes a power supply circuit 22M. In the power supply circuit 22M, the back gate of the transistor MN10 is coupled to the source of the transistor MN10. The transistor MN10 is formed in a P-well that is electrically insulated from a P-type semiconductor substrate by a deep N-well. This makes it possible to decrease a gate-source voltage Vgs of the transistor MN10, which makes it possible to further decrease the power supply voltage VDD0 and reduce power consumption, for example.

FIG. 19 illustrates a configuration example of another comparator 21N according to the present modification example. The comparator 21N includes a comparison circuit 23N. In the comparison circuit 23N, the back gate of the transistor MP11 is coupled to the source of the transistor MP11. This makes it possible to decrease an absolute value of the gate-source voltage Vgs of the transistor MP11, which makes it possible to further decrease the power supply voltage VDD0 and reduce power consumption, for example. The comparator 21N is effective in a case where a manufacturing process that is not able to form a deep N-well is used.

FIG. 20 illustrates a configuration example of another comparator 21P according to the present modification example. The comparator 21P includes the power supply circuit 22M and the comparison circuit 23N. That is, the back gate of the transistor MN10 is coupled to the source of the transistor MN10, and the back gate of the transistor MP11 is coupled to the source of the transistor MP11. This makes it possible to decrease absolute values of the gate-source voltages Vgs of the transistors MN10 and MP11, which makes it possible to further decrease the power supply voltage VDD0 and reduce power consumption, for example. In addition, in the comparator 21P, the back gates of both the transistors MP11 and MN10 are coupled to the respective sources of these transistors, which causes these back gates to be individually driven with the AD converter ADC as a unit. This makes it possible to suppress interference among the plurality of AD converters ADC.

Modification Example 7

Figure 21:
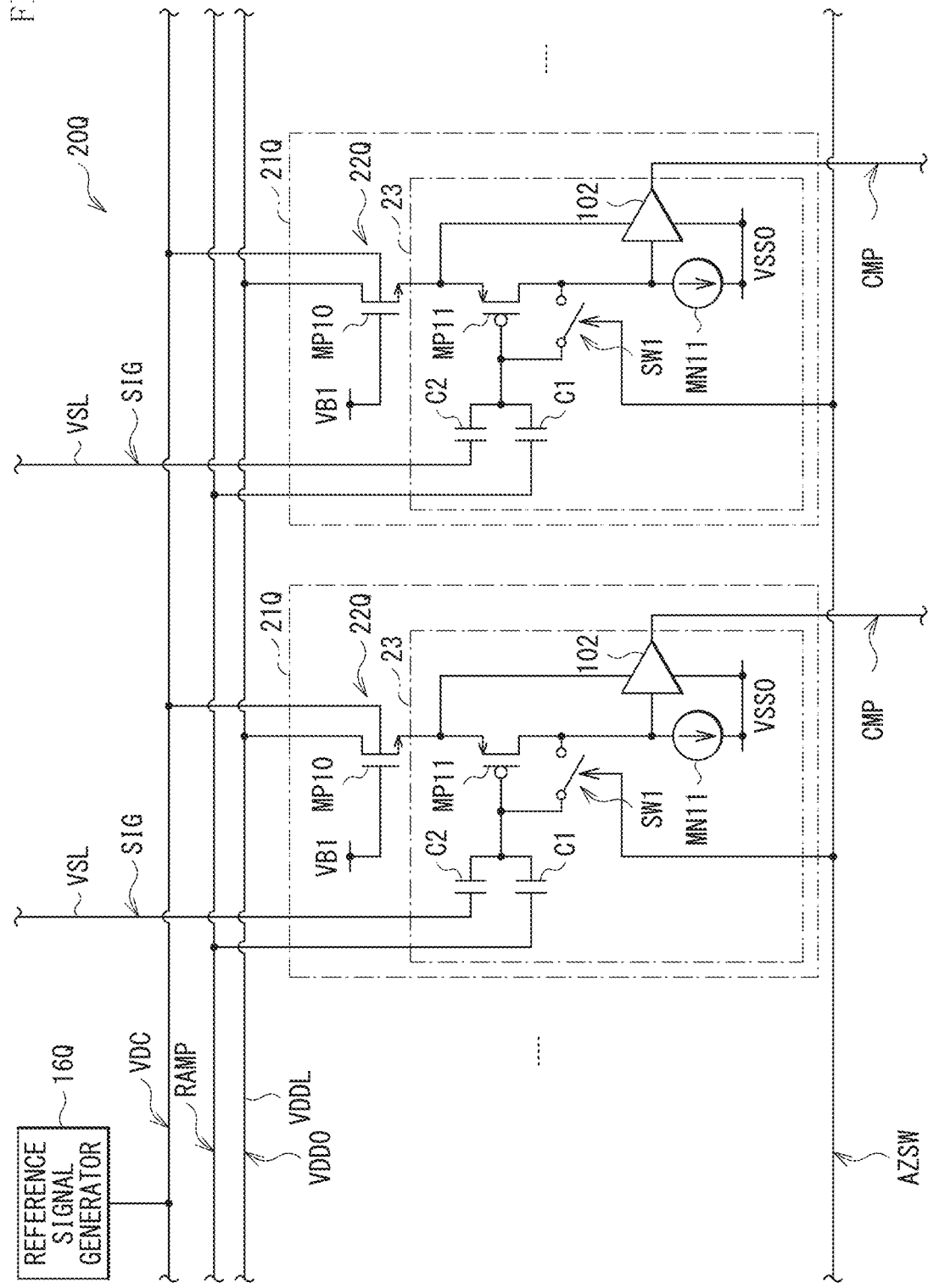
FIG. 21 is a circuit diagram illustrating a configuration example of a readout section according to another modification example.

In addition, the back gates of the transistors MN10 in the power supply circuits of the plurality of AD converters ADC may be coupled to each other. FIG. 21 illustrates a configuration example of a readout section 20Q in an imaging device 1Q according to the present modification example. The readout section 20Q includes a plurality of comparators 21Q and a voltage generator 16Q. Each of the plurality of comparators 21Q includes a power supply circuit 22Q. The back gates of the transistors MN10 of the plurality of power supply circuits 22Q are coupled to each other. The back gates of these transistors MN10 are supplied with the direct-current voltage VDC. The plurality of transistors MN10 is formed in one P-well. The voltage generator 16Q is configured to generate the voltage VDC. The voltage VDC is set to a voltage that causes PN junction configured by the source of the transistor MN10 and the P-well to be reverse biased.

Thus, in the imaging device 1Q, the voltage VDC is supplied to the back gates of the plurality of transistors MN10. Appropriately setting the voltage VDC makes it possible to decrease the absolute value of the gate-source voltage Vgs of the transistor MN10, which makes it possible to further decrease the power supply voltage VDD0 and reduce power consumption, for example. In addition, in the imaging device 1Q, the plurality of transistors MN10 is provided in one P-well, which makes it possible to reduce, for example, the area of a well contact, as compared with a case where each of the plurality of transistors MN10 is provided in a corresponding one of a plurality of P-wells. Accordingly, it is possible to reduce a layout area.

Modification Example 8

In the embodiment described above, in each of the comparators 21 of the plurality of AD converters ADC, the output terminal of the power supply circuit 22 is coupled to the comparison circuit 23, but this is not limitative. Instead of this, for example, the output terminals of the power supply circuits 22 of two or more AD converters ADC may be coupled to each other, and these output terminals may be coupled to the comparison circuits 23 of the two or more AD converters ADC. The present modification example is described in detail below.

Figure 22:
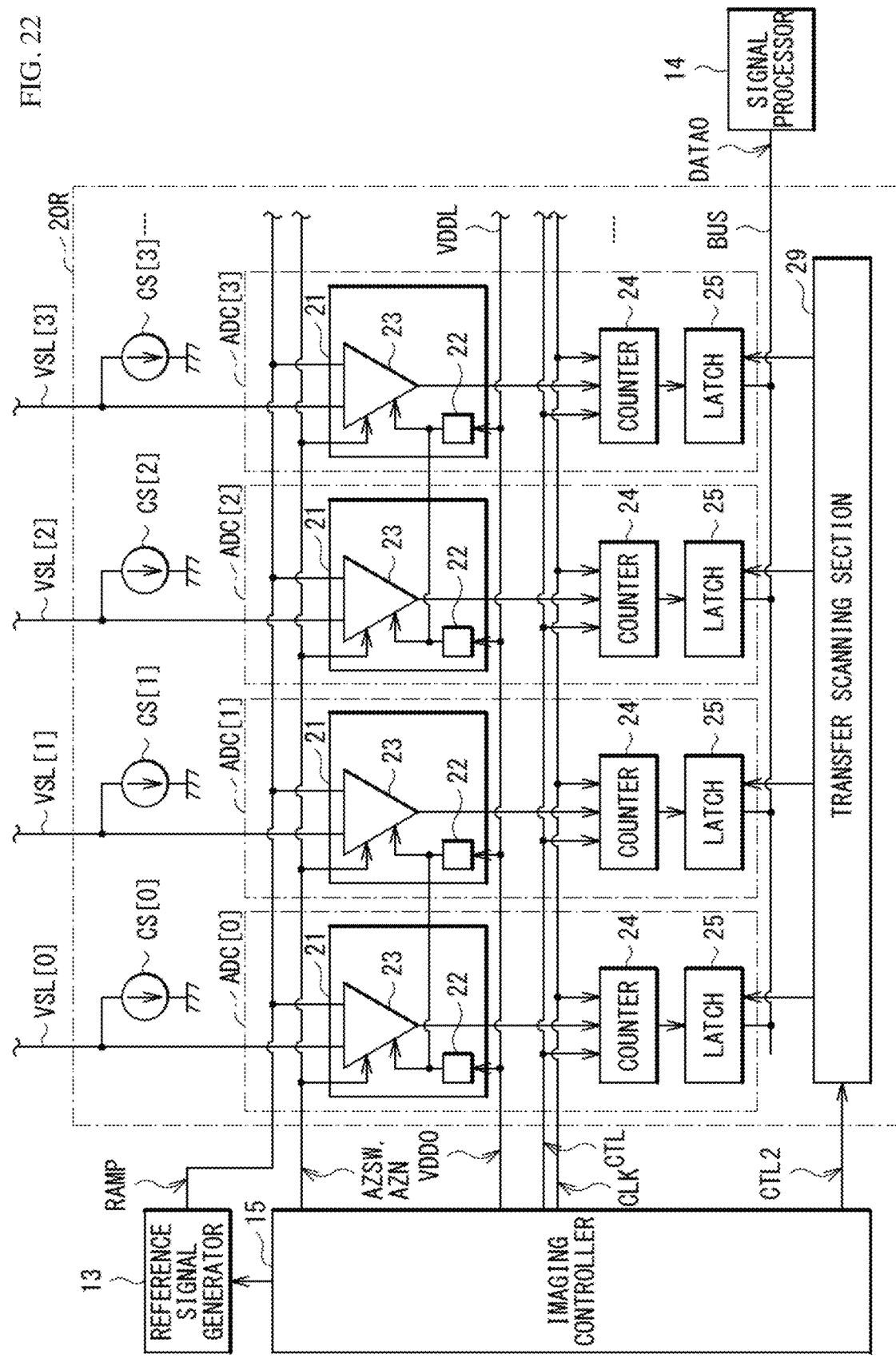
FIG. 22 is a circuit diagram illustrating a configuration example of a readout section according to another modification example.
Figure 23:
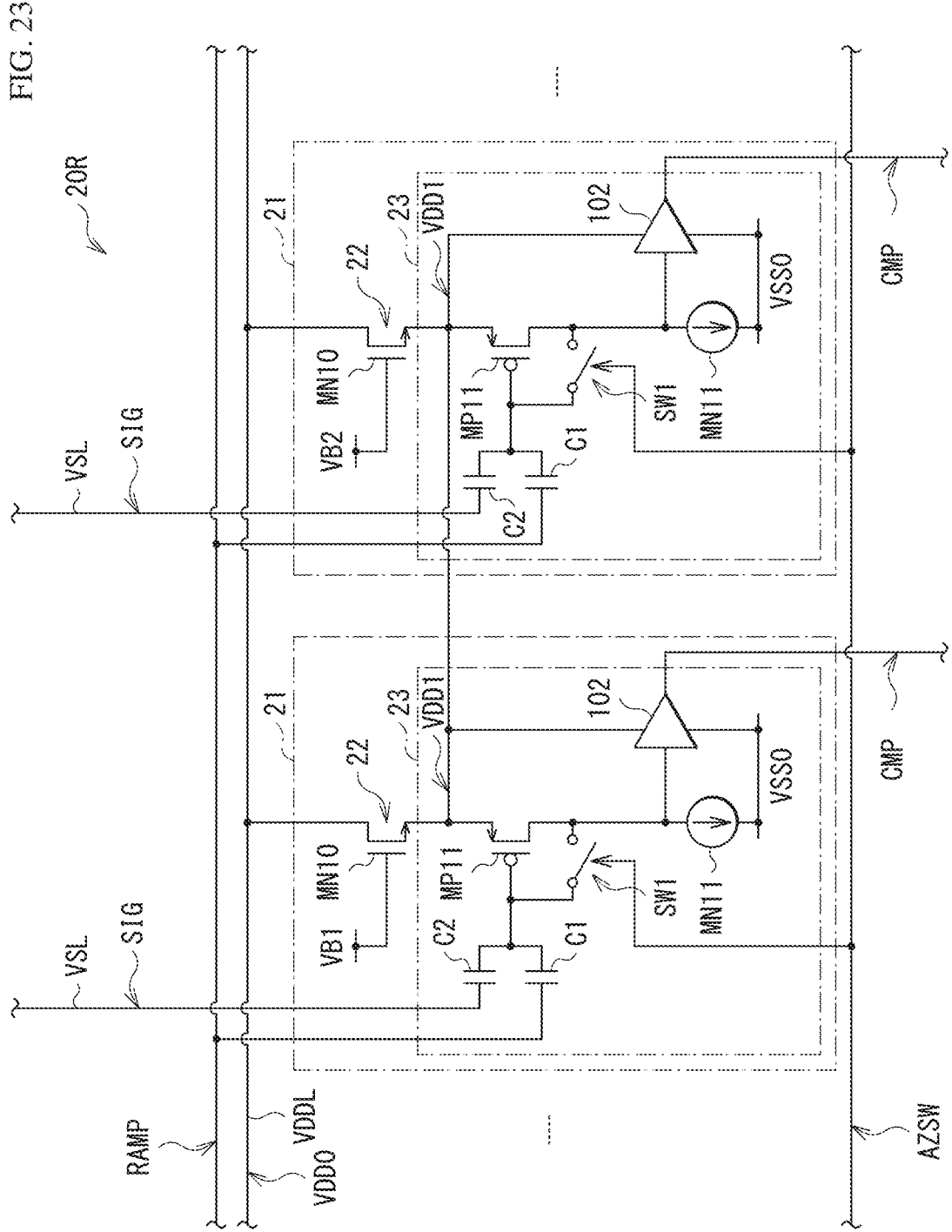
FIG. 23 is a circuit diagram illustrating a configuration example of the readout section illustrated in FIG. 22.

FIGS. 22 and 23 illustrate a configuration example of a readout section 20R in an imaging device 1R according to the present modification example. The readout section 20R includes a plurality of AD converters ADC. In this example, the output terminals of the power supply circuits 22 in two AD converters ADC are coupled to each other. Specifically, the output terminal of the power supply circuit 22 of the 0th AD converter ADC[0] and the output terminal of the power supply circuit 22 of the first AD converter ADC[1] are coupled to each other. Thus, these two power supply circuits 22 generate the power supply voltage VDD1. The comparison circuit 23 of the 0th AD converter ADC[0] and the comparison circuit 23 of the first AD converter ADC[1] perform an operation on the basis of the power supply voltage VDD1. In addition, the output terminal of the power supply circuit 22 of the second AD converter ADC[2] and the output terminal of the power supply circuit 22 of the third AD converter ADC[3] are coupled to each other. Thus, these two power supply circuits 22 generate the power supply voltage VDD1. The comparison circuit 23 of the second AD converter ADC[2] and the comparison circuit 23 of the third AD converter ADC[3] perform an operation on the basis of the power supply voltage VDD1. The same applies to fourth and subsequent AD converters. Thus, two power supply circuits 22 generate the power supply voltage VDD1, which makes it possible to decrease an output impedance of a circuit that generates the power supply voltage VDD1, and makes it possible to reduce circuit noise included in the power supply voltage VDD1 to $1/\sqrt{2}$, as compared with the embodiment described above.

It is to be noted that in this example, the output terminals of the power supply circuits 22 in two AD converters ADC are coupled to each other, but this is not limitative. Instead of this, the output terminals of the power supply circuits 22 in three or more AD converters ADC may be coupled to each other. For example, in a case where the output terminals of the power supply circuits 22 in N AD converters ADC are coupled to each other, it is possible to reduce circuit noise included in the power supply voltage VDD1 to $1/\sqrt{N}$.

Figure 24:
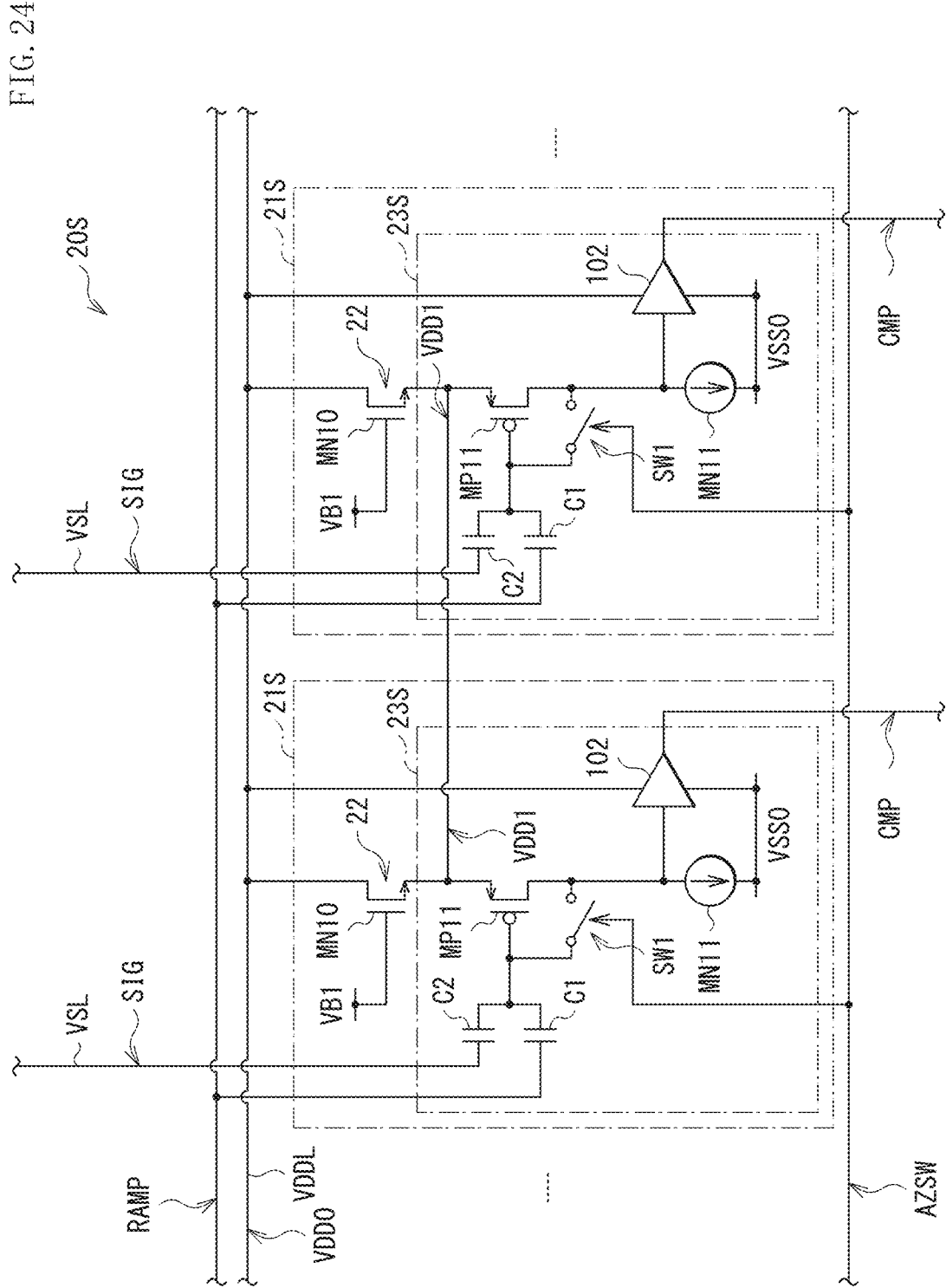
FIG. 24 is a circuit diagram illustrating a configuration example of a readout section according to another modification example.

In addition, in this example, as illustrated in FIG. 23, the post-stage circuit 102 performs an operation on the basis of the power supply voltage VDD1, but this is not limitative. Instead of this, for example, as with a readout section 20S illustrated in FIG. 24, the post-stage circuit 102 may perform an operation on the basis of the power supply voltage VDD0. The readout section 20S includes a plurality of comparators 21S. Each of the plurality of comparators 21S includes a comparison circuit 23S. The post-stage circuit 102 of the comparison circuit 23S performs an operation on the basis of the power supply voltage VDD0. This makes it possible to suppress an influence of the operation of the post-stage circuit 102 exerted on the power supply voltage VDD1 in the present modification example.

Modification Example 9

In the embodiment described above, the comparator 21 of each of the plurality of AD converters ADC includes the power supply circuit 22; however, another power supply circuit may be provided in addition to these power supply circuits 22. The present modification example is described in detail below.

Figure 25:
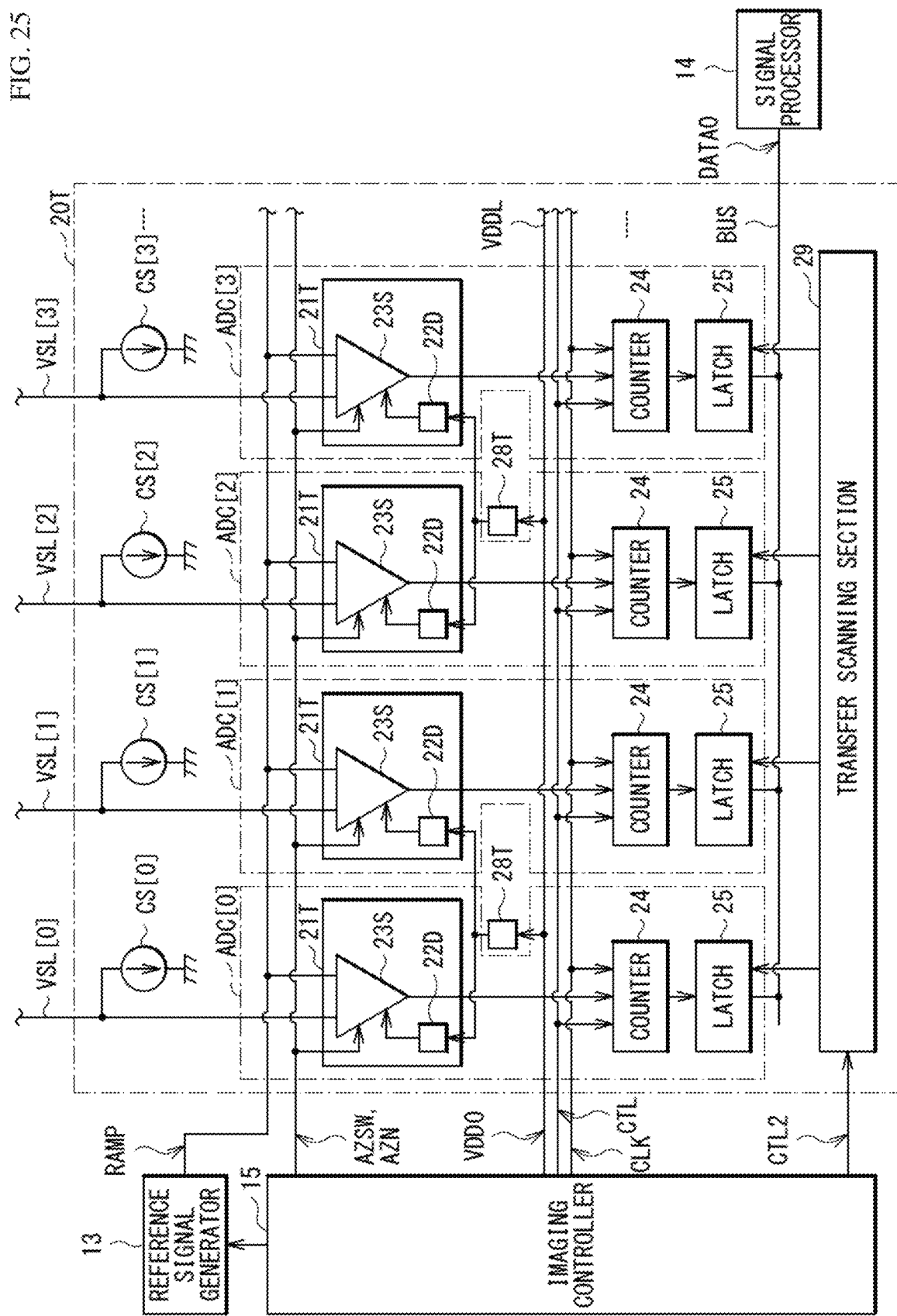
FIG. 25 is a circuit diagram illustrating a configuration example of a readout section according to another modification example.
Figure 26:
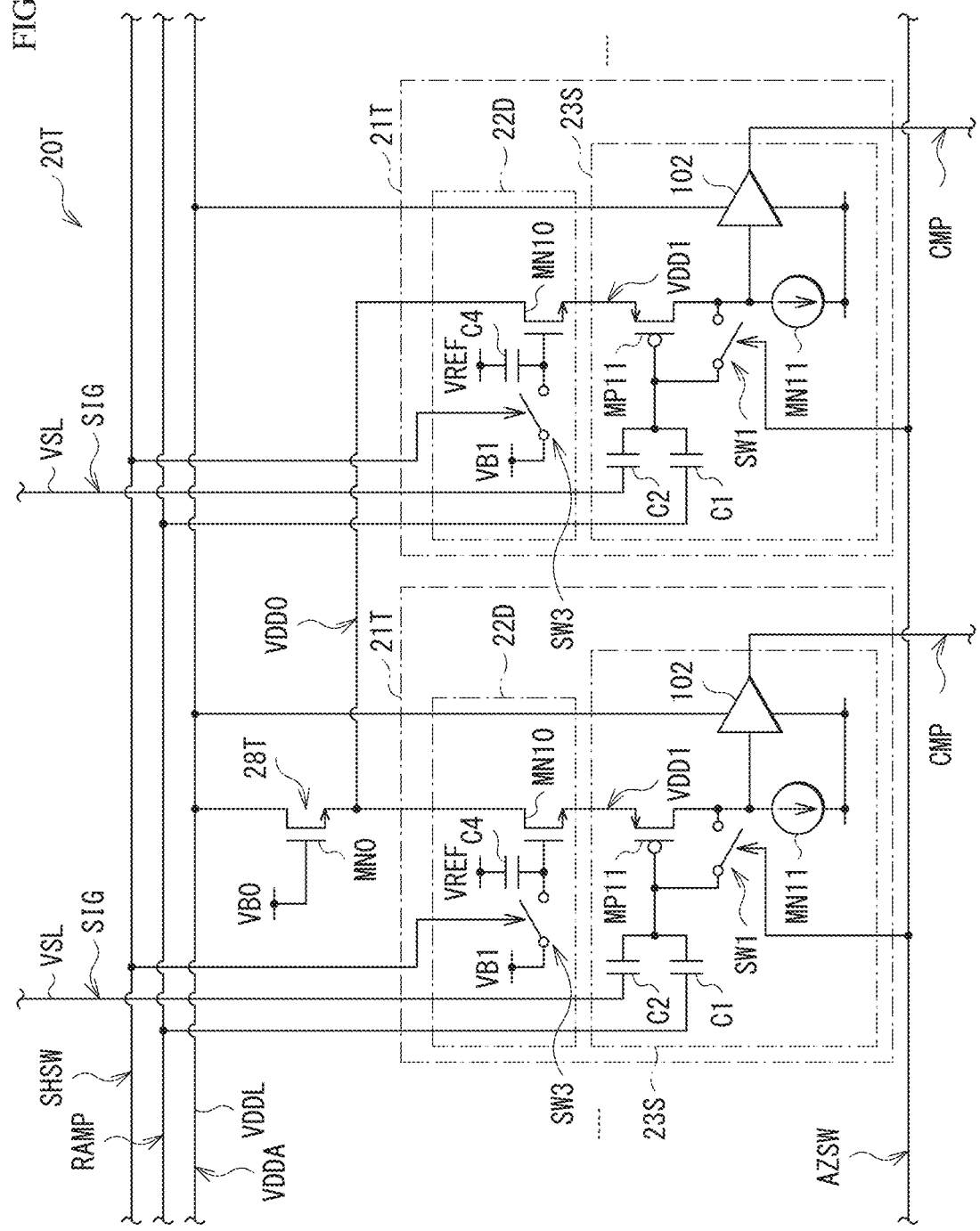
FIG. 26 is a circuit diagram illustrating a configuration example of the readout section illustrated in FIG. 25.

FIGS. 25 and 26 illustrates a configuration example of a readout section 20T in an imaging device IT according to the present modification example. The readout section 20T includes a plurality of AD converters ADC and a plurality of power supply circuits 28T. Each of the plurality of power supply circuits 28T is configured to generate the power supply voltage VDD0 on the basis of a power supply voltage VDDA supplied via the power supply line VDDL. Then, in this example, the power supply circuit 28T supplies the generated power supply voltage VDD0 to the comparators 21T of two AD converters ADC. The power supply circuit 28T includes a transistor MN0. The transistor MN0 is an N-type MOS transistor, and has a gate supplied with a bias voltage VB0, a drain coupled to the power supply line VDDL, and a source coupled to two comparators 21T. The power supply voltage VDDA and the bias voltage VB0 is generated by the imaging controller 15. The comparator 21T includes the power supply circuit 22D and a comparison circuit 23S. The drain of the transistor MN10 of the power supply circuit 22D is coupled to the source of the transistor MN0 of the power supply circuit 28T. The power supply circuit 28T and the power supply circuit 22D operate as two states of source followers.

Thus, in the readout section 20T, two stages of source followers are provided, which makes it possible to reduce a possibility that noise of the power supply voltage VDD0 generated by a transient current upon transition of the signal CMP0 by the comparator 21T in a certain AD converter ADC affects the operations of other AD converters ADC. As a result, it is possible to suppress interference among the plurality of AD converters ADC. In addition, in the readout section 20T, the power supply circuit 28T supplies the generated power supply voltage VDD0 to two comparators 21T in this example, which makes it possible to reduce the number of power supply circuits 28T. Accordingly, it is possible to reduce a circuit area.

It is to be noted that in this example, the power supply circuit 28T supplies the generated power supply voltage VDD0 to two comparators 21T, but this is not limitative. Instead of this, the power supply circuit 28T may supply the power supply voltage VDD0 to three or more comparators 21T.

Figure 27:
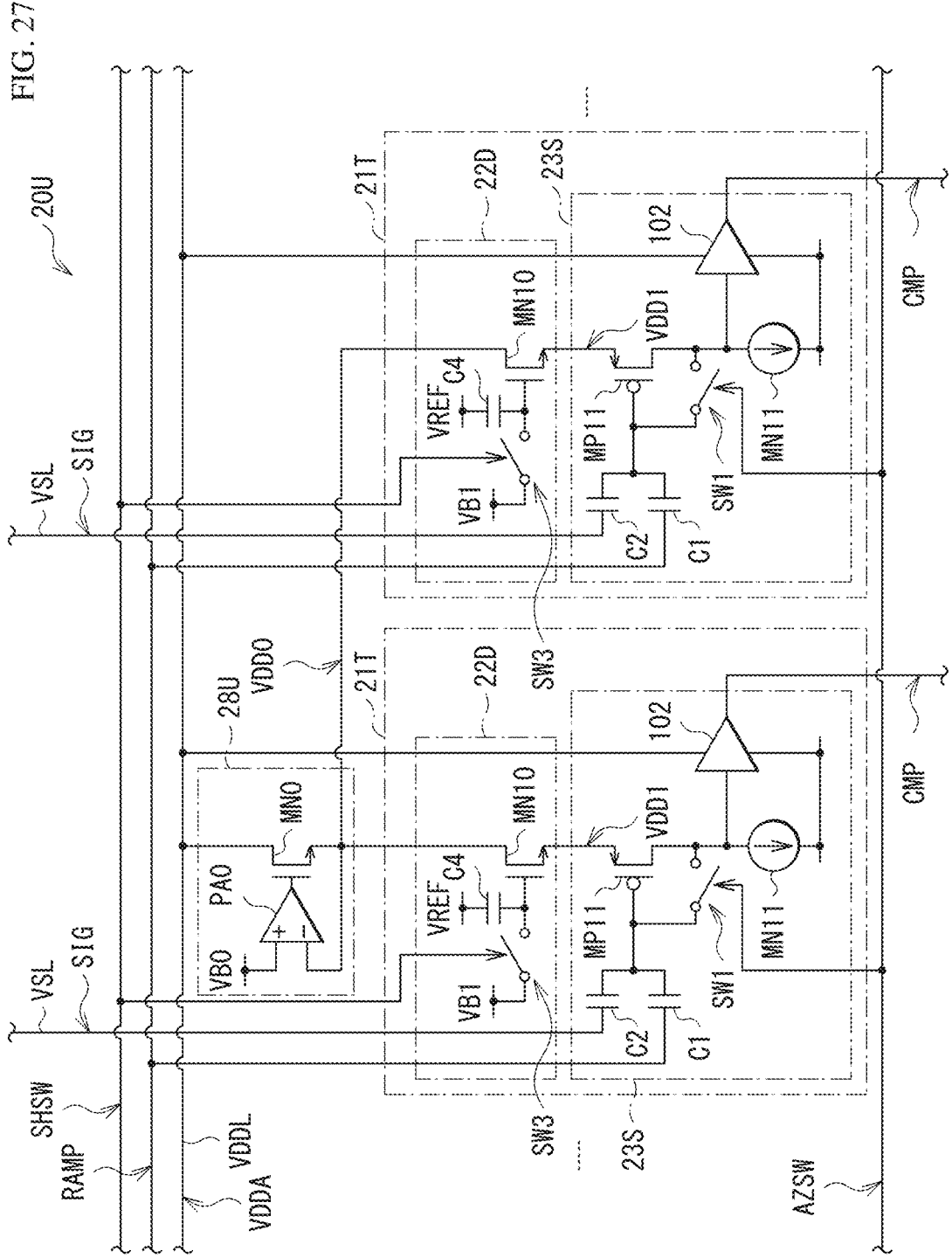
FIG. 27 is a circuit diagram illustrating a configuration example of a readout section according to another modification example.

In addition, in this example, as illustrated in FIG. 26, the power supply circuit 28T is configured by using the transistor MN0, but this is not limitative. Instead of this, for example, as with a readout section 20U illustrated in FIG. 27, a power supply circuit 28U may be configured by using the transistor MN0 and an operational amplifier OPA0. The operational amplifier OPA0 has a non-inverting input terminal supplied with the bias voltage VB0, and an inverting input terminal coupled to the source of the transistor MN0, and an output terminal coupled to the gate of the transistor MN0. Thus, the power supply circuit 28U is able to generate the stable power supply voltage VDD0. As a result, in the present modification example, it is possible to suppress interference among the plurality of AD converters ADC.

Modification Example 10

In addition, a variable resistor may be provided between output terminals of power supply circuits in two AD converters ADC adjacent to each other of a plurality of AD converters ADC. The present modification example is described in detail below.

Figure 28:
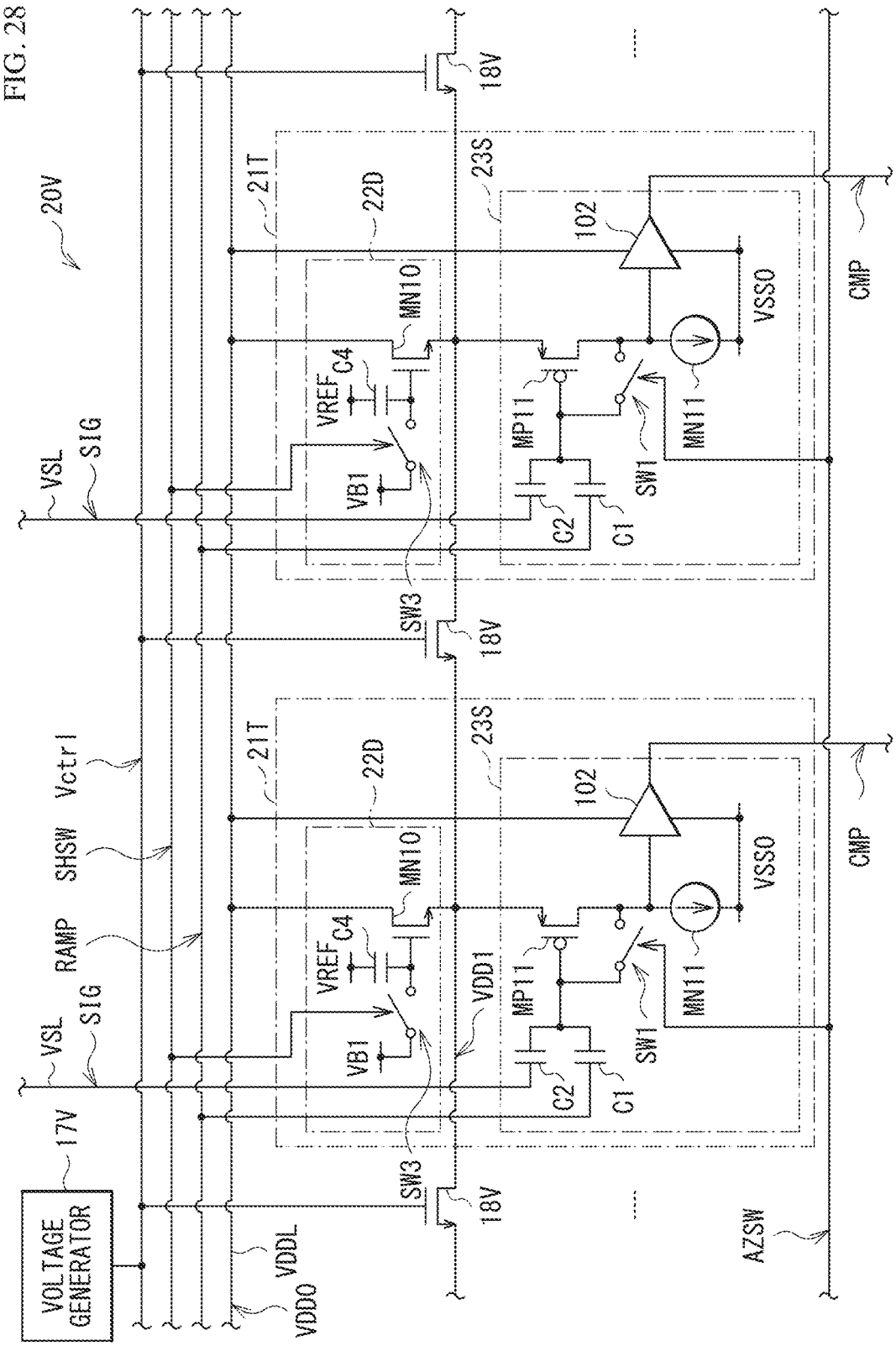
FIG. 28 is a circuit diagram illustrating a configuration example of a readout section according to another modification example.

FIG. 28 illustrates a configuration example of a readout section 20V in an imaging device 1V according to the present modification example. The readout section 20V includes a plurality of comparators 21T, a plurality of transistors 18V, and a voltage generator 17V. The transistor 18V is an N-type MOS transistor, and is provided between the output terminals of the power supply circuits 22D of every two AD converters ADC adjacent to each other of the plurality of AD converters ADC. The transistor 18V has a source coupled to the output terminal of a certain power supply circuit 22D, a drain coupled to the output terminal of the power supply circuit 22D adjacent to the certain power supply circuit 22D, and a gate supplied with a control voltage Vctrl. A drain-source resistance value in the transistor 18V is changed depending on the control voltage Vctrl. That is, the transistor 18V functions as a variable resistor. The voltage generator 17V is configured to generate the control voltage Vctrl.

With this configuration, for example, in a case where the resistance value of the transistor 18V is increased, a resistance value between the output terminals of a plurality of power supply circuits 22D is increased, which makes it possible to reduce, for example, a possibility that streaking occurs in a captured image, as with the case of the readout section 20 (FIG. 5) according to the embodiment described above. As a result, it is possible to enhance image quality of the captured image. In addition, in a case where the resistance value of the transistor 18V is decreased, the resistance value between the output terminals of the plurality of power supply circuits 22D is decreased, which makes it possible to decrease an output impedance, and makes it possible to reduce circuit noise included in the power supply voltage VDD1, as with the case of the readout section 20S (FIG. 24) according to the modification example 8.

It is to be noted that in this example, the variable resistor is configured by using an N-type MOS transistor, but this is not limitative. Instead of this, the variable resistor may be configured by using a P-type MOS transistor, for example.

In addition, in this example, all the plurality of AD converters ADC is coupled to each other via the transistor 18V, but this is not limitative. Instead of this, for example, the plurality of AD converters ADC may be divided into a plurality of groups each including two or more AD converters ADC, and the AD converters ADC belonging to the same group may be coupled to each other via the transistor 18V. In addition, a plurality of even-numbered AD converters ADC may be coupled to each other via the transistor 18V, and a plurality of odd-numbered AD converters ADC may be coupled to each other via the transistor 18V. Specifically, for example, the 0th AD converter ADC[0] and the second AD converter ADC[2] may be coupled to each other via the transistor 18V (a transistor 18V1), and the second AD converter ADC[2] and the fourth AD converter ADC[4] may be coupled to each other via the transistor 18V (a transistor 18V2). Likewise, the first AD converter ADC[1] and the third AD converter ADC[3] may be coupled to each other via the transistor 18V (a transistor 18V3), and the third AD converter ADC[3] and the fifth AD converter ADC[5] may be coupled to each other via the transistor 18V (a transistor 18V4).

In addition, in this example, one voltage generator 17V is provided, and the voltage generator 17V controls resistance values of all the transistors 18V, but this is not limitative. Instead of this, for example, a plurality of voltage generators may be provided, and the plurality of voltage generators may control resistance values of the transistors 18V different from each other.

Modification Example 11

Figure 29:
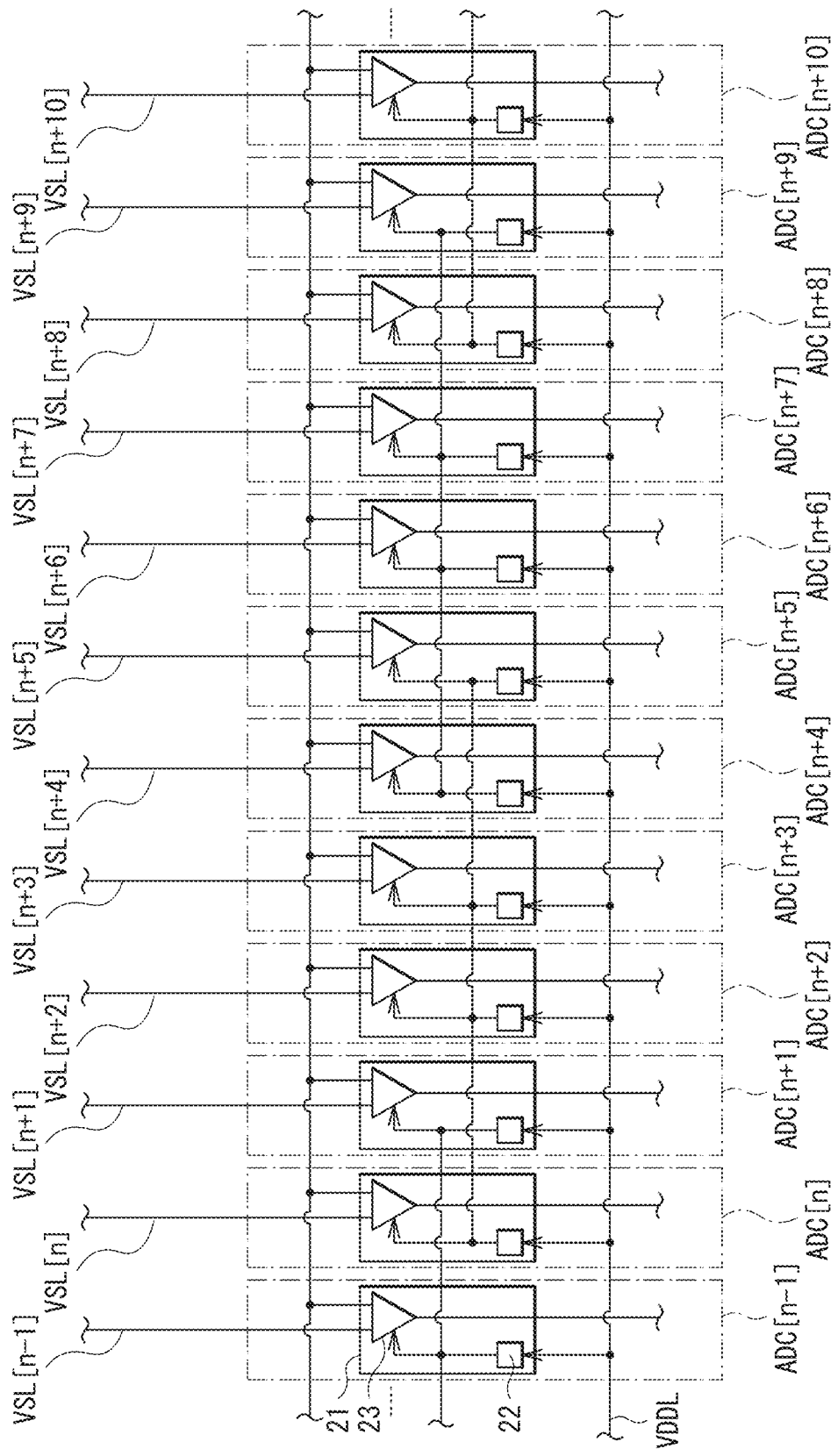
FIG. 29 is a circuit diagram illustrating a configuration example of a readout section according to another modification example.

In addition, as with a readout section 20W illustrated in FIG. 29, the output terminals of the power supply circuits 22 of two AD converters ADC that are not adjacent to each other may be coupled to each other. In this example, an nth AD converter ADC[n], an (n+2)th AD converter ADC[n+2], an (n+3)th AD converter ADC[n+3], and an (n+5)th AD converter ADC[n+5] are included in a group (a first group), and the output terminals of the power supply circuits 22 of a plurality of AD converters ADC belonging to this first group are coupled to each other. In addition, an (n+4)th AD converter ADC[n+4], an (n+6)th AD converter ADC[n+6], an (n+7)th AD converter ADC[n+7], and an (n+9)th AD converter ADC[n+9] are included in another group (a second group), and the output terminals of the power supply circuits 22 of a plurality of AD converters DC belonging to this second group are coupled to each other. That is, the power supply circuit 22 of the AD converter ADC[n+4] provided between the AD converter ADC[n+3] and the AD converter ADC[n+5] of which the power supply circuits 22 are coupled to each other is not coupled to these power supply circuits 22. Accordingly, for example, even in a case where streaking occurs in a captured image, it is possible to blur a boundary of the image, which makes it possible to make the streaking inconspicuous. Interference occurs among the plurality of AD converters ADC belonging to the first group, and similarly, interference occurs among the plurality of AD converters AC belonging to the second group. The degree of interference among the plurality of AD converters ADC belonging to the first group is different from the degree of interference among the plurality of AD converters ADC belonging to the second group. Accordingly, disposing the AD converters ADC belonging to the second group between the plurality of AD converters ADC belonging to the first group makes it possible to blur a boundary of an image based on a difference in the degree of interference.

Modification Example 12

In the embodiment described above, as illustrated in FIG. 4A, the comparison circuit 23 includes a single end type circuit, but this is not limitative. Instead of this, for example, the comparison circuit may include a differential type circuit. Comparators 31A and 31B according to the present modification example are described in detail below.

FIG. 30A illustrates a configuration example of the comparator 31A. The comparator 31A includes the power supply circuit 22 and a comparison circuit 33A. The comparison circuit 33A includes capacitors C31 to C33, transistors MN31 to MN33, switches SW31 and SW32, and transistors MP31 and MP32. The transistors MN31 to MN33 are N-type MOS transistors, and the transistors MP31 and MP32 are P-type MOS transistors.

The capacitors C31 and C32 each have one end and another end. The capacitor C31 has the one end supplied with the reference signal RAMP, and the other end coupled to the other end of the capacitor C32, a gate of the transistor MN31, and one end of the switch SW31. The capacitor C32 has the one end supplied with the signal SIG, and the other end coupled to the other end of the capacitor C31, the gate of the transistor MN31, and the one end of the switch SW31. The capacitor C33 has the one end supplied with the direct-current voltage VREF, and another end coupled to a gate of the transistor MN32 and one end of the switch SW32.

The transistor MN31 has the gate coupled to the other ends of the capacitors C31 and C32 and the one end of the switch SW31, a drain coupled to a drain of the transistor MP31, gates of the transistors MP31 and MP32, and another end of the switch SW31, and a source coupled to a source of the transistor MN32 and a drain of the transistor MN33. The transistor MN32 has the gate coupled to the other end of the capacitor C33, the one end of the switch SW32, a drain coupled to a drain of the transistor MP32, another end of the switch SW32, and the input terminal of the post-stage circuit 102, and the source coupled to the source of the transistor MN31 and the drain of the transistor MN33. The transistor MN33 has a gate supplied with the bias voltage VB2, the drain coupled to the sources of the transistors MN31 and MN32, and a source supplied with the ground voltage VSS0. The transistor MN33 operates as a current source, and the transistors MN31 and MN32 operate as a differential pair.

The switch SW31 is configured to be turned on and off on the basis of the control signal AZSW. The switch SW31 has the one end coupled to the other ends of the capacitors C31 and C32 and the gate of the transistor MN31, and the other end coupled to the drains of the transistors MN31 and MP31 and the gates of the transistors MP31 and MP32. The switch SW32 is configured to be turned on and off on the basis of the control signal AZSW. The switch SW32 has the one end coupled to the other end of the capacitor C33 and the gate of the transistor MN32, and the other end coupled to the drains of the transistors MN32 and MP32 and the input terminal of the post-stage circuit 102.

The transistor MP31 has the gate coupled to the gate of the transistor MP32, the drains of the transistors MP31 and MN31, and the other end of the switch SW31, the drain coupled to the gates of the transistors MP31 and MP32, the drain of the transistor MN31, and the other end of the switch SW31, and the source coupled to the sources of the transistors MN10 and MP32 and the power supply terminal of the post-stage circuit 102. The transistor MP32 has the gate coupled to the gate of the transistor MP31, the drains of the transistors MP31 and MN31, the other end of the switch SW31, the drain coupled to the input terminal of the post-stage circuit 102, the drain of the transistor MN32, and the other end of the switch SW32, and the source coupled to the sources of the transistors MN10 and MP31 and the power supply terminal of the post-stage circuit 102. The transistors MP31 and MP32 operate as loads of the transistors MN31 and MN32 that are a differential pair.

Here, the transistor MN31 corresponds to a specific example of a "first transistor" in the present disclosure. The transistor MN32 corresponds to a specific example of a "fifth transistor" in the present disclosure. The capacitor C33 corresponds to a specific example of a "third capacitor" in the present disclosure. The switch SW32 corresponds to a specific example of a "third switch" in the present disclosure. The transistors MP31 and MP32 correspond to specific examples of a "load circuit" in the present disclosure. The transistor MN33 corresponds to a specific example of a "first current source" in the present disclosure.

FIG. 30B illustrates a configuration example of the comparator 31B. The comparator 31B includes the power supply circuit 22A and a comparison circuit 33B. The comparison circuit 33B includes capacitors C41 to C43, transistors MP1 to MP43, switches SW41 and SW42, and transistors MN41 and MN42. The transistors MP41 to MP43 are P-type MOS transistors, and the transistors MN41 and MN42 are N-type MOS transistors. The capacitors C41 to C43 of the comparator 31B respectively correspond to the capacitors C31 to C33 of the comparator 31A. The transistors MP41 to MP43 of the comparator 31B respectively correspond to the transistors MN31 to MN33 of the comparator 31A. The switches SW41 and SW42 of the comparator 31B respectively correspond to the switches SW31 and SW32 of the comparator 31A. The transistors MN41 and MN42 of the comparator 31B respectively correspond to the transistors MP31 and MP32 of the comparator 31A.

Modification Example 13

In the embodiment described above, for example, as illustrated in FIG. 4A, the comparison circuit 23 combines the voltage of the signal SIG and the voltage of the reference signal RAMP with use of the capacitors C1 and C2, and performs a comparison operation on the basis of a thus-combined voltage, but this is not limitative. Comparators 51A and 51B according to the present modification example are described in detail below.

FIG. 31A illustrates a configuration example of the comparator 51A. The comparator 51A includes the power supply circuit 22 and a comparison circuit 53A. The comparison circuit 53A includes capacitors C51 and C52. The capacitor C51 has one end supplied with the reference signal RAMP and another end coupled to the gate of the transistor MN31 and the one end of the switch SW31. The capacitor C52 has one end supplied with the signal SIG and another end coupled to the gate of the transistor MN32 and the one end of the switch SW32. Here, the capacitor C51 corresponds to a specific example of a "first capacitor" in the present disclosure. The capacitor C52 corresponds to a specific example of a "second capacitor" in the present disclosure.

FIG. 31B illustrates a configuration example of the comparator 51B. The comparator 51B includes the power supply circuit 22A and a comparison circuit 53B. The comparison circuit 53B includes capacitors C61 and C62. The capacitor C61 has one end supplied with the reference signal RAMP, and another end coupled to a gate of the transistor MP41 and one end of the switch SW41. The capacitor C62 has one end supplied with the signal SIG, and another end coupled to a gate of the transistor MP42 and one end of the switch SW42.

Other Modification Examples

In addition, two or more of these modification examples may be combined.

2. Usage Examples of Imaging Device

Figure 32:
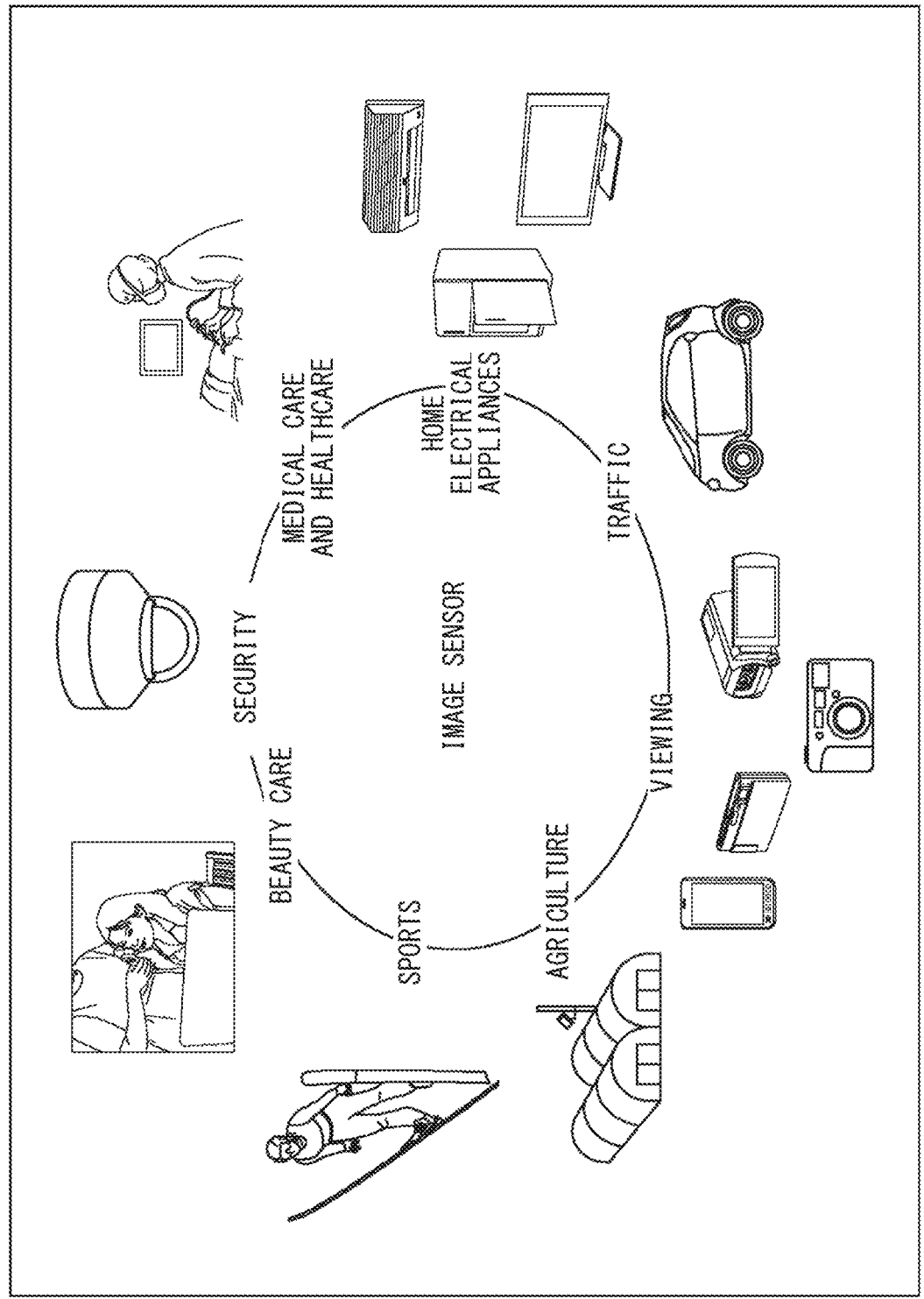
FIG. 32 is an explanatory diagram illustrating a usage example of the imaging device.

FIG. 32 illustrates usage examples of the imaging device 1 according to the embodiment described above. For example, the imaging device 1 described above is usable in a variety of cases of sensing light such as visible light, infrared light, ultraviolet light, and X-rays as follows.

- Devices that shoot images for viewing such as digital cameras and mobile devices having a camera function
- Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measuring sensors that measure a distance between vehicles and the like
- Devices for use in home electrical appliances such as televisions, refrigerators, and air-conditioners to shoot images of user's gesture and operate the appliances in accordance with the gesture
- Devices for medical care and healthcare use such as endoscopes and devices that shoot images of blood vessels by receiving infrared light
- Devices for security use such as monitoring cameras for crime prevention and cameras for individual authentication
- Devices for beauty care use such as skin measuring devices that shoot images of skin and microscopes that shoot images of scalp
- Devices for sports use such as action cameras and wearable cameras for sports applications, etc.
- Devices for agricultural use such as cameras for monitoring fields and crops 3. Application Example to Mobile Body The technology (the present technology) according to the present disclosure is applicable to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, and a robot.

Figure 33:
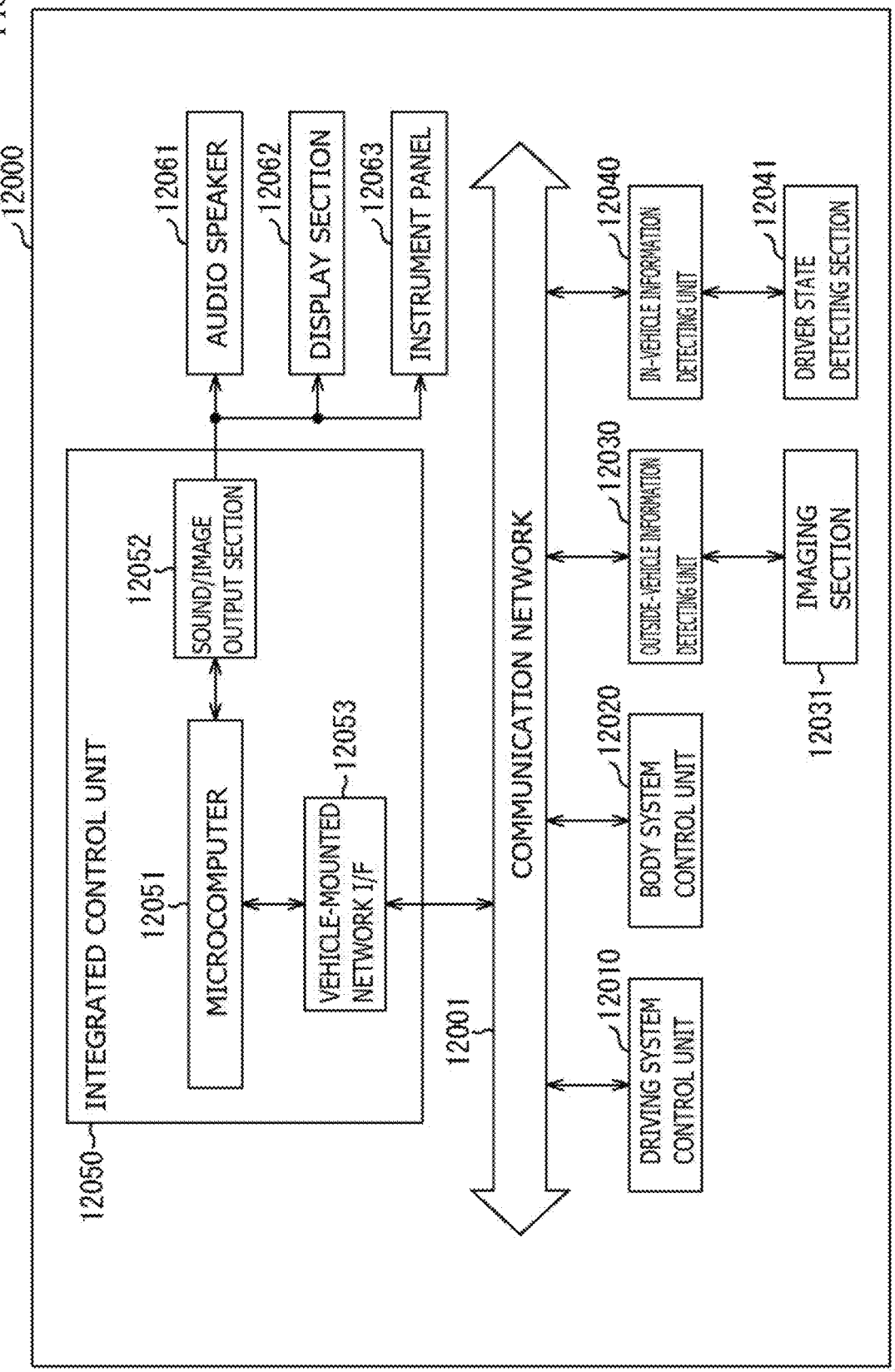
FIG. 33 is a block diagram depicting an example of schematic configuration of a vehicle control system.

FIG. 33 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 33, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (U/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 33, an audio speaker 12061, a display section 12062, and an instrument panel 12063 are illustrated as the output device. The display section 12062 may, for example, include at least one of an on-board display and a head-up display.

Figure 34:
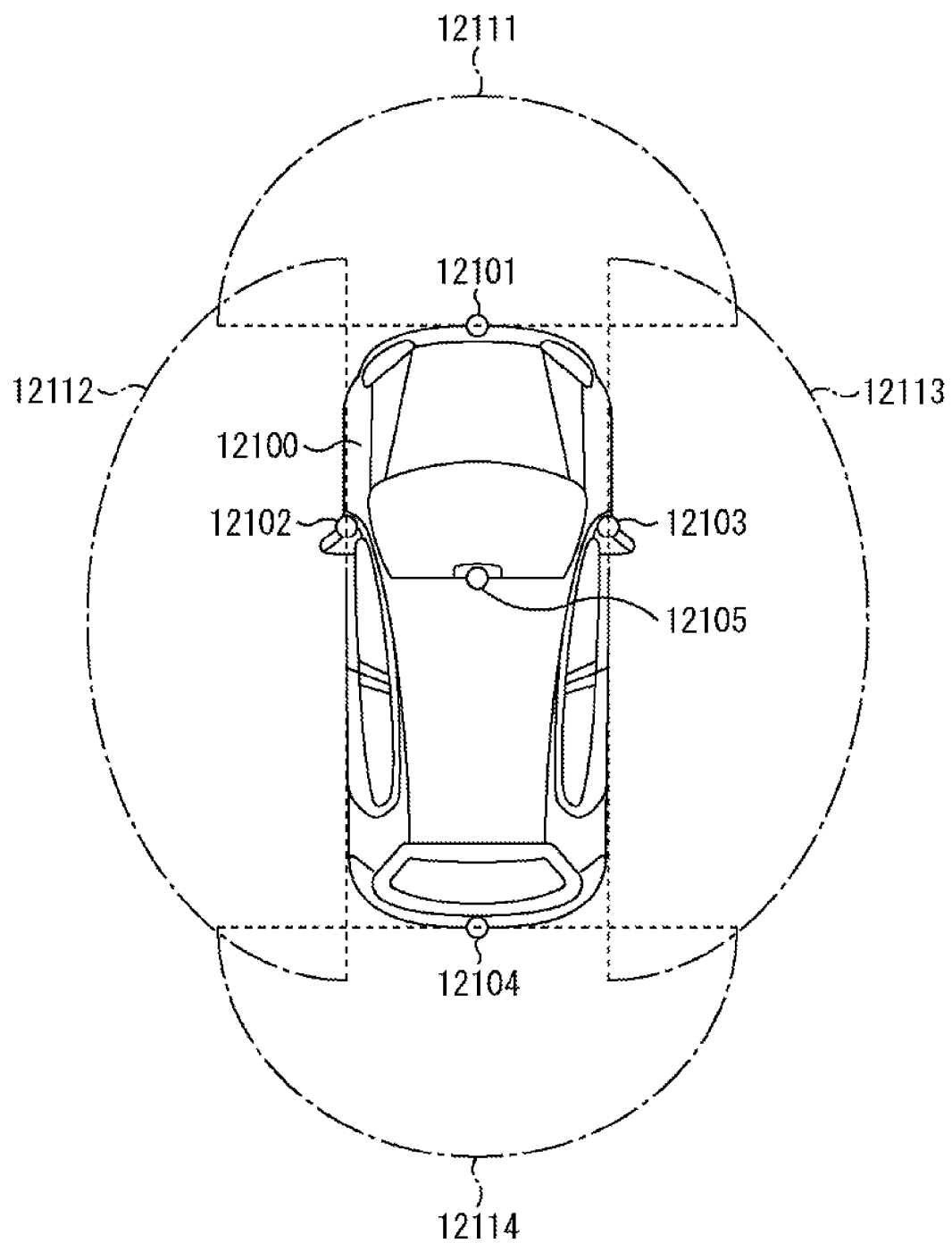
FIG. 34 is a diagram of assistance in explaining an example of installation positions of an outside-vehicle information detecting section and an imaging section.

FIG. 34 is a diagram depicting an example of the installation position of the imaging section 12031.

In FIG. 34, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally. FIG. 23 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure may be applied has been described above. The technology according to the present disclosure may be applied to the imaging section 12031 among the components described above. This makes it possible to enhance image quality of a captured image in the vehicle control system 12000. This allows the vehicle control system 12000 to enhance the accuracy of collision avoidance or shock mitigation for vehicles, a following driving function based on a following distance, a vehicle speed maintaining driving function, a warning function of collision of the vehicle, a warning function of deviation of the vehicle from a lane, and the like.

4. Application Example to Distance Measuring Device

Next, one example in a case where the present technology is applied to a distance measuring device is described in detail.

Figure 35:
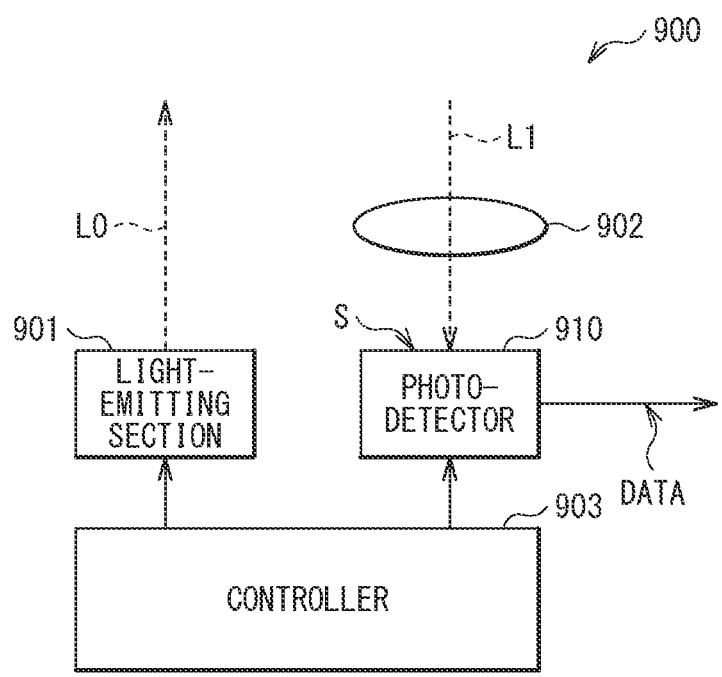
FIG. 35 is a block diagram illustrating a configuration example of a distance measuring device according to an application example.

FIG. 35 illustrates a configuration example of a distance measuring device 900 according to the present application example. The distance measuring device 900 is configured to measure a distance to a measurement object OBJ by an indirect method. The distance measuring device 900 includes a light-emitting section 901, an optical system 902, a photodetector 910, and a controller 903.

The light-emitting section 901 is configured to emit an optical pulse L0 toward the measurement object OBJ. The light-emitting section 901 emits the optical pulse 10 on the basis of an instruction from the controller 903 by performing a light-emitting operation in which light emission and non-light emission are alternately repeated. The light-emitting section 901 includes, for example, a light source that emits infrared light. The light source is configured by using, for example, a laser light source, an LED (Light Emitting Diode), or the like.

The optical system 902 includes a lens that forms an image on a light reception surface S of the photodetector 910. An optical pulse (a reflected optical pulse L1) emitted from the light-emitting section 901 and reflected by the measurement object OBJ enters the optical system 902.

The photodetector 910 is configured to generate a distance image PIC on the basis of an instruction from the controller 903 by detecting light. Each of a plurality of pixel values included in the distance image PIC indicates a value about a distance D to the measurement object OBJ. Then, the photodetector 910 outputs the generated distance image PIC as the image signal DATA.

The controller 903 is configured to supply a control signal to the light-emitting section 901 and the photodetector 910 and control operations of the light-emitting section 901 and the photodetector 910, thereby controlling an operation of the distance measuring device 900.

Figure 36:
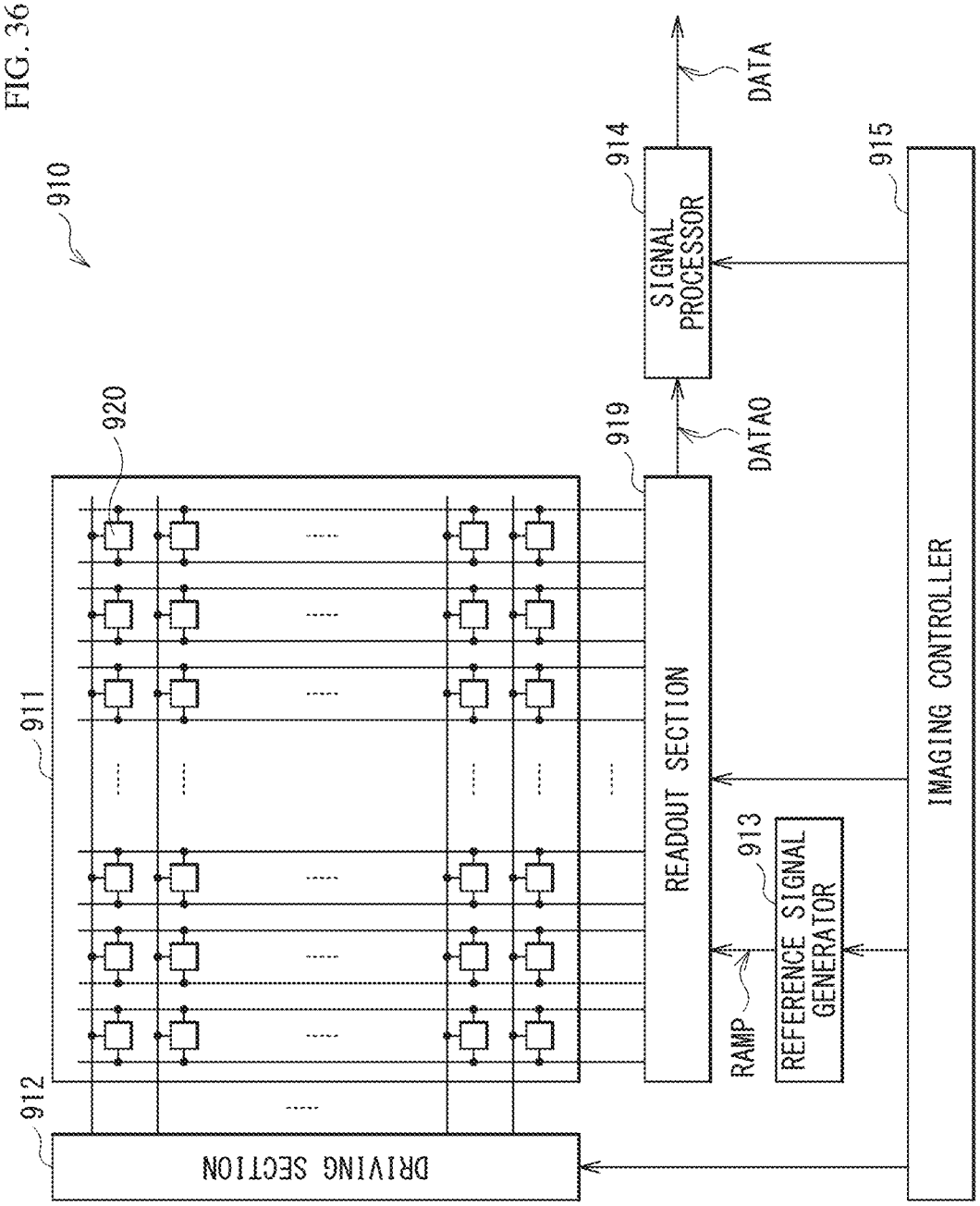
FIG. 36 is a block diagram illustrating a configuration example of a photodetector illustrated in FIG. 35.

FIG. 36 illustrates a configuration example of the photodetector 910. The photodetector 910 includes a pixel array 911, a driving section 912, a reference signal generator 913, a readout section 919, a signal processor 914, and an imaging controller 915. For example, the pixel array 911, the driving section 912, the reference signal generator 913, the readout section 919, the signal processor 914, and the imaging controller 915 may be formed in one semiconductor substrate. In addition, the pixel array 911 may be formed in one semiconductor substrate, and the driving section 912, the reference signal generator 913, the readout section 919, the signal processor 914, and the imaging controller 915 may be formed in another semiconductor substrate. These two semiconductor substrates may be superimposed on each other.

The pixel array 911 includes a plurality of pixels 920 arranged in a matrix. The pixels 920 each are configured to generate the pixel voltage Vpix corresponding to an amount of received light.

FIG. 37 illustrates a configuration example of the pixel 920. The pixel array 911 includes a plurality of control lines 931A, a plurality of control lines 931B, a plurality of control lines 932A, a plurality of control lines 932A, a plurality of control lines 933, a plurality of signal lines 939A, and a plurality of signal lines 939B.

The pixels 920 each include a photodiode 921, floating diffusions 923A and 923B, and transistors 922A, 922B, 924A, 924B, 925A, 925B. 926A, and 926B. A circuit including the photodiode 921, the floating diffusion 923A, and the transistors 922A, 924A, 925A, and 926A is also referred to as a tap A. In addition, a circuit including the photodiode 921, the floating diffusion 923B, and the transistors 922B, 924B, 925B, and 926B is also referred to as a tap B.

In the tap A, the transistor 922A has a gate coupled to the control line 931A, a source coupled to the photodiode 921, and a drain coupled to the floating diffusion 923A. The floating diffusion 923A is configured to accumulate electric charges supplied from the photodiode 921 via the transistor 922A. The transistor 924A has a gate coupled to the control line 932A, a drain supplied with the power supply voltage VDD, and a source coupled to the floating diffusion 923A. The transistor 925A has a gate coupled to the floating diffusion 923A, a drain supplied with the power supply voltage VDD, and a source coupled to a drain of the transistor 926A. The transistor 926A has a gate coupled to the control line 933, the drain coupled to the source of the transistor 925A, and a source coupled to the signal line 939A. The tap A has been described above as an example, and the same applies to the tap B.

With this configuration, in each of the pixels 920, the transistor 924A is turned on to reset the floating diffusion 923A, and the transistor 924B is turned on to reset the floating diffusion 923B. Then, one of the transistors 922A and 922B is alternately turned on to selectively accumulate electric charges generated by the photodiode 921 in the floating diffusion 923A and the floating diffusion 923B. Then, the transistors 926A and 926B are turned on to cause the pixel 920 to output, to the signal line 939A, a pixel signal corresponding to an amount of electric charges accumulated in the floating diffusion 923A and output, to the signal line 939B, a pixel signal corresponding to an amount of electric charges accumulated in the floating diffusion 923B.

The driving section 912 (FIG. 36) is configured to sequentially drive the plurality of pixels 920 in the pixel array 911 in units of the pixel lines L on the basis of an instruction from the imaging controller 915. The reference signal generator 913 is configured to generate the reference signal RAMP on the basis of an instruction from the imaging controller 915. The readout section 919 is configured to generate the image signal DATA0 on the basis of an instruction from the imaging controller 915 by performing AD conversion on the basis of the pixel signals supplied from the pixel array 911 via the signal lines 939A and 939B. The signal processor 914 is configured to generate the distance image PIC on the basis of an instruction from the imaging controller 915 by performing predetermined signal processing on the image signal DATA0, and output the image signal DATA including the distance image PIC. The imaging controller 915 is configured to supply a control signal to the driving section 912, the reference signal generator 913, the readout section 919, and the signal processor 914, and control operations of these circuits, thereby controlling an operation of the photodetector 910.

FIG. 38 illustrates an operation example of the distance measuring device 900. (A) of FIG. 38 indicates a waveform of the optical pulse L0 to be emitted from the light-emitting section 901, and (B) of FIG. 38 indicates a waveform of the reflected optical pulse L1 to be detected by the photodetector 910.

The light-emitting section 901 emits the optical pulse L0 having a pulse waveform with a duty ratio of 50% on the basis of an instruction from the controller 903 ((A) of FIG. 38). The optical pulse L0 travels toward the measurement object OBJ. Then, the optical pulse L0 is reflected by the measurement object OBJ, and the reflected optical pulse L1 thus-reflected travels toward the photodetector 910. Then, the pixel 920 of this photodetector 910 detects the reflected optical pulse L1 ((B) of FIG. 38). The reflected optical pulse L1 detected by the pixel 920 has a waveform delayed by a delay time DL with respect to the waveform of the optical pulse L0 illustrated in (A) of FIG. 38. The delay time DL is a time in which light travels in order of the light-emitting section 901, the measurement object OBJ, and the photodetector 910, and corresponds to flight time of light. The flight time of light corresponds a distance between the distance measuring device 900 and the measurement object OBJ.

In the indirect method, the floating diffusion 923A of the pixel 920 accumulates signal electric charges Q1 corresponding to an amount of light received by the photodiode 921 in a period 941 in which the light-emitting section 901 emits light, and the floating diffusion 923B of the pixel 920 accumulates signal electric charges Q2 corresponding to the amount of light received by the photodiode 921 in a period 942 in which the light-emitting section 901 does not emit light. Then, the signal processor 914 determines an electric charge ratio between the signal electric charges Q1 and the signal electric charges Q2. The photodiode 921 detects light in the periods 951 and 952; therefore, the electric charge amount of the signal electric charges Q1 is proportional to the length of the period 951, and the electric charge amount of the signal electric charges Q2 is proportional to the length of the period 952. In a case where the delay time DL is short, the signal electric charges Q1 are increased and the signal electric charges Q2 are decreased. In a case where the delay time DL is long, the signal electric charges Q1 are decreased, and the signal electric charges Q2 are increased. Thus, the electric charge ratio between the signal electric charges Q1 and the signal electric charges Q2 is changed depending on the delay time DL. In the indirect method, determining the electric charge ratio makes it possible to determine the delay time DL with high accuracy, for example. As a result, it is possible to measure a distance to the measurement object OBJ with high accuracy. The present technology is applicable to the readout section 919. This makes it possible to enhance image quality of a distance image.

An example of the distance measuring device 900 to which the technology according to the present disclosure may be applied has been described above. The technology according to the present disclosure may be applied to such a distance measuring device 900. This makes it possible to enhance image quality of the distance image in the distance measuring device 900.

Although the present technology has been described above referring to some embodiments, the modification examples, and specific application examples thereof, the present technology is not limited to these embodiments and the like, and may be modified in a variety of ways.

For example, in the embodiment described above, the pixel P is configured as illustrated in FIG. 2, but this is not limitative. It is possible to use pixels having various configurations.

It is to be noted that the effects described herein are merely illustrative and non-limiting, and other effects may be provided.

It is to be noted that the present technology may have the following configurations. According to the present technology having the following configurations, it is possible to enhance image quality.

(1)

A photodetection device including:

a first pixel that is configured to generate a first pixel signal;

a reference signal generator that is configured to generate a reference signal, and a first comparator including a first power supply circuit and a first comparison circuit, the first power supply circuit configured to generate a first power supply voltage on the basis of a power supply voltage supplied from a first power supply node and a bias voltage and configured to output the first power supply voltage from an output terminal, and the first comparison circuit configured to operate on the basis of the first power supply voltage and configured to perform a comparison operation on the basis of the first pixel signal and the reference signal.

(2)

The photodetection device according to (1), in which the first comparison circuit includes a first current source coupled to a second power supply node.

(3)

The photodetection device according to (2), in which the first pixel is configured to output the first pixel signal from an output terminal, the reference signal generator is configured to output the reference signal from an output terminal, and the first comparison circuit includes a first transistor having a gate, a drain, and a source, a first capacitor having a first terminal coupled to the output terminal of the reference signal generator, and a second terminal coupled to the gate of the first transistor, a second capacitor having a first terminal coupled to the output terminal of the first pixel, and a second terminal coupled to the gate of the first transistor, and a first switch that is configured to couple the gate of the first transistor and the drain of the first transistor to each other by being turned on.

(4)

The photodetection device according to (3), in which the source of the first transistor is coupled to the output terminal of the first power supply circuit, and the drain of the first transistor is coupled to the first current source.

(5)

The photodetection device according to (4), in which the first comparison circuit further includes a second transistor having a gate coupled to the drain of the first transistor, a drain, and a source, a third transistor having a gate, a drain coupled to the drain of the second transistor, and a source coupled to the second power supply node, and a second switch that is configured to couple the gate of the third transistor and the drain of the third transistor to each other by being turned on.

(6)

The photodetection device according to (5), in which the first comparator further includes a fourth transistor that has a gate coupled to the drain of the second transistor, a drain coupled to the output terminal of the first power supply circuit, and a source coupled to the drain of the first transistor.

(7)

The photodetection device according to (3), in which the source of the first transistor is coupled to the first current source, and the first comparison circuit includes a fifth transistor having a gate, a drain, and a source coupled to the first current source, a third capacitor coupled to the gate of the fifth transistor, a third switch that is configured to couple the gate of the fifth transistor and the drain of the fifth transistor to each other by being turned on, and a load circuit coupled to the output terminal of the first power supply circuit, the drain of the first transistor, and the drain of the fifth transistor.

(8)

The photodetection device according to (2), in which the first pixel is configured to output the first pixel signal from an output terminal, the reference signal generator is configured to output the reference signal from an output terminal, and the first comparison circuit includes a first transistor having a gate, a drain, and a source coupled to the first current source, a fifth transistor having a gate, a drain, and a source coupled to the first current source, a first capacitor having a first terminal coupled to the output terminal of the reference signal generator, and a second terminal coupled to the gate of the first transistor, a second capacitor having a first terminal coupled to the output terminal of the first pixel, and a second terminal coupled to the gate of the fifth transistor,
a first switch that is configured to couple the gate of the first transistor and the drain of the first transistor to each other by being turned on,
a third switch that is configured to couple the gate of the fifth transistor and the drain of the fifth transistor to each other by being turned on, and
a load circuit coupled to the output terminal of the first power supply circuit, the drain of the first transistor, and the drain of the fifth transistor.

(9)
The photodetection device according to (7) or (8), in which the load circuit includes the load circuit includes
a first load transistor having a gate, a drain coupled to the drain of the first transistor, and a source coupled to the output terminal of the first power supply circuit, and
a second load transistor having a gate coupled to the gate of the first load transistor, a drain coupled to the drain of the fifth transistor, and a source coupled to the output terminal of the first power supply circuit.

(10)
The photodetection device according to (2), in which
the first pixel is configured to output the first pixel signal from an output terminal,
the reference signal generator is configured to output the reference signal from an output terminal, and
the first comparison circuit includes
a first transistor having a gate, a drain, and a source coupled to the output terminal of the first power supply circuit,
a sixth transistor having a gate, a drain coupled to the first current source, and a source coupled to the drain of the first transistor,
a first capacitor having a first terminal coupled to the output terminal of the reference signal generator, and a second terminal coupled to the gate of the first transistor,
a second capacitor having a first terminal coupled to the output terminal of the first pixel, and a second terminal coupled to the gate of the first transistor, and
a first switch that is configured to couple the gate of the first transistor and the drain of the sixth transistor to each other by being turned on.

(11)
The photodetection device according to any one of (3) to (10), in which
the bias voltage includes a first bias voltage, and
the first power supply circuit includes a first power supply transistor that has a gate configured to be supplied with the first bias voltage, a drain coupled to the first power supply node, and a source coupled to the source of the first transistor.

(12)
The photodetection device according to any one of (3) to (10), in which
the bias voltage includes a first bias voltage and a second bias voltage, and
the first power supply circuit includes
a first power supply transistor having a gate configured to be supplied with the first bias voltage, a drain coupled to the first power supply node, and a source, and
a second power supply transistor having a gate configured to be supplied with the second bias voltage, a drain coupled to the source of the first power supply transistor, and a source coupled to the source of the first transistor.

(13)
The photodetection device according to (11) or (12), in which the first power supply circuit further includes a fourth switch that is configured to supply the gate of the first power supply transistor with the first bias voltage by being turned on.

(14)
The photodetection device according to (13), in which the first power supply circuit further includes a fourth capacitor coupled to the gate of the first power supply transistor.

(15)
The photodetection device according to (11) or (12), in which the first power supply circuit further includes an operational amplifier having a non-inverting input terminal configured to be supplied with the first bias voltage, an inverting input terminal coupled to the source of the first power supply transistor, and an output terminal coupled to the gate of the first power supply transistor.

(16)
The photodetection device according to (11) or (12), in which the first power supply transistor further has a back gate coupled to the source of the first power supply transistor.

(17)
The photodetection device according to (11) or (12), further including a voltage generator that is configured to output a predetermined voltage from an output terminal, in which
the first power supply transistor further has a back gate coupled to the output terminal of the voltage generator.

(18)
The photodetection device according to (12), in which the first power supply circuit further includes a fifth switch that is configured to supply the gate of the second power supply transistor with the second bias voltage by being turned on.

(19)
The photodetection device according to any one of (3) to (6), in which the first transistor further has a back gate coupled to the source of the first transistor.

(20)
The photodetection device according to any one of (2) to (19), in which the first current source includes a first current source transistor that has a gate, a drain, and a source coupled to the second power supply node.

(21)
The photodetection device according to any one of (2) to (19), in which
the first current source includes
a first current source transistor having a gate, a drain, and a source coupled to the second power supply node, and
a second current source transistor having a gate, a drain, and a source coupled to the drain of the first current source transistor.

(22)
The photodetection device according to (20), in which the first current source further includes a sixth switch that is configured to supply the gate of the first current source transistor with a third bias voltage by being turned on.

(23)
The photodetection device according to any one of (1) to (22), further including:
a second pixel that is configured to generate a second pixel signal, and a second comparator including a second power supply circuit and a second comparison circuit, the second power supply circuit configured to generate a second power supply voltage on the basis of the power supply voltage supplied from the first power supply node and the bias voltage and configured to output the second power supply voltage from an output terminal, and the second comparison circuit configured to operate on the basis of the second power supply voltage and configured to perform the comparison operation on the basis of the second pixel signal and the reference signal.

(24)

The photodetection device according to (23), in which the output terminal of the second power supply circuit is coupled to the output terminal of the first power supply circuit.

(25)

The photodetection device according to (24), further including:
- a third pixel that is configured to generate a third pixel signal; and
- a third comparator including a third power supply circuit and a third comparison circuit, the third power supply circuit configured to generate a third power supply voltage on the basis of the power supply voltage supplied from the first power supply node and the bias voltage and configured to output the third power supply voltage from an output terminal, and the third comparison circuit configured to operate on the basis of the third power supply voltage and configured to perform the comparison operation on the basis of the third pixel signal and the reference signal, in which
- the output terminal of the third power supply circuit is electrically insulated from the output terminal of the first power supply circuit, and is electrically insulated from the output terminal of the second power supply circuit, and
- the third comparator is provided between the first comparator and the second comparator.

(26)

The photodetection device according to (23), further including a variable resistor having a first terminal coupled to the output terminal of the first power supply circuit, and a second terminal coupled to the output terminal of the second power supply circuit.

(27)

The photodetection device according to (23), further including a fourth power supply circuit that is configured to generate the power supply voltage on the basis of another power supply voltage supplied from a third power supply node, and is configured to output the power supply voltage to the first power supply node.

(28)

An electronic apparatus including:
- a photodetection device; and
- a processor that controls an operation of the photodetection device,
- the photodetection device including
- a first pixel that is configured to generate a first pixel signal,
- a reference signal generator that is configured to generate a reference signal, and
- a first comparator including a first power supply circuit and a first comparison circuit, the first power supply circuit configured to generate a first power supply voltage on the basis of a power supply voltage supplied from a first power supply node and a bias voltage and configured to output the first power supply voltage from an output terminal, and the first comparison circuit configured to operate on the basis of the first power supply voltage and configured to perform a comparison operation on the basis of the first pixel signal and the reference signal.

This application claims the benefit of Japanese Priority Patent Application JP2019-068359 filed with Japan Patent Office on Mar. 29, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A photodetection device comprising:
   a first pixel that is configured to generate a first pixel signal;
   a reference signal generator that is configured to generate a reference signal; and
   a first comparator including a first power supply circuit and a first comparison circuit, the first power supply circuit is configured to receive a power supply voltage supplied from a first power supply node and a bias voltage and is configured to output a first power supply voltage to an output terminal, the first power supply voltage being generated based upon the power supply vol age supplied from the first power supply node and the bias voltage, and
   the first comparison circuit is configured to receive the first power supply voltage from the output terminal, and is configured to perform a comparison operation that uses the first power supply voltage and that compares the first pixel signal and the reference signal.

2. The photodetection device according to claim 1, wherein
   the first comparison circuit includes a first current source coupled to a second power supply node.

3. The photodetection device according to claim 2, wherein
   the first pixel is configured to output the first pixel signal from an output terminal,
   the reference signal generator is configured to output the reference signal from an output terminal, and
   the first comparison circuit includes
     a first transistor having a gate, a drain, and a source,
     a first capacitor having a first terminal coupled to the output terminal of the reference signal generator, and a second terminal coupled to the gate of the first transistor,
     a second capacitor having a first terminal coupled to the output terminal of the first pixel, and a second terminal coupled to the gate of the first transistor, and
     a first switch that is configured to couple the gate of the first transistor and the drain of the first transistor to each other by being turned on.

4. The photodetection device according to claim 3, wherein
   the source of the first transistor is coupled to the output terminal of the first power supply circuit, and
   the drain of the first transistor is coupled to the first current source.

5. The photodetection device according to claim 4, wherein
the first comparison circuit further includes
a second transistor having a gate coupled to the drain of the first transistor, a drain, and a source,
a third transistor having a gate, a drain coupled to the drain of the second transistor, and a source coupled to the second power supply node, and
a second switch that is configured to couple the gate of the third transistor and the drain of the third transistor to each other by being turned on.

6. The photodetection device according to claim 5, wherein
the first comparator further includes a fourth transistor that has a gate coupled to the drain of the second transistor, a drain coupled to the output terminal of the first power supply circuit, and a source coupled to the drain of the first transistor.

7. The photodetection device according to claim 3, wherein
the source of the first transistor is coupled to the first current source, and
the first comparison circuit includes
a fifth transistor having a gate, a drain, and a source coupled to the first current source,
a third capacitor coupled to the gate of the fifth transistor, a third switch that is configured to couple the gate of the fifth transistor and the drain of the fifth transistor to each other by being turned on, and
a load circuit coupled to the output terminal of the first power supply circuit, the drain of the first transistor, and the drain of the fifth transistor.

8. The photodetection device according to claim 2, wherein
the first pixel is configured to output the first pixel signal from an output terminal,
the reference signal generator is configured to output the reference signal from an output terminal, and
the first comparison circuit includes
a first transistor having a gate, a drain, and a source coupled to the first current source,
a fifth transistor having a gate, a drain, and a source coupled to the first current source,
a first capacitor having a first terminal coupled to the output terminal of the reference signal generator, and a second terminal coupled to the gate of the first transistor,
a second capacitor having a first terminal coupled to the output terminal of the first pixel, and a second terminal coupled to the gate of the fifth transistor,
a first switch that is configured to couple the gate of the first transistor and the drain of the first transistor to each other by being turned on,
a third switch that is configured to couple the gate of the fifth transistor and the drain of the fifth transistor to each other by being turned on, and
a load circuit coupled to the output terminal of the first power supply circuit, the drain of the first transistor, and the drain of the fifth transistor.

9. The photodetection device according to claim 7, wherein
the load circuit includes
a first load transistor having a gate, a drain coupled to the drain of the first transistor, and a source coupled to the output terminal of the first power supply circuit, and
a second load transistor having a gate coupled to the gate of the first load transistor, a drain coupled to the drain of the fifth transistor, and a source coupled to the output terminal of the first power supply circuit.

10. The photodetection device according to claim 2, wherein
the first pixel is configured to output the first pixel signal from an output terminal,
the reference signal generator is configured to output the reference signal from an output terminal, and
the first comparison circuit includes
a first transistor having a gate, a drain, and a source coupled to the output terminal of the first power supply circuit,
a sixth transistor having a gate, a drain coupled to the first current source, and a source coupled to the drain of the first transistor,
a first capacitor having a first terminal coupled to the output terminal of the reference signal generator, and a second terminal coupled to the gate of the first transistor,
a second capacitor having a first terminal coupled to the output terminal of the first pixel, and a second terminal coupled to the gate of the first transistor, and
a first switch that is configured to couple the gate of the first transistor and the drain of the sixth transistor to each other by being turned on.

11. The photodetection device according to claim 3, wherein
the bias voltage includes a first bias voltage, and
the first power supply circuit includes a first power supply transistor that has a gate configured to be supplied with the first bias voltage, a drain coupled to the first power supply node, and a source coupled to the source of the first transistor.

12. The photodetection device according to claim 3, wherein
the bias voltage includes a first bias voltage and a second bias voltage, and
the first power supply circuit includes
a first power supply transistor having a gate configured to be supplied with the first bias voltage, a drain coupled to the first power supply node, and a source, and
a second power supply transistor having a gate configured to be supplied with the second bias voltage, a drain coupled to the source of the first power supply transistor, and a source coupled to the source of the first transistor.

13. The photodetection device according to claim 11, wherein
the first power supply circuit further includes a fourth switch that is configured to supply the gate of the first power supply transistor with the first bias voltage by being turned on.

14. The photodetection device according to claim 13, wherein
the first power supply circuit further includes a fourth capacitor coupled to the gate of the first power supply transistor.

15. The photodetection device according to claim 11, wherein
the first power supply circuit further includes an operational amplifier having a non-inverting input terminal configured to be supplied with the first bias voltage, an inverting input terminal coupled to the source of the first power supply transistor, and an output terminal coupled to the gate of the first power supply transistor.

16. The photodetection device according to claim 11, wherein
the first power supply transistor further has a back gate coupled to the source of the first power supply transistor.

17. The photodetection device according to claim 11, further comprising a voltage generator that is configured to output a predetermined voltage from an output terminal, wherein
the first power supply transistor further has a back gate coupled to the output terminal of the voltage generator.

18. The photodetection device according to claim 12, wherein
the first power supply circuit further includes a fifth switch that is configured to supply the gate of the second power supply transistor with the second bias voltage by being turned on.

19. The photodetection device according to claim 3, wherein
the first transistor further has a back gate coupled to the source of the first transistor.

20. The photodetection device according to claim 2, wherein
the first current source includes a first current source transistor that has a gate, a drain, and a source coupled to the second power supply node.

21. The photodetection device according to claim 2, wherein
the first current source includes
a first current source transistor having a gate, a drain, and a source coupled to the second power supply node, and
a second current source transistor having a gate, a drain, and a source coupled to the drain of the first current source transistor.

22. The photodetection device according to claim 20, wherein
the first current source further includes a sixth switch that is configured to supply the gate of the first current source transistor with a third bias voltage by being turned on.

23. The photodetection device according to claim 1, further comprising:
a second pixel that is configured to generate a second pixel signal, and
a second comparator including a second power supply circuit and a second comparison circuit, the second power supply circuit configured to generate a second power supply voltage on a basis of the power supply voltage supplied from the first power supply node and the bias voltage and configured to output the second power supply voltage from an output terminal, and the second comparison circuit configured to operate on a basis of the second power supply voltage and configured to perform the comparison operation of to include comparing the second pixel signal and the reference signal.

24. The photodetection device according to claim 23, wherein
the output terminal of the second power supply circuit is coupled to the output terminal of the first power supply circuit.

25. The photodetection device according to claim 24, further comprising:
a third pixel that is configured to generate a third pixel signal; and
a third comparator including a third power supply circuit and a third comparison circuit, the third power supply circuit configured to generate a third power supply voltage on a basis of the power supply voltage supplied from the first power supply node and the bias voltage and configured to output the third power supply voltage from an output terminal, and the third comparison circuit configured to operate on a basis of the third power supply voltage and configured to perform the comparison operation to include comparing of the third pixel signal and the reference signal, wherein
the output terminal of the third power supply circuit is electrically insulated from the output terminal of the first power supply circuit, and is electrically insulated from the output terminal of the second power supply circuit, and the third comparator is provided between the first comparator and the second comparator.

26. The photodetection device according to claim 23, further comprising a variable resistor having a first terminal coupled to the output terminal of the first power supply circuit, and a second terminal coupled to the output terminal of the second power supply circuit.

27. The photodetection device according to claim 23, further comprising a fourth power supply circuit that is configured to generate the power supply voltage on a basis of another power supply voltage supplied from a third power supply node, and is configured to output the power supply voltage to the first power supply node.

28. An electronic apparatus comprising the photodection device according to claim 1.

* * * * *